(12) United States Patent
Fujita et al.

(10) Patent No.: US 9,139,672 B2
(45) Date of Patent: *Sep. 22, 2015

(54) POLYMERIZABLE COMPOUND, LIQUID CRYSTAL COMPOSITION, AND LIQUID CRYSTAL DISPLAY DEVICE

(71) Applicants: JNC CORPORATION, Tokyo (JP); JNC PETROCHEMICAL CORPORATION, Tokyo (JP)

(72) Inventors: Yukihiro Fujita, Chiba (JP); Yoshimasa Furusato, Chiba (JP); Maiko Matsukuma, Chiba (JP)

(73) Assignees: JNC CORPORATION, Tokyo (JP); JNC PETROCHEMICAL CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/345,407

(22) PCT Filed: Oct. 1, 2012

(86) PCT No.: PCT/JP2012/075382
§ 371 (c)(1),
(2) Date: Mar. 18, 2014

(87) PCT Pub. No.: WO2013/054682
PCT Pub. Date: Apr. 18, 2013

(65) Prior Publication Data
US 2014/0346399 A1 Nov. 27, 2014

(30) Foreign Application Priority Data

Oct. 12, 2011 (JP) .................................. 2011-225024

(51) Int. Cl.
| | |
|---|---|
| *G02F 1/1333* | (2006.01) |
| *C08F 122/26* | (2006.01) |
| *C08F 20/20* | (2006.01) |
| *C09K 19/14* | (2006.01) |
| *C09K 19/16* | (2006.01) |
| *C09K 19/30* | (2006.01) |
| *C09K 19/32* | (2006.01) |
| *C09K 19/34* | (2006.01) |
| *C09K 19/54* | (2006.01) |

(Continued)

(52) U.S. Cl.
CPC .............. *C08F 122/26* (2013.01); *C08F 20/20* (2013.01); *C09K 19/14* (2013.01); *C09K 19/16* (2013.01); *C09K 19/2014* (2013.01); *C09K 19/3048* (2013.01); *C09K 19/3068* (2013.01); *C09K 19/32* (2013.01); *C09K 19/3402* (2013.01); *C09K 19/36* (2013.01); *C09K 19/542* (2013.01); *G02F 1/133305* (2013.01); *C09K 2019/0448* (2013.01); *C09K 2019/3075* (2013.01); *C09K 2019/3078* (2013.01); *C09K 2019/3422* (2013.01); *C09K 2019/3425* (2013.01); *C09K 2019/546* (2013.01); *G02F 1/0045* (2013.01)

(58) Field of Classification Search
CPC .... C09K 19/14; C09K 19/16; C09K 19/3048; C09K 19/3068; C09K 19/32; C09K 19/3402; C09K 19/542; C09K 19/2014; C09K 19/36; C09K 2019/0448; C09K 2019/3075; C09K 2019/3078; C09K 2019/546; C09K 2019/3422; C09K 2019/3425; C08F 122/26; C08F 20/20; G02F 1/0045; G02F 1/13305
USPC ............... 252/299.01, 299.6, 299.61, 299.62, 252/299.63, 299.66; 349/86, 182, 183; 428/1.1; 526/309, 322; 560/138, 140
See application file for complete search history.

(56) References Cited

U.S. PATENT DOCUMENTS

| | | | |
|---|---|---|---|
| 5,674,576 A | 10/1997 | Gotoh et al. | |
| 8,968,597 B2 * | 3/2015 | Furusato et al. | 252/299.6 |

(Continued)

FOREIGN PATENT DOCUMENTS

| | | |
|---|---|---|
| CN | 101045866 | 10/2007 |
| JP | 08-092561 | 4/1996 |

(Continued)

OTHER PUBLICATIONS

"International Preliminary Report on Patentability; this report contains the following items :Form PCT/IB/373, PCT/ISA237(cover sheet), PCT/ISA237(Box No. I),PCT/ISA237(Box No. V) of PCT application", mailed on Apr. 15, 2014, which is English translation of "Written Opinion of the International Searching Authority", p. 1-p. 12.

(Continued)

*Primary Examiner* — Geraldina Visconti
(74) *Attorney, Agent, or Firm* — Jianq Chyun IP Office

(57) ABSTRACT

A liquid crystal composition and a liquid crystal display device which includes the composition are provided. The liquid crystal composition contains a specific compound having a polymerizable group as a first component, and may contain a specific compound having a large negative dielectric anisotropy and a low minimum temperature as a second component, or a specific compound having a small viscosity or a large maximum temperature as a third component. The liquid crystal composition satisfies at least one of the following characteristics: a high maximum temperature of a nematic phase, a low minimum temperature of the nematic phase, a small viscosity, a suitable optical anisotropy, a large negative dielectric anisotropy, a large specific resistance, a high stability to ultraviolet light and a high stability to heat. Alternatively, a liquid crystal composition having a suitable balance regarding at least two of the aforementioned characteristics is also provided.

18 Claims, No Drawings

(51) Int. Cl.
*C09K 19/20* (2006.01)
*C09K 19/36* (2006.01)
C09K 19/04 (2006.01)
G02F 1/00 (2006.01)

(56) References Cited

U.S. PATENT DOCUMENTS

| | | |
|---|---|---|
| 2004/0011996 A1 | 1/2004 | Klasen-Memmer et al. |
| 2009/0103011 A1 | 4/2009 | Bernatz et al. |
| 2009/0141215 A1 | 6/2009 | Bremer et al. |
| 2010/0304049 A1 | 12/2010 | Bernatz et al. |
| 2011/0101269 A1 | 5/2011 | Bernatz et al. |
| 2011/0278501 A1 | 11/2011 | Hattori et al. |
| 2012/0052757 A1 | 3/2012 | Hearn et al. |
| 2012/0092608 A1 | 4/2012 | Ito et al. |

FOREIGN PATENT DOCUMENTS

| | | |
|---|---|---|
| JP | 09-133923 | 5/1997 |
| JP | 10-319377 | 12/1998 |
| JP | 2001-048904 | 2/2001 |
| JP | 2002-155113 | 5/2002 |
| JP | 2004-131704 | 4/2004 |
| JP | 2006-259129 | 9/2006 |
| JP | 2006-259558 | 9/2006 |
| JP | 2007-086399 | 4/2007 |
| JP | 2009-102639 | 5/2009 |
| JP | 2009-132718 | 6/2009 |
| WO | 2009030318 | 3/2009 |
| WO | 2009030322 | 3/2009 |
| WO | 2010084810 | 7/2010 |
| WO | 2010085851 | 8/2010 |
| WO | 2010131600 | 11/2010 |

OTHER PUBLICATIONS

Rumiko Yamaguchi et al., Liquid crystal alignment surface with two easy axes induced by unidirectional rubbing, Applied Physics Letters, Jun. 23, 2003, p. 4450-4452, vol. 82, No. 25, 2003 American Institute of Physics, US.

Yutaka Makita et al., Photo Alignment Materials with High Sensitivity to Near UV Light, Journal of Photopolymer Science and Technology, Received Apr. 2, 1998, p. 187-192, vol. 11, No. 2, TAPJ, Japan.

"International Search Report (Form PCT/ISA/210)", mailed on Dec. 4, 2012, with English translation thereof, p. 1-p. 6.

* cited by examiner

POLYMERIZABLE COMPOUND, LIQUID CRYSTAL COMPOSITION, AND LIQUID CRYSTAL DISPLAY DEVICE

CROSS-REFERENCE TO RELATED APPLICATION

This application is a 371 application of an international PCT application serial no. PCT/JP2012/075382, filed on Oct. 1, 2012, which claims the priority benefit of Japan application no. 2011-225024, filed on Oct. 12, 2011. The entirety of each of the above-mentioned patent applications is hereby incorporated by reference herein and made a part of this specification.

TECHNICAL FIELD

The invention relates to a polymerizable compound that is polymerized, for example, by light or heat, and a liquid crystal composition that contains the polymerizable compound. The invention also relates to a liquid crystal display device in which the liquid crystal composition is sealed between substrates, and the polymerizable compound contained in the liquid crystal composition is polymerized while adjusting a voltage to be applied to a liquid crystal layer to immobilize alignment of liquid crystals.

As a technical field of the invention, the invention relates to a liquid crystal composition mainly suitable for use in an active matrix (AM) device and so forth, and an AM device and so forth containing the composition. In particular, the invention relates to a liquid crystal composition having a negative dielectric anisotropy, and a device and so forth that contain the composition and have an in-plane switching (IPS) mode, a vertical alignment (VA) mode or a polymer sustained alignment (PSA) mode. The VA mode includes a multi-domain vertical alignment (MVA) mode and a patterned vertical alignment (PVA) mode.

BACKGROUND ART

In a liquid crystal display device, a classification based on an operating mode for liquid crystals includes a phase change (PC) mode, a twisted nematic (TN) mode, a super twisted nematic (STN) mode, an electrically controlled birefringence (ECB) mode, an optically compensated bend (OCB) mode, an in-plane switching (IPS) mode, a vertical alignment (VA) mode and a polymer sustained alignment (PSA) mode. A classification based on a driving mode in the device includes a passive matrix (PM) and an active matrix (AM). The PM is further classified into static, multiplex and so forth, and the AM is classified into a thin film transistor (TFT), a metal insulator metal (MIM) and so forth. The TFT is further classified into amorphous silicon and polycrystal silicon. The latter is classified into a high temperature type and a low temperature type according to a production process. A classification based on a light source includes a reflective type utilizing natural light, a transmissive type utilizing backlight and a transflective type utilizing both the natural light and the backlight.

The devices include a liquid crystal composition having suitable characteristics. The liquid crystal composition has a nematic phase. General characteristics of the composition should be improved to obtain an AM device having good general characteristics. Table 1 below summarizes a relationship of the general characteristics between two aspects. The general characteristics of the composition will be further explained based on a commercially available AM device. A temperature range of the nematic phase relates to a temperature range in which the device can be used. A preferred maximum temperature of the nematic phase is about 70° C. or higher and a preferred minimum temperature of the nematic phase is about −10° C. or lower. Viscosity of the composition relates to a response time in the device. A short response time is preferred for displaying moving images on the device. Accordingly, a small viscosity in the composition is preferred. A small viscosity at a low temperature is further preferred.

TABLE 1

General Characteristics of Composition and AM Device

| No. | General Characteristics of Composition | General Characteristics of AM Device |
| --- | --- | --- |
| 1 | Wide temperature range of a nematic phase | Wide usable temperature range |
| 2 | Small viscosity[1] | Short response time |
| 3 | Suitable optical anisotropy | Large contrast ratio |
| 4 | Large positive or negative dielectric anisotropy | Low threshold voltage and small electric power consumption Large contrast ratio |
| 5 | Large specific resistance | Large voltage holding ratio and large contrast ratio |
| 6 | High stability to ultraviolet light and heat | Long service life |

[1] A liquid crystal composition can be injected into a liquid crystal cell in a shorter period of time.

An optical anisotropy of the composition relates to a contrast ratio in the device. A product (Δn×d) of the optical anisotropy (Δn) of the composition and a cell gap (d) in the device is designed so as to maximize the contrast ratio. A suitable value of the product depends on a type of the operating mode. The suitable value is in the range of about 0.30 micrometer to about 0.40 micrometer in a device having the VA mode or the PSA mode, and in the range of about 0.20 micrometer to about 0.30 micrometer in a device having the IPS mode. In the above case, a composition having a large optical anisotropy is preferred for a device having a small cell gap. A large absolute value of dielectric anisotropy in the composition contributes to a low threshold voltage, a small electric power consumption and a large contrast ratio in the device. Accordingly, the large absolute value of dielectric anisotropy is preferred. A large specific resistance in the composition contributes to a large voltage holding ratio and a large contrast ratio in the device. Accordingly, a composition having a large specific resistance at room temperature and also at a high temperature in an initial stage is preferred. A composition having a large specific resistance at room temperature and also at a high temperature even after the device has been used for a long period of time is preferred. Stability of the composition to ultraviolet light and heat relates to a service life of the liquid crystal display device. In the case where the stability is high, the device has a long service life. Such characteristics are preferred for an AM device for use in a liquid crystal projector, a liquid crystal television and so forth.

A composition having a positive dielectric anisotropy is used for an AM device having the TN mode. On the other hand, a composition having a negative dielectric anisotropy is used for an AM device having the VA mode. A composition having a positive or negative dielectric anisotropy is used for an AM device having the IPS mode. A composition having a positive or negative dielectric anisotropy is used for an AM device having the PSA mode. Examples of the liquid crystal composition having the negative dielectric anisotropy are disclosed in Patent literature Nos. 1 to 6 as described below and so forth.

REFERENCE LIST

Patent Literature

Patent literature No. 1: JP 2004-131704 A.
Patent literature No. 2: JP 2009-102639 A.
Patent literature No. 3: WO 2009/030318 A.
Patent literature No. 4: WO 2009/030322 A.
Patent literature No. 5: CN 101045866 A.
Patent literature No. 6: JP 2009-132718 A.

A desirable AM device has characteristics such as a wide temperature range in which a device can be used, a short response time, a large contrast ratio, a low threshold voltage, a large voltage holding ratio and a long service life. A shorter response time even by one millisecond is desirable. Thus, desirable characteristics of a composition include a high maximum temperature of a nematic phase, a low minimum temperature of the nematic phase, a small viscosity, a suitable optical anisotropy, a large positive or negative dielectric anisotropy, a large specific resistance, a high stability to ultraviolet light and a high stability to heat.

In a display having a PSA mode, a small amount (about 0.3% by weight to about 1% by weight) of a polymerizable compound (RM) is added to a liquid crystal composition. After introduction into a liquid crystal display cell, only the polymerizable compound is polymerized ordinarily under irradiation with ultraviolet light in a state in which a voltage is applied between electrodes to form a polymer structure within a device. As the RM, a polymerizable mesogenic or liquid crystal compound is known to be particularly suitable as a monomer to be added to the liquid crystal composition.

SUMMARY OF INVENTION

Technical Problem

In general, the PSA mode described above has an advantage of shorter response time in comparison with a TN mode, an IPS mode and so forth. In recent years, however, further response time reduction is needed also for the PSA mode because improvement of display performance is required. One of the aims of the invention is to provide a new RM having a short response time and a liquid crystal composition containing the RM, and a liquid crystal display device including such a composition. Moreover, as the RM, bifunctional (meth)acrylic ester is generally used because a polymer thereof has an excellent stability to ultraviolet light and heat, for example. In a liquid crystal composition, a further improvement has been recently required for RM to produce a polymer having an excellent stability to ultraviolet light and heat. Another aim of the invention is to apply, as a monomer to be added to a liquid crystal composition, trifunctional or higher-functional (meth)acrylic ester that is generally known to produce a polymer having a superb stability to ultraviolet light and heat. A further aim of the invention is to provide a liquid crystal composition satisfying at least one of characteristics such as a high maximum temperature of a nematic phase, a low minimum temperature of the nematic phase, a small viscosity, a suitable optical anisotropy, a large negative dielectric anisotropy, a large specific resistance, a high stability to ultraviolet light and a high stability to heat. A still further aim is to provide a liquid crystal composition having a suitable balance regarding at least two of the characteristics. An additional aim is to provide a liquid crystal display device including such a composition. A further additional aim is to provide a composition having a suitable optical anisotropy to be a small optical anisotropy or a large optical anisotropy, a large negative dielectric anisotropy, a high stability to ultraviolet light and so forth, and is to provide an AM device having a suitable pretilt, a large voltage holding ratio, a large contrast ratio, a long service life and so forth.

Surprisingly, a response time has been found to be reduced by using an RM having a structure in which two or more conjugated systems of conjugate rings are connected with a bonding group.

Solution to Problem

The invention concerns a compound represented by formula (1), a liquid crystal composition containing at least one compound selected from the group of compounds represented by formula (1) as a first component, and a liquid crystal display device including the composition:

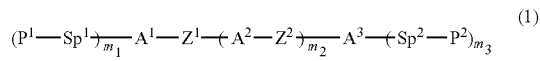

wherein $A^1$ and $A^3$ are independently an aromatic ring group in which at least one of hydrogen may be replaced by L, or a heterocyclic aromatic ring group in which at least one of hydrogen may be replaced by L; $A^2$ is independently an aromatic ring group in which at least one of hydrogen may be replaced by L, a heterocyclic aromatic ring group in which at least one of hydrogen may be replaced by L, or a single bond; $Z^1$ is —CO—CR$^1$=CR$^2$—, —CR$^1$=CR$^2$—CO—, —CR$^1$=CR$^2$—, —C(=CR$^1$R$^2$)— or —C(=R$^3$)—; $Z^2$ is independently —CO—CR$^1$=CR$^2$—, —CR$^1$=CR$^2$—CO—, —CR$^1$=CR$^2$, —C(=CR$^1$R$^2$)— or —C(=R$^3$)—; $R^1$ and $R^2$ are independently hydrogen, halogen, alkyl having 1 to 10 carbons, or alkyl having 1 to 10 carbons in which at least one of hydrogen is replaced by fluorine; and $R^3$ is a group selected from the group of groups represented by formula (R-1);

wherein, $X^1$ is independently halogen, alkyl having 1 to 6 carbons, or alkyl having 1 to 10 carbons in which at least one of hydrogen is replaced by fluorine; L is independently halogen, —CF$_3$, —C≡N or alkyl having 1 to 6 carbons; $P^1$ and $P^2$ are independently a group selected from the group of groups represented by formula (P-1) to formula (P-11); $Y^1$ and $Y^2$ are independently hydrogen, —CH$_3$, —C$_2$H$_5$ or halogen; and $Y^3$ is hydrogen, —CH$_3$, —C$_2$H$_5$, halogen, —CF$_3$ or —C≡N;

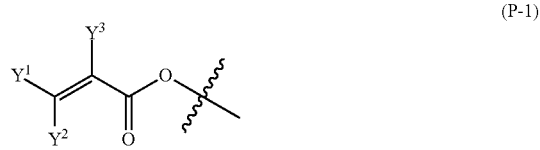

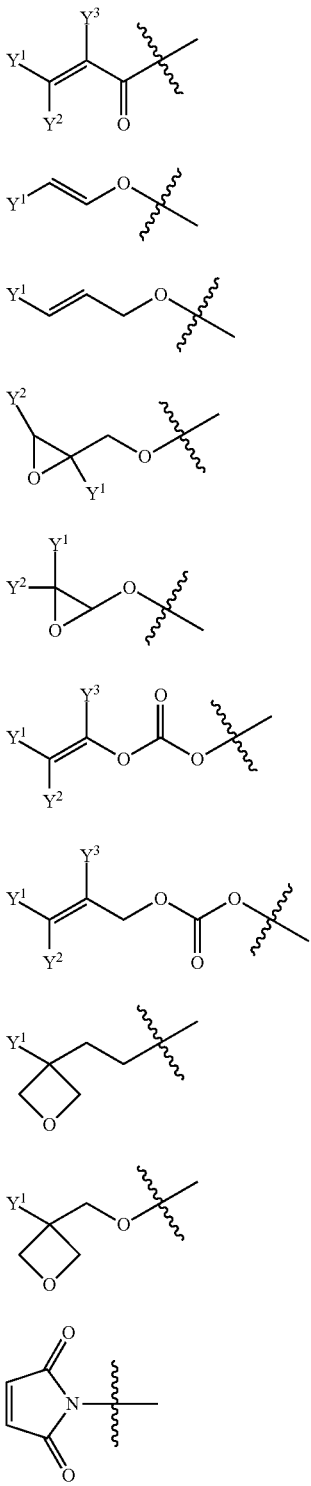

wherein, $Sp^1$ and $Sp^2$ are independently a single bond or alkylene having 1 to 6 carbons, and at least one of hydrogen of the alkylene may be replaced by halogen or —C≡N, and at least one of non-adjacent —$CH_2$— may be replaced by —O—, —S—, —NH—, —CO—, —CO—O—, —O—CO—, —O—CO—O—, —CH=CH— or —C≡C—; $m_1$ and $m_3$ are an integer from 0 to 5, $m_2$ is an integer from 0 to 4, and a sum of $m_1$ and $m_3$ is an integer from 1 to 10; $n_1$ is an integer from 1 to 8; and p is an integer from 0 to 4.

Advantageous Effects of Invention

An advantage of the invention is a high stability of a polymer of a polymerizable mesogenic or liquid crystal compound to ultraviolet light or heat. Another advantage of the invention is a liquid crystal composition satisfying at least one of characteristics such as a high maximum temperature of a nematic phase, a low minimum temperature of the nematic phase, a small viscosity, a suitable optical anisotropy, a large negative dielectric anisotropy, a large specific resistance, a high stability to ultraviolet light and a high stability to heat. One aspect of the invention is a liquid crystal composition having a suitable balance regarding at least two of the characteristics. Another aspect is a liquid crystal display device including such a composition. A further aspect is a polymerizable compound having a high stability to ultraviolet light or heat, and a composition having a suitable optical anisotropy, a large negative dielectric anisotropy, a high stability to ultraviolet light and so forth, and an AM device having a short response time, a suitable pretilt, a large voltage holding ratio, a large contrast ratio, a long service life and so forth.

BEST MODE FOR CARRYING OUT THE INVENTION

Usage of terms herein is as described below. A liquid crystal composition or a liquid crystal display device of the invention may be occasionally abbreviated as "composition" or "device," respectively. The liquid crystal display device is a generic term for a liquid crystal display panel and a liquid crystal display module. "Liquid crystal compound" means a compound having a liquid crystal phase such as a nematic phase or a smectic phase, or a compound having no liquid crystal phase but being useful as a component of the composition. Such a useful compound has a six-membered ring such as 1,4-cyclohexylene and 1,4-phenylene, and a rod-like molecular structure. An optically active compound and a polymerizable compound may be occasionally added to the composition. Even in the case where the compounds are liquid crystalline, the compounds are classified as an additive herein. At least one compound selected from the group of compounds represented by formula (1) may be occasionally abbreviated as "compound (1)." "Compound (1)" means one compound or two or more compounds represented by formula (1). A same rule also applies to any other compound represented by any other formula. "At least one" in the context of "replaced" indicates that not only a position but also a number can be freely selected.

A maximum temperature of the nematic phase may be occasionally abbreviated as "maximum temperature." A minimum temperature of the nematic phase may be occasionally abbreviated as "minimum temperature." An expression "having a large specific resistance" means that the composition has a large specific resistance at room temperature and also at a temperature close to the maximum temperature of the nematic phase in an initial stage, and that the composition has a large specific resistance at room temperature and also at a temperature close to the maximum temperature of the nematic phase even after the device has been used for a long period of time. An expression "having a large voltage holding ratio" means that the device has a large voltage holding ratio at room temperature and also at a high temperature in an initial stage, and that the device has a large voltage holding ratio at room temperature and also at a temperature close to the maximum temperature of the nematic phase even after the device has been used for a long period of time. When characteristics such as an optical anisotropy are explained, values obtained according to the measuring methods described in Examples will be used. A first component includes one compound or two or more compounds. "Ratio of the first component" is expressed in terms of a weight ratio (part by weight) of the first component based on 100 parts by weight of a liquid crystal composition excluding the first component. "Ratio of a second component" is expressed in terms of weight percent (% by weight) of the second component based on the weight of the liquid crystal composition excluding the first component. "Ratio of a third component" is expressed in a manner similar to "ratio of the second component." A ratio of the additive mixed with the composition is expressed in terms of weight percent (% by weight) or weight parts per million (ppm) based on the total weight of the liquid crystal composition.

A symbol $R^6$ is used for a plurality of compounds in chemical formulas of component compounds. Groups to be selected by $R^6$ may be identical or different in two of arbitrary compounds among the plurality of compounds. In one case, for example, $R^6$ of compound (2-1) is ethyl and $R^6$ of compound (2-2) is ethyl. In another case, $R^6$ of compound (2-1) is ethyl and $R^6$ of compound (2-2) is propyl. A same rule also applies to a symbol $R^8$, $Y^1$ or the like.

The invention includes the items described below.

Item 1. A compound represented by formula (1):

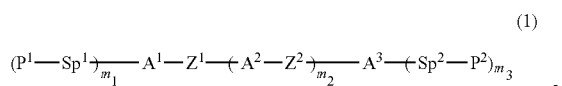
(1)

wherein, $A^1$ and $A^3$ are independently an aromatic ring group in which at least one of hydrogen may be replaced by L, or a heterocyclic aromatic ring group in which at least one of hydrogen may be replaced by L; $A^2$ is independently an aromatic ring group in which at least one of hydrogen may be replaced by L, a heterocyclic aromatic ring group in which at least one of hydrogen may be replaced by L, or a single bond; $Z^1$ is —CO—$CR^1$=$CR^2$—, —$CR^1$=$CR^2$—CO—, —$CR^1$=$CR^2$—, —C(=$CR^1R^2$)— or —C(=$R^3$)—; $Z^2$ is independently —CO—$CR^1$=$CR^2$—, —$CR^1$=$CR^2$—CO—, —$CR^1$=$CR^2$—, —C(=$CR^1R^2$)— or —C(=$R^3$)—; $R^1$ and $R^2$ are independently hydrogen, halogen, alkyl having 1 to 10 carbons, or alkyl having 1 to 10 carbons in which at least one of hydrogen is replaced by fluorine; and $R^3$ is a group selected from the group of groups represented by formula (R-1);

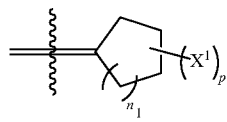
(R-1)

wherein, $X^1$ is independently halogen, alkyl having 1 to 6 carbons, or alkyl having 1 to 10 carbons in which at least one of hydrogen is replaced by fluorine; L is independently halogen, —$CF_3$, —C≡N or alkyl having 1 to 6 carbons; $P^1$ and $P^2$ are independently a group selected from the group of groups represented by formula (P-1) to formula (P-11); $Y^1$ and $Y^2$ are independently hydrogen, —$CH_3$, —$C_2H_5$ or halogen; and $Y^3$ is hydrogen, —$CH_3$, —$C_2H_5$, halogen, —$CF_3$ or —C≡N;

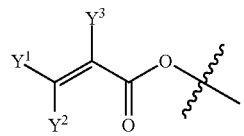
(P-1)

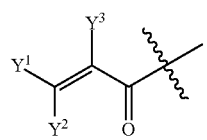
(P-2)

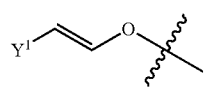
(P-3)

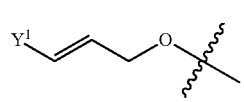
(P-4)

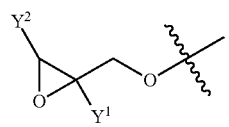
(P-5)

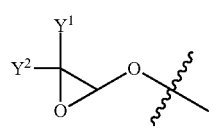
(P-6)

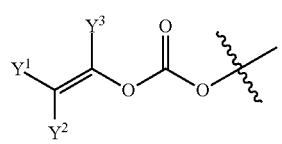
(P-7)

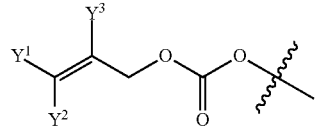
(P-8)

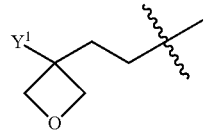
(P-9)

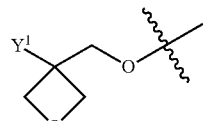
(P-10)

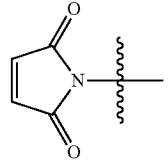
(P-11)

wherein, $Sp^1$ and $Sp^2$ are independently a single bond or alkylene having 1 to 6 carbons, and at least one of hydrogen of the alkylene may be replaced by halogen or —C≡N, and at least one of non-adjacent —$CH_2$— may be replaced by —O—, —S—, —NH—, —CO—, —CO—O—, —O—CO—, —O—CO—O—, —CH=CH— or —C≡C—; $m_1$ and $m_3$ are an integer from 0 to 5, $m_2$ is an integer from 0 to 4, and a sum of $m_1$ and $m_3$ is an integer from 1 to 10; $n_1$ is an integer from 1 to 8; and p is an integer from 0 to 4.

Item 2. The compound according to item 1, wherein in formula (1), $P^1$ and $P^2$ are a group selected from the group of groups represented by formula (P-1); and $Sp^1$ and $Sp^2$ are a single bond.

Item 3. The compound according to item 1 or 2, represented by formula (1-1) to formula (1-4):

(1-1)

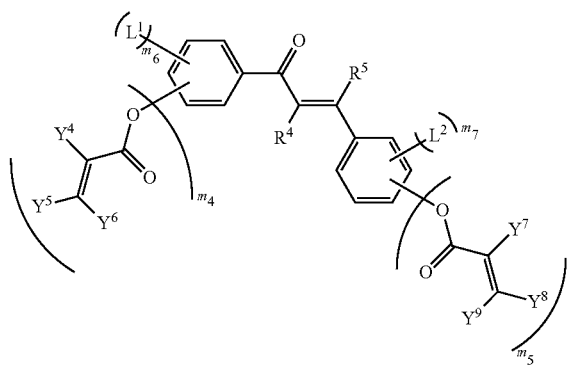

(1-2)

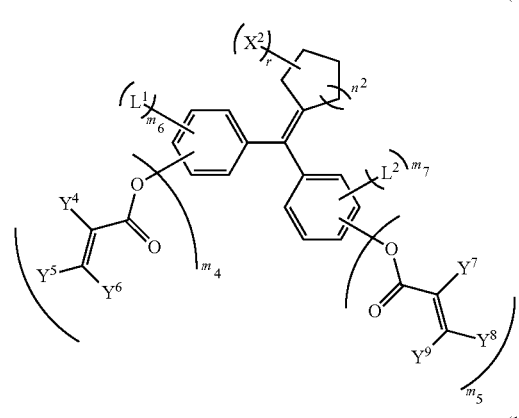

(1-3)

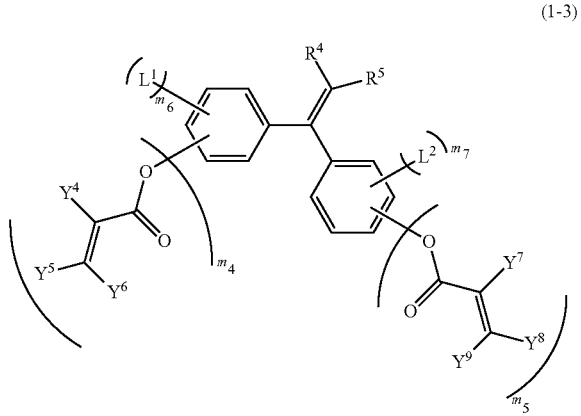

(1-4)

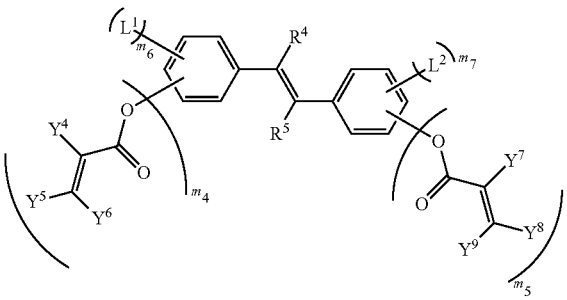

wherein, $R^4$ and $R^5$ are independently hydrogen, halogen or alkyl having 1 to 4 carbons; $X^2$ is independently halogen or alkyl having 1 to 3 carbons; $L^1$ and $L^2$ are independently halogen or alkyl having 1 to 3 carbons; $Y^4$ and $Y^7$ are independently hydrogen, —$CH_3$, —$C_2H_5$, halogen, —$CF_3$ or —C≡N; $Y^5$, $Y^6$, $Y^8$ and $Y^9$ are independently hydrogen, —$CH_3$, —$C_2H_5$ or halogen; $m_4$ and $m_5$ are an integer from 0 to 5, and a sum of $m_4$ and $m_5$ is 3 to 10; $m_6$ and $m_7$ are an integer from 0 to 5; $n_2$ is an integer from 1 to 4; and r is an integer from 0 to 3.

Item 4. The compound according to item 3, wherein in formula (1-1) to formula (1-4), $Y^4$ and $Y^7$ are independently hydrogen or —$CH_3$; $Y^5$, $Y^6$, $Y^8$ and $Y^9$ are hydrogen; and nm and $m_5$ are an integer from 0 to 3, and a sum of $m_4$ and $m_5$ is 3 or 4.

Item 5. A homopolymer or a copolymer obtained by homopolymerization or copolymerization of the compound according to any one of items 1 to 4.

Item 6. A liquid crystal composition, containing at least one compound selected from the group of compounds according to any one of items 1 to 4 as a first component.

Item 7. The liquid crystal composition according to item 6, wherein a ratio of the first component is in the range of 0.05 part by weight to 10 parts by weight based on 100 parts by weight of the liquid crystal composition excluding the first component.

Item 8. The liquid crystal composition according to item 6 or 7, further containing at least one compound selected from the group of compounds represented by formula (2) as a second component:

(2)

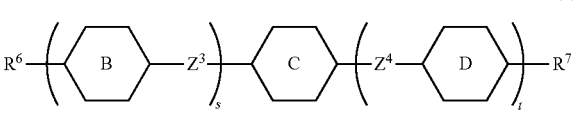

wherein, $R^6$ and $R^7$ are independently alkyl having 1 to 12 carbons, alkoxy having 1 to 12 carbons, alkenyl having 2 to 12 carbons, or alkenyl having 2 to 12 carbons in which at least one of hydrogen is replaced by fluorine; ring B and ring D are independently 1,4-cyclohexylene, 1,4-phenylene, 1,4-phenylene in which at least one of hydrogen is replaced by fluorine or chlorine, or tetrahydropyran-2,5-diyl; ring C is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl; $Z^3$ and $Z^4$ are independently a single bond, ethylene, methyleneoxy or carbonyloxy; s is 1, 2 or 3; and t is 0 or 1 and a sum of s and t is 3 or less.

Item 9. The liquid crystal composition according to item 8, wherein the second component is at least one compound selected from the group of compounds represented by formula (2-1) to formula (2-19):

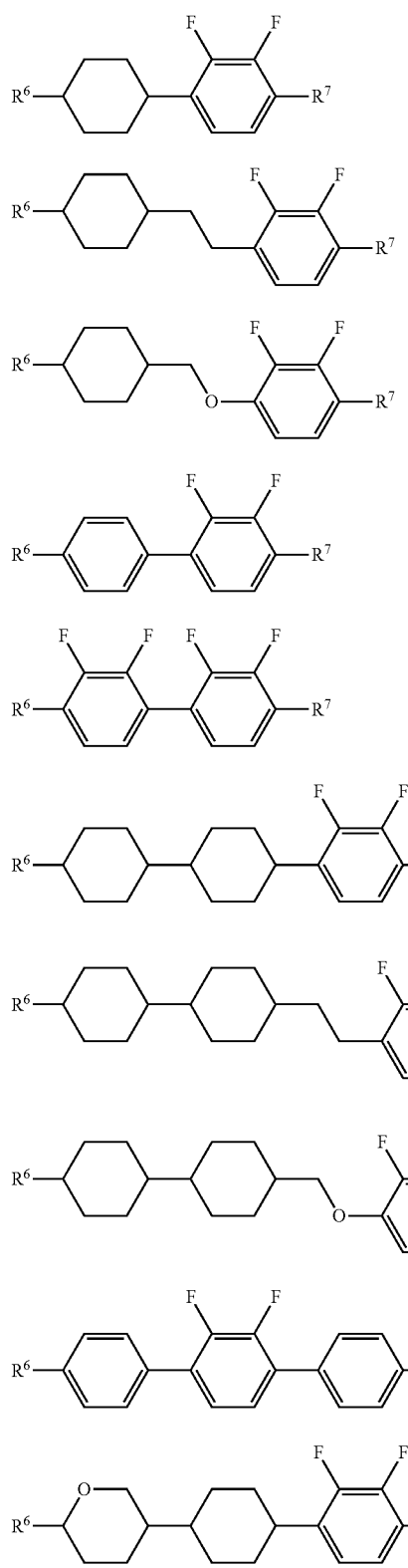
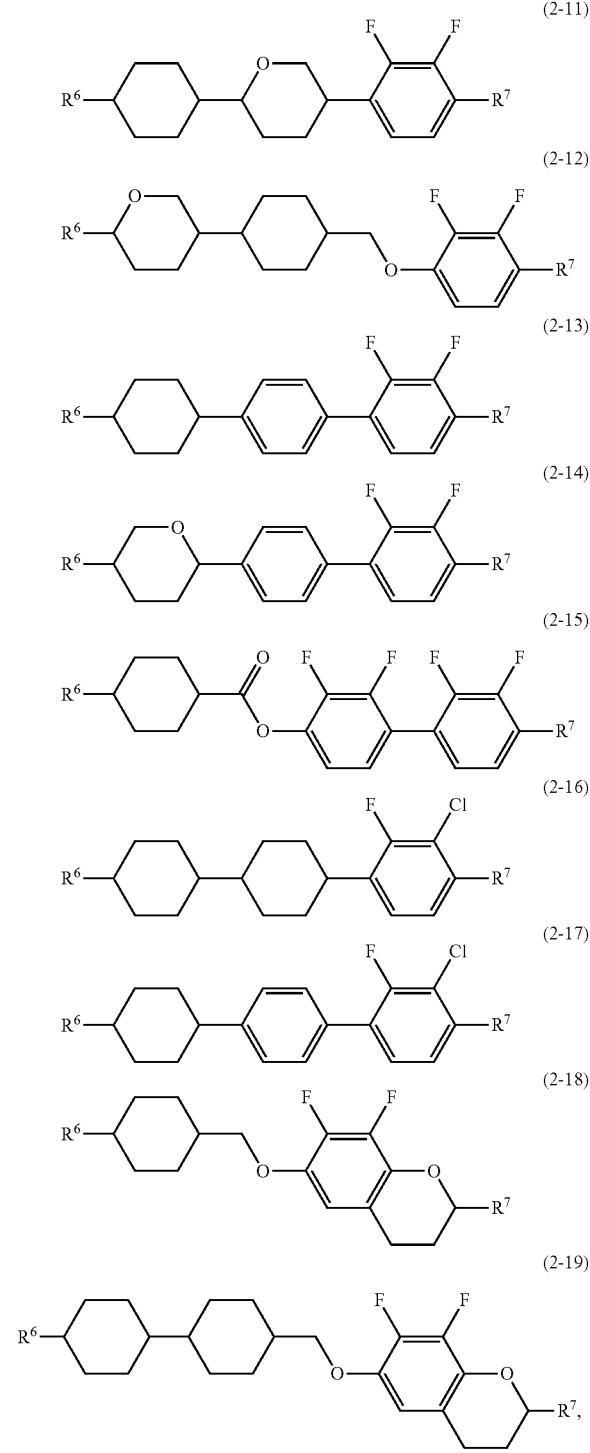

wherein $R^6$ and $R^7$ are independently alkyl having 1 to 12 carbons, alkoxy 2 to 12 carbons in which at least one of hydrogen is replaced by fluorine.

Item 10. The liquid crystal composition according to item 8, wherein the second component is at least one compound selected from the group of compounds represented by formula (2-1) according to item 9.

Item 11. The liquid crystal composition according to item 8, wherein the second component is a mixture of at least one compound selected from the group of compounds represented by formula (2-1) according to item 9 and at least one compound selected from the group of compounds represented by formula (2-6) according to item 9.

Item 12. The liquid crystal composition according to item 8, wherein the second component is a mixture of at least one compound selected from the group of compounds represented by formula (2-1) according to item 9 and at least one compound selected from the group of compounds represented by formula (2-13) according to item 9.

Item 13. The liquid crystal composition according to item 8, wherein the second component is a mixture of at least one compound selected from the group of compounds represented by formula (2-4) according to item 9 and at least one compound selected from the group of compounds represented by formula (2-8) according to item 9.

Item 14. The liquid crystal composition according to any one of items 8 to 13, wherein a ratio of the second component is in the range of 10% by weight to 90% by weight based on the weight of the liquid crystal composition excluding the first component.

Item 15. The liquid crystal composition according to any one of items 6 to 14, further containing at least one compound selected from the group of compounds represented by formula (3) as a third component:

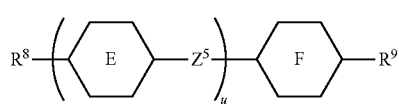

(3)

wherein, $R^8$ and $R^9$ are independently alkyl having 1 to 12 carbons, alkoxy having 1 to 12 carbons, alkenyl having 2 to 12 carbons, or alkenyl having 2 to 12 carbons in which at least one of hydrogen is replaced by fluorine; ring E and ring F are independently 1,4-cyclohexylene, 1,4-phenylene, 2-fluoro-1,4-phenylene, 3-fluoro-1,4-phenylene or 2,5-difluoro-1,4-phenylene; $Z^5$ is independently a single bond, ethylene, methyleneoxy or carbonyloxy; and u is 1, 2 or 3.

Item 16. The liquid crystal composition according to item 15, wherein the third component is at least one compound selected from the group of compounds represented by formula (3-1) to formula (3-13):

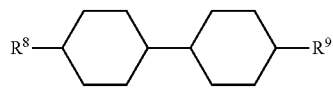

(3-1)

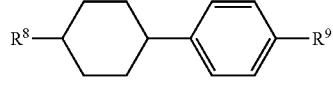

(3-2)

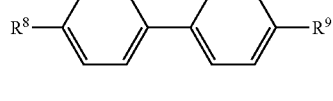

(3-3)

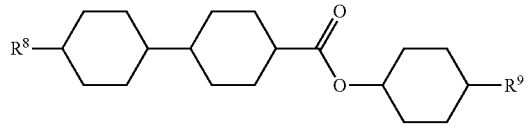

(3-4)

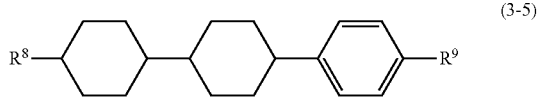

(3-5)

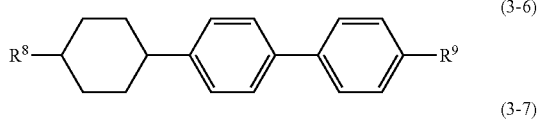

(3-6)

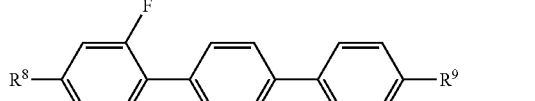

(3-7)

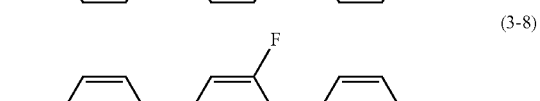

(3-8)

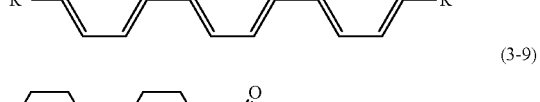

(3-9)

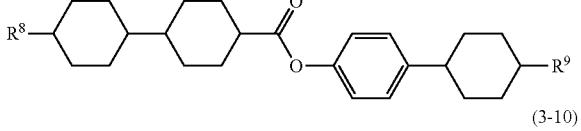

(3-10)

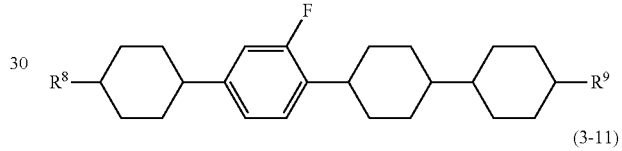

(3-11)

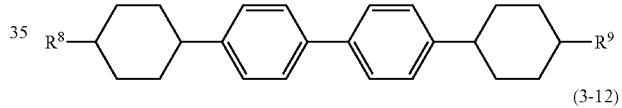

(3-12)

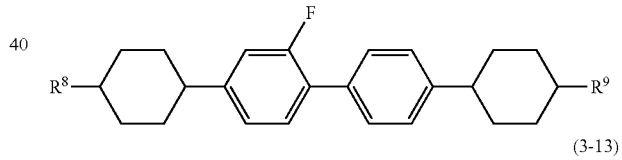

(3-13)

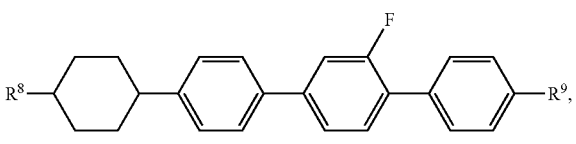

wherein $R^8$ and $R^9$ are independently alkyl having 1 to 12 carbons, alkoxy having 1 to 12 carbons, alkenyl having 2 to 12 carbons, or alkenyl having 2 to 12 carbons in which at least one of hydrogen is replaced by fluorine.

Item 17. The liquid crystal composition according to item 15, wherein the third component is at least one compound selected from the group of compounds represented by formula (3-1) according to item 16.

Item 18. The liquid crystal composition according to item 15, wherein the third component is a mixture of at least one compound selected from the group of compounds represented by formula (3-1) according to item 16 and at least one compound selected from the group of compounds represented by formula (3-5) according to item 16.

Item 19. The liquid crystal composition according to item 15, wherein the third component is a mixture of at least one compound selected from the group of compounds represented by formula (3-1) according to item 16 and at least one compound selected from the group of compounds represented by formula (3-7) according to item 16.

Item 20. The liquid crystal composition according to item 15, wherein the third component is a mixture of at least one compound selected from the group of compounds represented by formula (3-1) according to item 16, at least one compound selected from the group of compounds represented by formula (3-5) according to item 16 and at least one compound selected from the group of compounds represented by formula (3-7) according to item 16.

Item 21. The liquid crystal composition according to any one of items 15 to 20, wherein a ratio of the third component is in the range of 10% by weight to 90% by weight based on the weight of the liquid crystal composition excluding the first component.

Item 22. The liquid crystal composition according to any one of items 6 to 21, further containing a polymerization initiator.

Item 23. The liquid crystal composition according to any one of items 6 to 22, further containing a polymerization inhibitor.

Item 24. The liquid crystal composition according to any one of items 6 to 23, wherein a maximum temperature of a nematic phase is 70° C. or higher, an optical anisotropy (25° C.) at a wavelength of 589 nanometers is 0.08 or more, and a dielectric anisotropy (25° C.) at a frequency of 1 kHz is –2 or less.

Item 25. A liquid crystal display device, comprising two substrates having an electrode layer on at least one of the substrates, and the liquid crystal composition according to any one of items 6 to 24 are arranged between the two substrates.

Item 26. The liquid crystal display device according to item 25, wherein an operating mode in the liquid crystal display device is a TN mode, a VA mode, an IPS mode or a PSA mode, and a driving mode in the liquid crystal display device is an active matrix mode.

Item 27. Use of the liquid crystal composition according to any one of items 6 to 24 in a liquid crystal display device.

The invention also includes the following items: (1) the composition, further containing an optically active compound; (2) the composition, further containing the additive such as an antioxidant, an ultraviolet light absorber or an antifoaming agent; (3) an AM device including the composition; (4) a device including the composition, and having a TN mode, an ECB mode, an OCB mode, an IPS mode, a VA mode or a PSA mode; (5) a transmissive device including the composition; (6) use of the composition as a composition having a nematic phase; and (7) use as an optically active composition by adding the optically active compound to the composition.

The composition of the invention will be explained in the following order. First, a constitution of the component compounds in the composition will be explained. Second, main characteristics of the component compounds and main effects of the compounds on the composition will be explained. Third, a combination of components in the composition, a preferred ratio of the component compounds and the basis thereof will be explained. Fourth, a preferred embodiment of the component compounds will be explained. Fifth, specific examples of the component compounds will be shown. Sixth, an additive that may be mixed with the composition will be explained. Seventh, methods for synthesizing the component compounds will be explained. Last, an application of the composition will be explained.

First, the constitution of the component compounds in the composition will be explained. The composition of the invention is classified into composition A and composition B. Composition A may further contain any other liquid crystal compound, the additive, an impurity or the like in addition to the liquid crystal compound selected from compound (1), compound (2) and compound (3). "Any other liquid crystal compound" means a liquid crystal compound different from compound (1), compound (2) and compound (3). Such a compound is mixed with the composition for the purpose of further adjusting the characteristics. Of any other liquid crystal compounds, a ratio of a cyano compound is preferably as small as possible in view of stability to heat or ultraviolet light. A further preferred ratio of the cyano compound is 0% by weight. The additive includes an optically active compound, an antioxidant, an ultraviolet light absorber, a dye, an antifoaming agent and a polymerization initiator. The impurity includes a compound mixed in a process such as preparation of the component compounds. Even in the case where the compound is liquid crystalline, the compound is classified as the impurity herein.

Composition B consists essentially of compound (1), compound (2), and compound (3). A term "essentially" means that the composition may contain the additive and the impurity, but does not contain any liquid crystal compound different from the compounds. Composition B has a smaller number of components than composition A has. Composition B is preferred to composition A in view of cost reduction. Composition A is preferred to composition B in view of capability of further adjusting physical properties by mixing any other liquid crystal compound.

Second, the main characteristics of the component compounds and the main effects of the compounds on the characteristics of the composition will be explained. The main characteristics of the component compounds are summarized in Table 2 on the basis of advantageous effects of the invention. In Table 2, a symbol L stands for "large" or "high," a symbol M stands for "medium," and a symbol S stands for "small" or "low." The symbols L, M and S represent a classification based on a qualitative comparison among the component compounds, and 0 (zero) means "a value is close to zero."

TABLE 2

| Characteristics of Compounds | | |
|---|---|---|
| Compounds | Compound (2) | Compound (3) |
| Maximum temperature | S to L | S to L |
| Viscosity | M to L | S to M |
| Optical anisotropy | M to L | S to L |
| Dielectric anisotropy | M to L[1)] | 0 |
| Specific resistance | L | L |

[1)]A value of dielectric anisotropy is negative, and the symbol shows magnitude of an absolute value.

Upon mixing the component compounds with the composition, the main effects of the component compounds on the characteristics of the composition are as described below. Compound (2) increases the absolute value of dielectric anisotropy and decreases the minimum temperature. Compound (3) decreases the viscosity or increases the maximum temperature.

Third, the combination of components in the composition, the preferred ratio of the component compounds and the basis thereof will be explained. The combination of components in the composition includes a combination of the first component and the second component, a combination of the first component and the third component, and a combination of the first component, the second component and the third component.

A preferred ratio of the first compound is about 0.05 part by weight or more for aligning liquid crystal molecules, and about 10 parts by weight or less for avoiding a poor display, based on 100 parts by weight of the liquid crystal composition excluding the first component. A further preferred ratio is in the range of about 0.1 part by weight to about 2 parts by weight.

A preferred ratio of the second component is about 10% by weight or more for increasing the absolute value of dielectric anisotropy, and about 90% by weight or less for decreasing the minimum temperature, based on the liquid crystal composition excluding the first component. A further preferred ratio is in the range of about 20% by weight to about 80% by weight. A particularly preferred ratio is in the range of about 30% by weight to about 70% by weight.

A preferred ratio of the third component is about 10% by weight or more for decreasing the viscosity or increasing the maximum temperature, and about 90% or less for increasing the absolute value of dielectric anisotropy, based on the liquid crystal composition excluding the first component. A further preferred ratio is in the range of about 20% by weight to about 80% by weight. A particularly preferred ratio is in the range of about 30% by weight to about 70% by weight.

Fourth, the preferred embodiment of the component compounds will be explained. $R^1$ and $R^2$ are independently hydrogen, halogen, alkyl having 1 to 10 carbons or fluoroalkyl. $R^4$ and $R^5$ are independently hydrogen, halogen or alkyl having 1 to 4 carbons. Preferred $R^1$, $R^2$, $R^4$ or $R^5$ is hydrogen, fluorine or alkyl having 1 to 3 carbons for increasing photoreactivity.

$R^3$ is a group selected from the group of groups represented by formula (R-1).

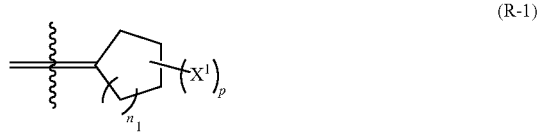

(R-1)

A wavy line in formula (R-1) represents a part to be bonded as a group.

$R^6$, $R^7$, $R^8$ and $R^9$ are independently alkyl having 1 to 12 carbons, alkoxy having 1 to 12 carbons, alkenyl having 2 to 12 carbons, or alkenyl having 2 to 12 carbons in which at least one of hydrogen is replaced by fluorine. Preferred $R^6$ or $R^7$ is alkyl having 1 to 12 carbons for increasing the stability to ultraviolet light or increasing the stability to heat, or the like, and alkoxy having 1 to 12 carbons for increasing the absolute value of dielectric anisotropy. Preferred $R^8$ or $R^9$ is alkyl having 1 to 12 carbons for increasing the stability to ultraviolet light or increasing the stability to heat, and alkenyl having 2 to 12 carbons for decreasing the minimum temperature.

In the first component, preferred alkyl includes, for example, methyl, ethyl, propyl, isopropyl, butyl, isobutyl, t-butyl, pentyl, isopentyl, hexyl, isohexyl, heptyl, isoheptyl, octyl, isooctyl, cyclopropyl, cyclobutyl, 2-methylcyclopropyl, cyclopropylmethyl, cyclopentyl, cyclohexyl, trifluoromethyl, perfluoro-n-butyl, 2,2,2-trifluoroethyl, perfluorohexyl, vinyl, 1-propenyl, 2-propenyl, isopropenyl, 1-butenyl, 2-butenyl, 3-butenyl, 1-pentenyl, 2-pentenyl, 3-pentenyl, 4-pentenyl, 1-methyl-2-butenyl, 1-methyl-3-butenyl, 1,1-dimethyl-2-propenyl, 3-methyl-2-butenyl, 1-hexenyl, 2-hexenyl, 3-hexenyl, 4-hexenyl, 5-hexenyl, 2-methyl-1-pentenyl, 3-methyl-1-pentenyl, 4-methyl-1-pentenyl, 2-methyl-2-pentenyl, 3-methyl-2-pentenyl, 2-ethyl-1-butenyl, 3,3-dimethyl-1-butenyl, ethynyl, 1-propynyl, 2-propynyl, 1-butynyl, 2-butynyl, 3-butynyl, 1-pentynyl, 2-pentynyl, 3-pentynyl, 4-pentynyl, 4-methyl-1-pentynyl, 1-hexynyl, phenyl, naphthyl, anthryl, benzyl, methyloxy, ethyloxy, propyloxy, isopropyloxy, butyloxy, isobutyloxy, s-butyloxy, t-butyloxy, pentyloxy, isopentyloxy, hexyloxy, heptyloxy, cyclopropyloxy, cyclobutyloxy, 2-methylcyclopropyloxy, cyclopropylmethyloxy, cyclopentyloxy, or cyclohexyloxy. Further preferred alkyl is, for increasing the photoreactivity, methyl, ethyl, propyl, isopropyl, trifluoromethyl, 2,2,2-trifluoroethyl, vinyl, 1-propenyl, 2-propenyl, isopropenyl, ethynyl, 1-propynyl, 2-propynyl, methyloxy, ethyloxy, propyloxy or isopropyloxy.

In the second component and the third component, preferred alkyl includes methyl, ethyl, propyl, butyl, pentyl, hexyl, heptyl or octyl. Further preferred alkyl includes ethyl, propyl, butyl, pentyl or heptyl for decreasing the viscosity.

Preferred alkoxy includes methoxy, ethoxy, propoxy, butoxy, pentyloxy, hexyloxy or heptyloxy. Further preferred alkoxy includes methoxy or ethoxy for decreasing the viscosity.

Preferred alkenyl includes vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl or 5-hexenyl. Further preferred alkenyl is vinyl, 1-propenyl, 3-butenyl or 3-pentenyl for decreasing the viscosity. A preferred configuration of —CH═CH— in the alkenyl depends on a position of a double bond. Trans is preferred in the alkenyl such as 1-propenyl, 1-butenyl, 1-pentenyl, 1-hexenyl, 3-pentenyl and 3-hexenyl for decreasing the viscosity, for instance. Cis is preferred in the alkenyl such as 2-butenyl, 2-pentenyl and 2-hexenyl. In the alkenyl, straight-chain alkenyl is preferred to branched-chain alkenyl.

Preferred examples of alkenyl in which at least one of hydrogen is replaced by fluorine include 2,2-difluorovinyl, 3,3-difluoro-2-propenyl, 4,4-difluoro-3-butenyl, 5,5-difluoro-4-pentenyl and 6,6-difluoro-5-hexenyl. Further preferred examples include 2,2-difluorovinyl and 4,4-difluoro-3-butenyl for decreasing the viscosity.

$A^1$ and $A^3$ are independently an aromatic ring group in which at least one of hydrogen may be replaced by L or a heterocyclic aromatic ring group in which at least one of hydrogen may be replaced by L. Preferred $A^1$ or $A^3$ is an aromatic ring group having 12 carbons or less and a condensed aromatic ring group having 20 carbons or less. The rings may be a heterocyclic aromatic ring group including one, two or more hetero atoms, in particular, a hetero atom selected from N, O, Si and S. In the rings, at least one of hydrogen may be replaced by L. Further preferred $A^1$ or $A^3$ is a benzene ring.

$A^2$ is an aromatic ring group in which at least one of hydrogen may be replaced by L, a heterocyclic aromatic ring group in which at least one of hydrogen may be replaced by L, or a single bond. Two of arbitrary $A^2$ when $m_2$ is 2 or more may be identical or different. Preferred $A^2$ is a single bond, an aromatic ring group having 12 carbons or less or a condensed aromatic ring group having 20 carbons or less. The ring may be a heterocyclic aromatic ring group including one or more hetero atoms, in particular a hetero atom selected from N, O, Si and S. In the ring, at least one of hydrogen may be replaced by L. Further preferred $A^2$ is a benzene ring.

The aromatic ring group and heterocyclic aromatic ring group have a structural unit having, as a core, an aromatic ring and a heterocyclic aromatic ring having an integer valency. Specifically, the aromatic ring group and heterocyclic aromatic ring group have a bonding group having an integer valency in which an integral number of bonding hands are available. For example, when $m_1$ is 0, $A_1$ becomes a monovalent bonding group, when $m_1$ is 1, $A_1$ becomes a divalent bonding group and when $m_1$ is 2, $A_1$ becomes a trivalent bonding group. A relationship between $m_3$ and $A_3$ is similar thereto. Specific examples of the aromatic ring and the heterocyclic aromatic ring include groups derived from monocycles or condensed rings, such as a benzene ring, a pyridine ring, a pyrazine ring, a pyrimidine ring, a pyridazine ring, a triazine ring, a furan ring, a pyrrole ring, an imidazole ring, a thiophene ring, a phosphole ring, a pyrazole ring, an oxazole ring, an isoxazol ring, a thiazole ring, a benzofuran ring, an isobenzofuran ring, an indole ring, an isoindole ring, a benzothiophene ring, a benzimidazole ring, a purine ring, a benzoxazole ring, a benzoisoxazol ring, a benzothiazole ring, a benzoisothiazole ring, a silole ring, a naphthalene ring, a pentalene ring, a quinoline ring, an isoquinoline ring, a quinoxaline ring, a quinazoline ring, a cinnoline ring, an anthracene ring, a phenanthrene ring, a tetracene ring, a chrysene ring, a triphenylene ring, a pyrene ring, an acridine ring, a perylene ring, a benzopyrene ring, a fluoranthene ring, a fluorene ring, a biphenylene ring, a carbazole ring, a benzimidazole ring, a benzimidazolinone ring, a benzocyclopentene ring, a benzocyclohexene ring, a benzocycloheptene ring, a benzocyclooctene ring, a 1,3-benzocyclohexadiene ring and a julolidine ring.

Ring B and ring D are independently 1,4-cyclohexylene, 1,4-phenylene, 1,4-phenylene in which at least one of hydrogen is replaced by fluorine or chlorine, or tetrahydropyran-2,5-diyl. Two of arbitrary ring B when s is 2 or 3 may be identical or different. Tetrahydropyran-2,5-diyl includes:

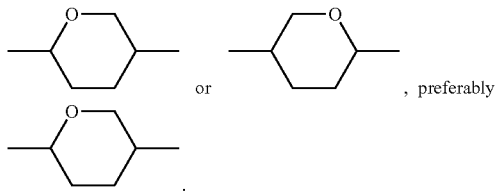

Tetrahydropyran-2,5-diyl is right-left asymmetrical. However, a definition is made that the rings are allowed to be positioned not only in a defined direction but also in right-left opposite directions as described above. The definition also applies to any other ring in which only one direction is defined in a right-left asymmetrical ring.

Ring C is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl, and two of arbitrary ring B when s is 2 or 3 may be identical or different. Preferred ring B or ring D is 1,4-cyclohexylene for decreasing the viscosity. Preferred ring C is 2,3-difluoro-1,4-phenylene for decreasing the viscosity and increasing the absolute value of dielectric anisotropy.

Ring E and ring F are independently 1,4-cyclohexylene, 1,4-phenylene, 2-fluoro-1,4-phenylene or 3-fluoro-1,4-phenylene, and two of arbitrary ring E when u is 2 or 3 may be identical or different. Preferred ring E or ring F is 1,4-cyclohexylene for decreasing the viscosity, and 1,4-phenylene for increasing the optical anisotropy. With regard to a configuration of 1,4-cyclohexylene, trans is preferred to cis for increasing the maximum temperature. Then, "2-fluoro-1,4-phenylene" or the like is expressed using a ring in which a left-hand side is taken as a 1-position, and "2-fluoro-1,4-phenylene" and "3-fluoro-1,4-phenylene" indicate a difference in positions of fluorine.

$Z^1$ is $-CO-CR^1=CR^2-$, $-CR^1=CR^2-CO-$, $-CR^1=CR^2-$, $-C(=CR^1R^2)-$ or $-C(=CR^3)-$. $Z^2$ is independently $-CO-CR^1=CR^2-$, $-CR^1=CR^2-CO-$, $-CR^1=CR^2-$, $-C(=CR^1R^2)-$ or $-C(=CR^3)-$. Two of arbitrary $Z^2$ when $m_2$ is 2 or 3 may be identical or different. Preferred $Z^1$ or $Z^2$ is $-CO-CR^1=CR^2-$, $-CR^1=CR^2-CO-$, $-CR^1=CR^2-$, $-C(=CR^1R^2)-$ or $-C(=CR^3)-$ for increasing polymerization reactivity of the polymerizable compound and obtaining characteristics of reducing a device response time.

$Z^1$ and $Z^2$ are a bonding group of a type for connecting conjugated systems of conjugate rings with each other. A configuration of a double bond in $Z^1$ and $Z^2$ of compound (1) is a cis isomer, a trans isomer or a mixture of the cis isomer and the trans isomer. With regard to a configuration of a double bond of a bonding group in compound (1-1), compound (1-2), compound (1-3), compound (1-4) and so forth, a similar description is applied.

$Z^3$, $Z^4$ and $Z^5$ are independently a single bond, ethylene, methyleneoxy or carbonyloxy, two of arbitrary $Z^3$ when s is 2 or 3 may be identical or different, and two of arbitrary $Z^5$ when u is 2 or 3 may be identical or different. Preferred $Z^3$ or $Z^4$ is a single bond for decreasing the viscosity, and methyleneoxy for increasing the absolute value of dielectric anisotropy. Preferred $Z^5$ is a single bond for decreasing the viscosity.

L is independently halogen, $-CF_3$, $-C\equiv N$ or alkyl having 1 to 6 carbons. $L^1$ and $L^2$ are independently halogen or alkyl having 1 to 3 carbons. Preferred L, $L^1$ or $L^2$ is fluorine or alkyl having 1 to 3 carbons. Specific examples of alkyl of L include an aliphatic hydrocarbon group such as methyl, ethyl, propyl, isopropyl, s-butyl, t-butyl, pentyl and hexyl, and an alicyclic hydrocarbon group such as cyclopropyl, cyclobutyl, cyclopentyl and cyclohexyl.

$X^1$ is independently halogen, alkyl having 1 to 6 carbons or fluoroalkyl. $X^2$ is independently halogen or alkyl having 1 to 3 carbons. Preferred $X^1$ and $X^2$ are fluorine or alkyl having 1 to 3 carbons.

$Y^1$, $Y^4$ and $Y^7$ are independently hydrogen, $-CH_3$, $-C_2H_5$, halogen, $-CF_3$ or $-C\equiv N$, and $Y^2$, $Y^3$, $Y^5$ $Y^6$, $Y^8$ and $Y^9$ are each independently hydrogen, $-CH_3$, $-C_2H_5$ or halogen. Preferred $Y^1$, $Y^4$ or $Y^7$ is hydrogen or $-CH_3$, and preferred $Y^2$, $Y^3$, $Y^5$, $Y^6$, $Y^8$ or $Y^9$ is hydrogen.

$P^1$ and $P^2$ are a polymerizable functional group, and are independently a group selected from the group of groups represented by formula (P-1) to formula (P-11). Preferred $P^1$ or $P^2$ is acryloyl or methacryloyl for increasing the photoreactivity. Two of arbitrary $P^1$ when $m_1$ is 2 or more may be identical or different, and two of arbitrary $P^2$ when $m_3$ is 2 or more may be identical or different.

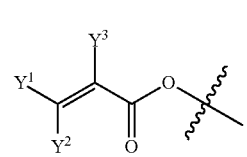

(P-1)

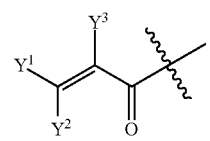

(P-2)

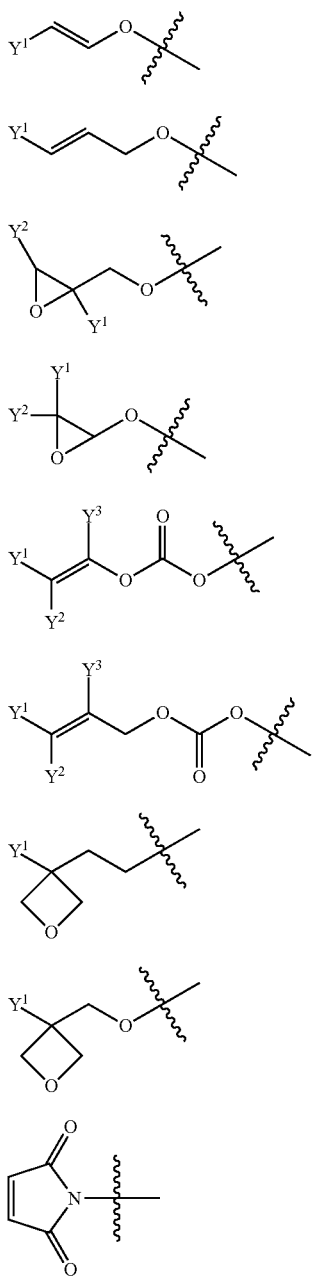

A wavy line in formula (P-1) to (P-10) represents a part to be bonded as a group.

$Sp^1$ and $Sp^2$ are a spacer group, and independently a single bond or alkylene having 1 to 6 carbons, however, may be replaced by halogen or —C≡N, and at least one of non-adjacent —CH$_2$— may be replaced by —O—, —S—, —NH—, —CO—, —CO—O—, —O—CO—, —O—CO—O—, —CH=CH— or —C≡C—. Two of arbitrary $Sp^1$ when $m_1$ is 2 or more may be identical or different, and two of arbitrary $Sp^2$ when $m_3$ is 2 or more may be identical or different. The spacer group is already well known to persons skilled in the art, and is described in literatures such as Tschierske, C. et al., Angew. Chem, Vol. 116, 6340, 2004. Preferred $Sp^1$ or $Sp^2$ is a single bond for increasing the photoreactivity.

Then, $m_1$ and $m_3$ are an integer from 0 to 5, and a sum of $m_1$ and $m_3$ is an integer from 1 to 10. Further, $m_4$ and $m_5$ are an integer from 0 to 5, and a sum of $m_4$ and $m_5$ is an integer from 3 to 10. Preferred $m_1$, $m_3$, $m_4$ or $m_5$ is an integer from 1 to 3 for increasing the photoreactivity, and a preferred sum of $m_1$ and $m_3$ or sum of $m_4$ and $m_5$ is 3 or 4 for increasing the photoreactivity.

Then, $m_2$ is an integer from 0 to 4. Preferred $m_2$ is 0 for increasing the photoreactivity.

Further, $m_6$ and $m_7$ are an integer from 0 to 5. Preferred $m_6$ or $m_7$ is an integer from 0 to 2 for increasing the photoreactivity. Further preferred $m_6$ or $m_7$ is 0.

Then, $n^1$ is an integer from 1 to 8. Further, $n^2$ is an integer from 1 to 4. Preferred $n^1$ or $n^2$ is 1 or 2 for increasing the photoreactivity.

Then, p is an integer from 0 to 4. Further, r is an integer from 0 to 3. Preferred p or r is an integer from 0 to 2 for increasing the photoreactivity. Further preferred p or r is 0.

Then, s is 1, 2 or 3, t is 0 or 1, and a sum of s and t is 3 or less. Preferred s is 1 for decreasing the minimum temperature. Preferred t is 0 for decreasing the viscosity.

Further, u is 1, 2 or 3. Preferred u is 1 for decreasing the viscosity, and 3 for increasing the maximum temperature.

Compound (1) can form a homopolymer or copolymer by homopolymerization or copolymerization with any other polymerizable compound.

Fifth, the specific examples of the component compounds will be shown. In the preferred compounds described below, $R^{10}$ is straight-chain alkyl having 1 to 12 carbons of shape, or straight-chain alkoxy having 1 to 12 carbons. $R^1$ and $R^{12}$ are independently straight-chain alkyl having 1 to 12 carbons or straight-chain alkenyl having 1 to 12 carbons.

Preferred compound (1) includes compound (1-1-1-1), compound (1-1-2-1), compound (1-2-1-1), compound (1-2-2-1), compound (1-4-1-1), and compound (1-4-2-1). Further preferred compound (1) includes compound (1-1-1-1) and compound (1-1-2-1). Preferred compound (2) includes compound (2-1-1) to compound (2-19-1). Further preferred compound (2) includes compound (2-1-1), compound (2-2-1), compound (2-4-1), compound (2-6-1), compound (2-8-1), compound (2-11-1) and compound (2-13-1). Particularly preferred compound (2) includes compound (2-1-1), compound (2-4-1), compound (2-6-1), compound (2-8-1) and compound (2-13-1). Preferred compound (3) includes compound (3-1-1) to compound (3-13-1). Further preferred compound (3) includes compound (3-1-1), compound (3-3-1), compound (3-5-1), compound (3-7-1) and compound (3-9-1). Particularly preferred compound (3) includes compound (3-1-1), compound (3-5-1) and compound (3-7-1).

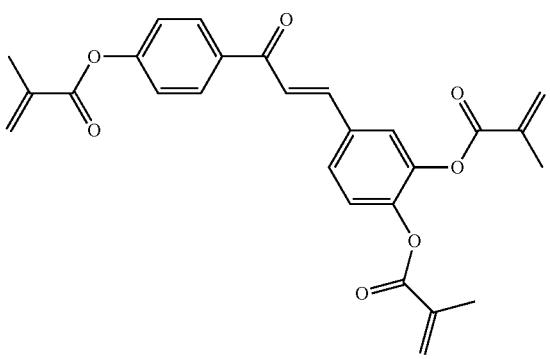

(1-1-1-1)

(1-1-2-1)
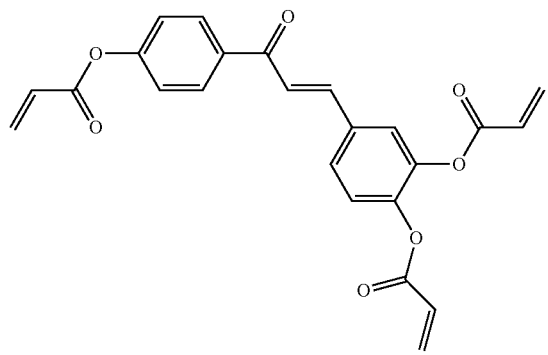
(1-2-1-1)
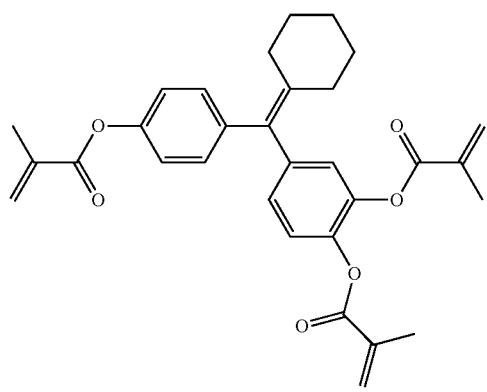
(1-2-2-1)
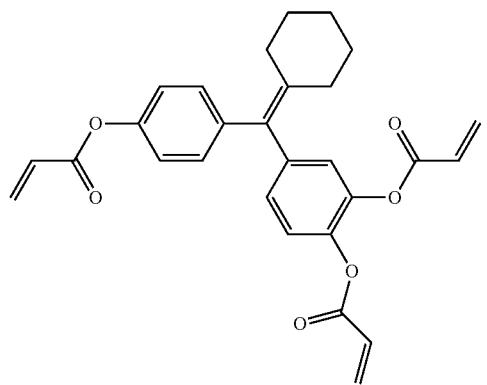
(1-4-1-1)
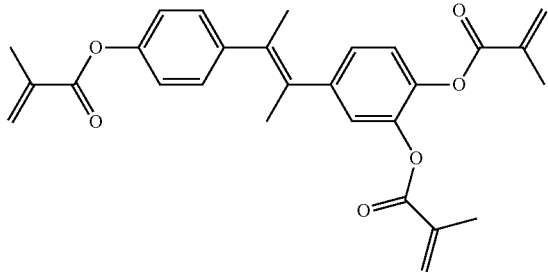
(1-4-2-1)
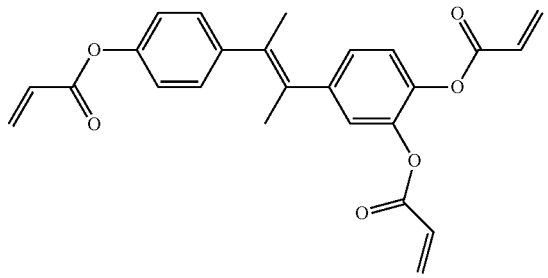
(2-1-1)
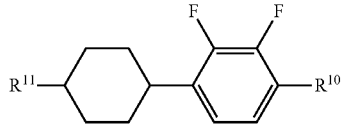
(2-2-1)
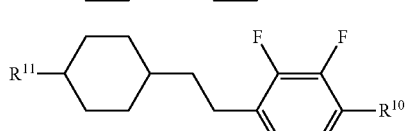
(2-3-1)
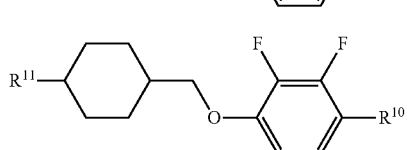
(2-4-1)
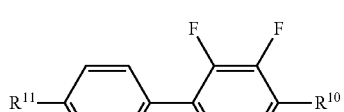
(2-5-1)
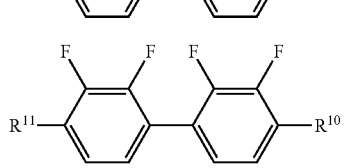
(2-6-1)
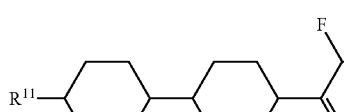
(2-7-1)
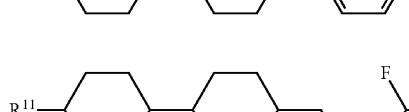
(2-8-1)
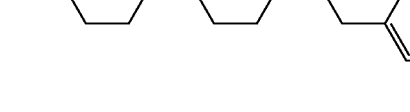
(2-9-1)
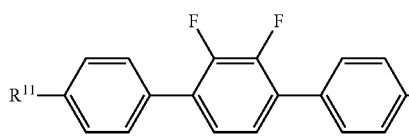

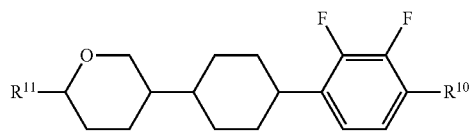
(2-10-1)
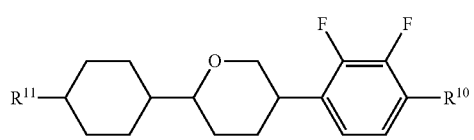
(2-11-1)
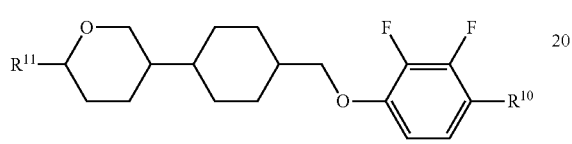
(2-12-1)
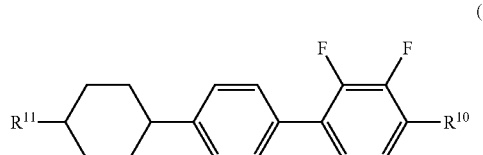
(2-13-1)
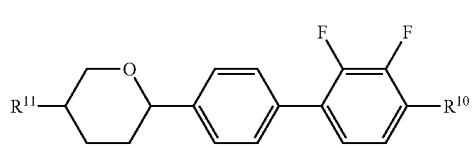
(2-14-1)
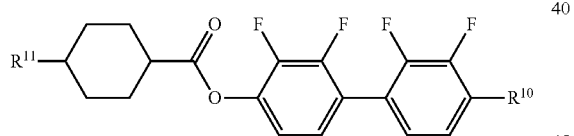
(2-15-1)
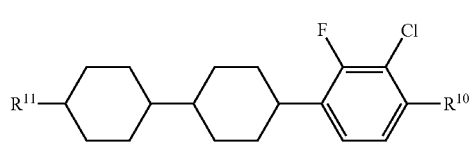
(2-16-1)
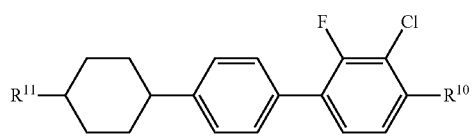
(2-17-1)
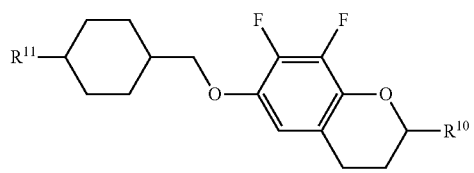
(2-18-1)
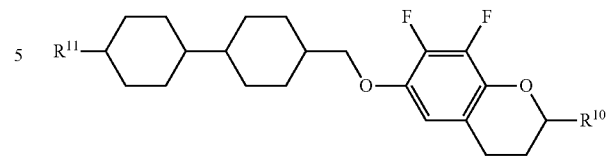
(2-19-1)
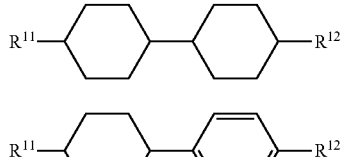
(3-1-1)
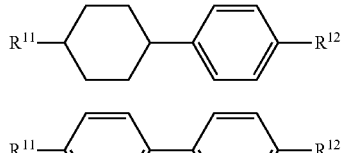
(3-2-1)
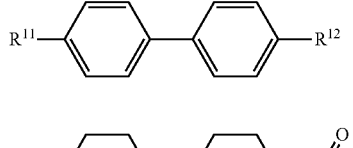
(3-3-1)
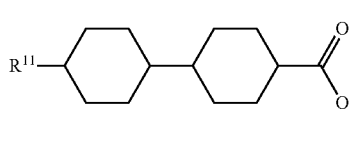
(3-4-1)
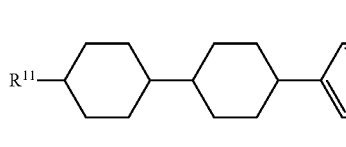
(3-5-1)
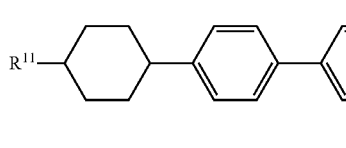
(3-6-1)
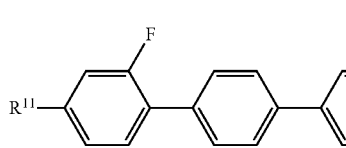
(3-7-1)
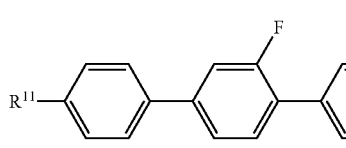
(3-8-1)
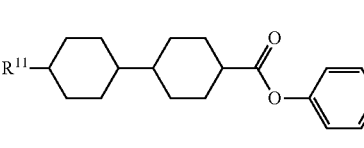
(3-9-1)
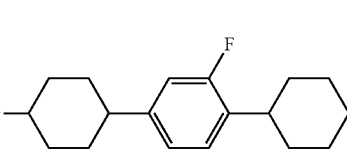
(3-10-1)
(3-11-1)

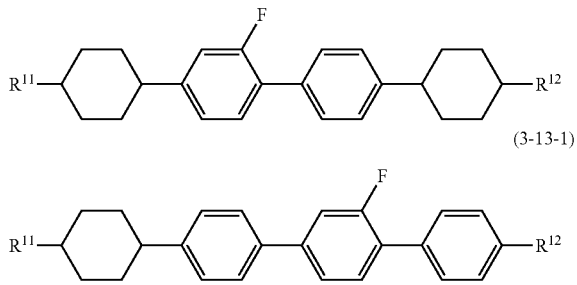

(3-12-1)

(3-13-1)

Sixth, the additive that may be mixed with the composition will be explained. Such an additive includes the optically active compound, the antioxidant, the ultraviolet light absorber, the dye, the antifoaming agent, the polymerization initiator and the polymerization inhibitor. The optically active compound is mixed with the composition for the purpose of inducing a helical structure in liquid crystals to give a twist angle. Examples of such a compound include compound (4-1) to compound (4-4). A preferred ratio of the optically active compound is about 5% by weight or less. A further preferred ratio is in the range of about 0.01% by weight to about 2% by weight.

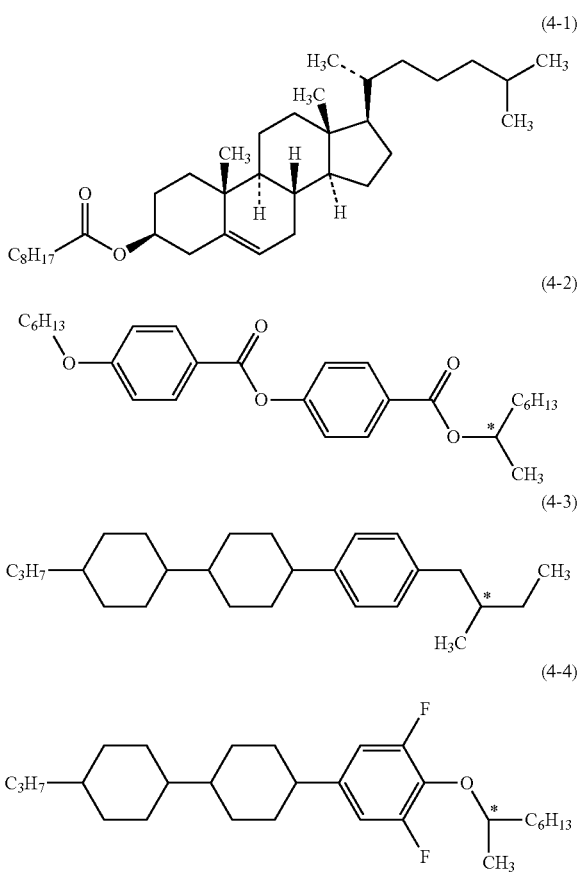

The antioxidant is mixed with the composition for the purpose of preventing a decrease in the specific resistance caused by heating in air, or maintaining a large voltage holding ratio at room temperature and also at a temperature close to the maximum temperature of the nematic phase after the device has been used for a long time.

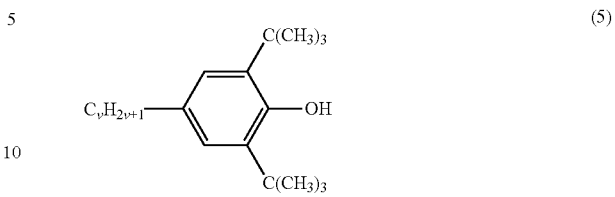

Preferred examples of the antioxidant include compound (5) where v is an integer from 1 to 9. In compound (5), preferred v is 1, 3, 5, 7 or 9. Further preferred v is 1 or 7. Compound (5) where v is 1 is effective in preventing a decrease in the specific resistance caused by heating in air because the compound (5) has a large volatility. Compound (5) where v is 7 is effective in maintaining a large voltage holding ratio at room temperature and also at a temperature close to the maximum temperature of the nematic phase even after the device has been used for a long period of time because the compound (5) has a small volatility. A preferred ratio of the antioxidant is about 50 ppm or more for achieving the effect thereof, and about 600 ppm or less for avoiding a decrease in the maximum temperature or avoiding an increase in the minimum temperature. A further preferred ratio is in the range of about 100 ppm to about 300 ppm.

Preferred examples of the ultraviolet light absorber include a benzophenone derivative, a benzoate derivative and a triazole derivative. A light stabilizer such as an amine having steric hindrance is also preferred. A preferred ratio of the ultraviolet light absorber or the stabilizer is about 50 ppm or more for achieving the effect thereof, and about 10,000 ppm or less for avoiding a decrease in the maximum temperature or avoiding an increase in the minimum temperature. A further preferred ratio is in the range of about 100 ppm to about 10,000 ppm.

A dichroic dye such as an azo dye or an anthraquinone dye is mixed with the composition to be adapted for a device having a guest host (GH) mode. A preferred ratio of the dye is in the range of about 0.01% by weight to about 10% by weight.

The antifoaming agent such as dimethyl silicone oil or methyl phenyl silicone oil is mixed with the composition for preventing foam formation. A preferred ratio of the antifoaming agent is about 1 ppm or more for achieving the effect thereof, and about 1,000 ppm or less for avoiding a poor display. A further preferred ratio is in the range of about 1 ppm to about 500 ppm.

The liquid crystal composition of the invention includes the polymerizable compound, and therefore the composition is suitable for a device having the polymer sustained alignment (PSA) mode. The composition may further contain a polymerizable compound other than compound (1). Preferred examples of the polymerizable compound include a compound having a polymerizable group, such as an acrylate, a methacrylate, a vinyl compound, a vinyloxy compound, a propenyl ether, an epoxy compound (oxirane, oxetane) and a vinyl ketone. Particularly preferred examples include an acrylate derivative or a methacrylate derivative. A preferred ratio of the polymerizable compound is about 0.05% by weight or more for achieving the effect thereof, and about 10% by weight or less for avoiding a poor display. A further preferred ratio is in the range of about 0.1% by weight to about 2% by weight. The polymerizable compound is preferably polymerized by irradiation with ultraviolet light or the like in the presence of a suitable initiator such as a photopolymerization initiator. Suitable conditions for polymerization, suitable types of the initiator and suitable amounts thereof are known to persons skilled in the art and are described in literatures. For example, Irgacure 651 (registered trademark; BASF), Irgacure 184 (registered trademark; BASF) or Darocure 1173 (registered trademark; BASF), each being the photopolymerization initiator, is suitable for radical polymerization. A preferred ratio of the photopolymerization initiator is in the range of about 0.1% by weight to about 5% by weight of the polymerizable compound, and a further preferred ratio is in the range of about 1% by weight to about 3% by weight. A polymerized compound may be arranged through a process of arranging the liquid crystal composition containing the polymerizable compound between two substrates in the liquid crystal display device and polymerizing the polymerizable compound while applying a voltage between opposite electrode layers on the substrates, or a liquid crystal composition containing a preliminarily polymerized compound may be arranged between the two substrates in the liquid crystal display device.

Seventh, the methods for synthesizing the first component compounds will be explained. The first component compound can be prepared by suitably combining procedures described in books such as Organic Syntheses (John Wiley & Sons, Inc.), Organic Reactions (John Wiley & Sons, Inc.), Comprehensive Organic Synthesis (Pergamon Press) and New Experimental Chemistry Course (Shin Jikken Kagaku Koza in Japanese) (Maruzen Co., Ltd.).

For example, compound (1-1) of the invention can be prepared by the known organic synthesis methods described below. In schemes described below, $R^4$, $R^5$, $L^1$, $L^2$, $Y^4$, $Y^5$, $Y^6$, $Y^7$, $Y^8$, $Y^9$, $m_4$, $m_5$, $m_6$ and $m_7$ are defined in a manner identical with the definitions described in the item 3 described above. According to a technique of the method of Miyashita et al. (Miyashita, M. et al., J. Org. Chem., Vol. 42, 3772, 1977), compound (b) is obtained by allowing 3,4-dihydro-2H-piran (DHP) to act on compound (a) in the presence of pyridinium p-toluene sulfonate (PPTS). According to a technique of the method of Miyashita et al. (Miyashita, M. et al., J. Org. Chem., Vol. 42, 3772, 1977), compound (d) is obtained by allowing DHP to act on compound (c) in the presence of PPTS. Then, compound (e) is obtained from compound (b) and compound (d) by an Aldol condensation reaction of the method of Chimenti et al. (Chimenti, F. et al., J. Med. Chem., Vol. 52, 2818, 2009, Idem., Eur. J. Med. Chem., Vol. 43, 2262, 2008), and then compound (f) is obtained by deprotecting compound (e) by the method of Brenady et al. (K. F. et al., J. Org. Chem., Vol. 44, 1438, 1979). Next, in accordance with the method of Olsen et al. (Olsen, R. K et al., J. Org. Chem., Vol. 60, 6025, 1995), compound (1-1) can be obtained by dehydration condensation of compound (g) and/or compound (h) with compound (f) in the presence of 4-dimethylaminopyridine (DMAP) and 1,3-dicyclohexylcarbodiimide (DCC).

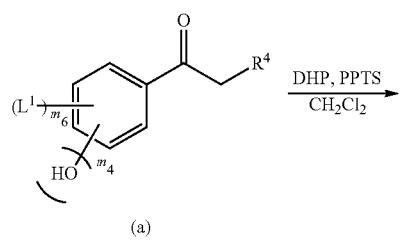

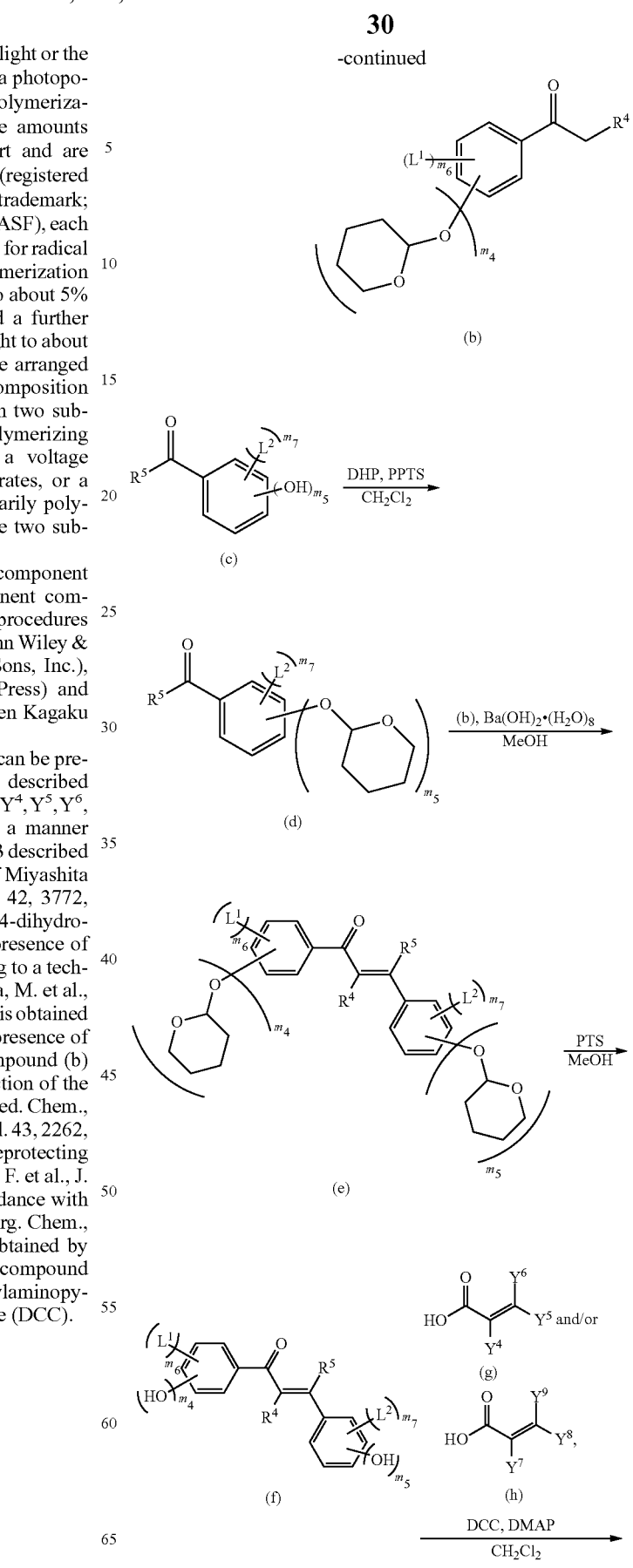

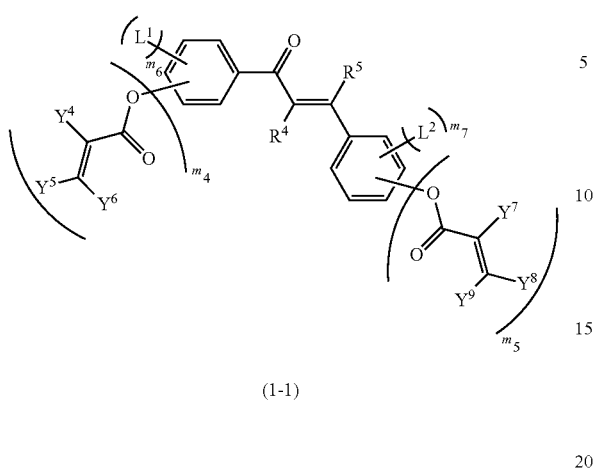

(1-1)

For example, compound (1-2) can be prepared according to the known organic synthesis methods described below. In schemes describe below, $L^1$, $L^2$, $X^2$, $Y^4$, $Y^5$, $Y^6$, $Y^7$, $Y^8$, $Y^9$, r, $m_4$, $m_5$, $m_6$, $m_7$ and $n_2$ are defined in a manner identical with the definitions described in the item 3 described above. Compound (k) is obtained according to a Friedel-Crafts reaction of compound (i) and compound (j) in the method of Leiserson et al. (Leiserson, J. L. et al., Org. Synth. III, 183, 1955). Compound (m) is obtained according to a reaction between compound (1) and compound (k) in the presence of zinc and titanium tetrachloride in accordance with the method of Duan et al. (Duan, X-F. et al., J. Org. Chem., Vol. 71, 9873, 2006), and then compound (n) is obtained by deprotection in accordance with the method of McOmie et al. (McOmie, J. F. W. et al., Tetraheron, Vol. 24, 2289, 1968). Compound (1-2) can be obtained according to dehydration condensation of compound (g) or/and compound (h) with compound (n) in the presence of 4-dimethylaminopyridine (DMAP) and 1,3-dicyclohexylcarbodiimide (DCC) in accordance with the method of Olsen et al. (Olsen, R. K. et al., J. Org. Chem., Vol. 60, 6025, 1995).

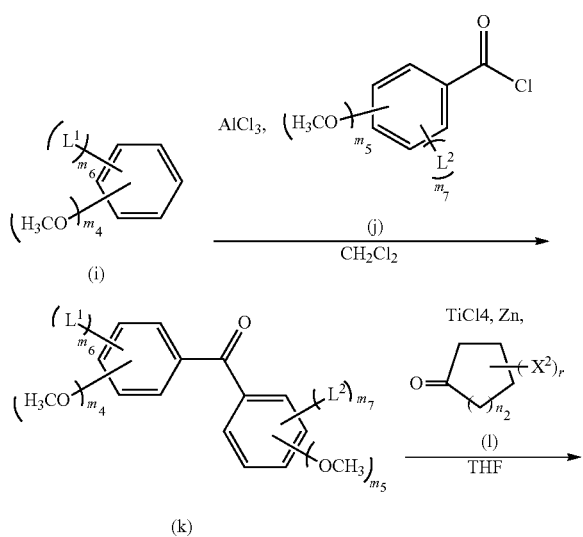

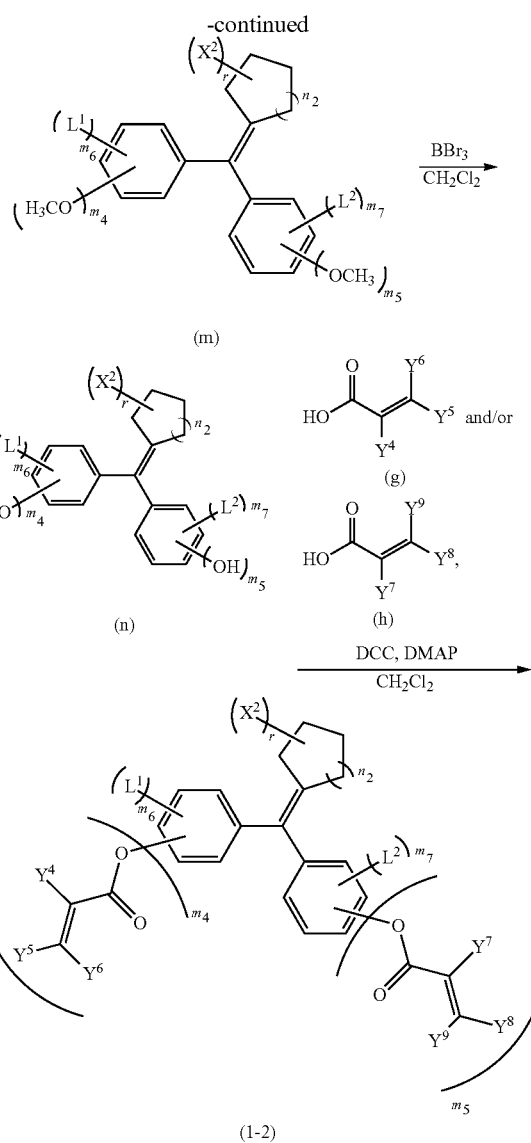

(1-2)

For example, compound (1-3) can be prepared by changing compound (1) of the method of synthesizing the compound (1-2) to compound (o). In the formulas described below, $R^4$, $R^5$, $L^1$, $L^2$, $Y^4$, $Y^5$, $Y^6$, $Y^7$, $Y^8$, $Y^9$, $m_4$, $m_5$, $m_6$ and $m_7$ are defined in a manner identical with the definitions described in the item 3 described above.

(1-3)

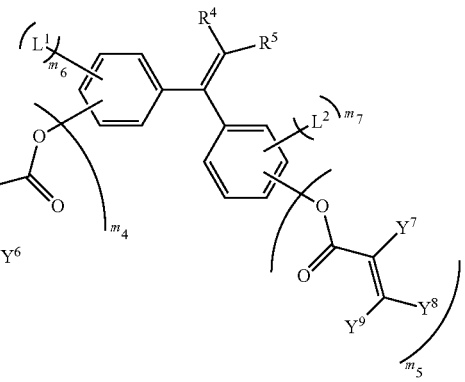

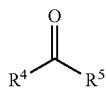
(o)

For example, compound (1-4) can be prepared according to the known organic synthesis method described below. In schemes described below, $R^4$, $R^5$, $L^1$, $L^2$, $Y^4$, $Y^5$, $Y^6$, $Y^7$, $Y^8$, $Y^9$, $m_4$, $m_5$, $m_6$ and $m_7$ are defined in a manner identical with the definitions described in the item 3 described above. Compound (r) is obtained according to a condensation reaction of compound (p) and compound (q) according to the method of Drapo et al. (Drapo, J. R. et al., Syn. Comm., Vol. 39, 85, 2009), and then compound (s) is obtained by deprotection according to the method of McOmie et al. (McOmie, J. F. W. et al., Tetrahedron, Vol. 24, 2289, 1968). Compound (1-4) can be obtained by dehydration condensation of compound (g) or/and compound (h) with compound (s) in the presence of 4-dimethylamino pyridine (DMAP) and 1,3-dicyclohexyl-carbodiimide (DCC) in accordance with the method of Olsen et al. (Olsen, R. K. et al., J. Org. Chem., Vol. 60, 6025, 1995).

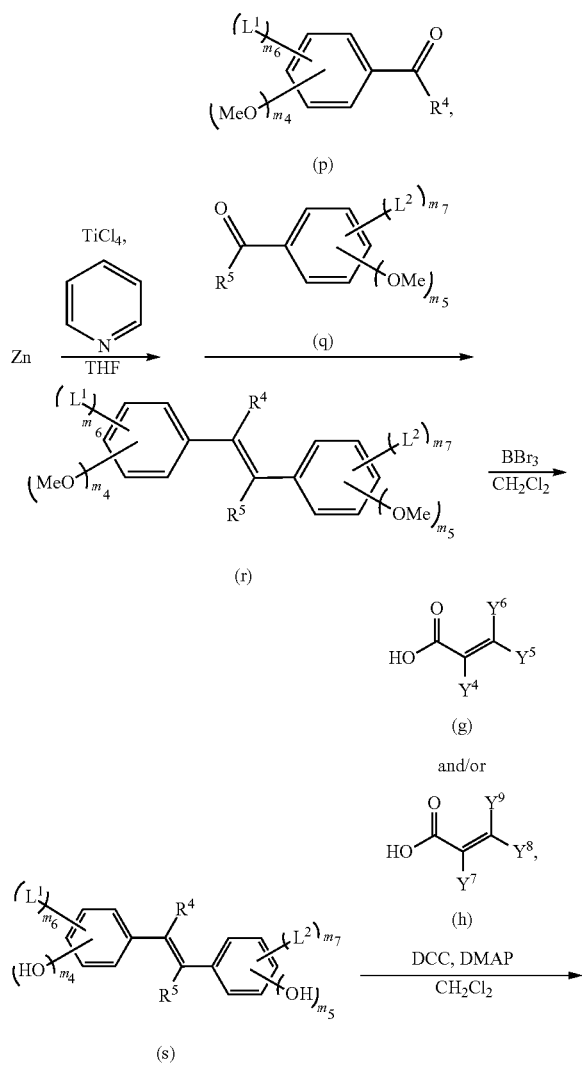

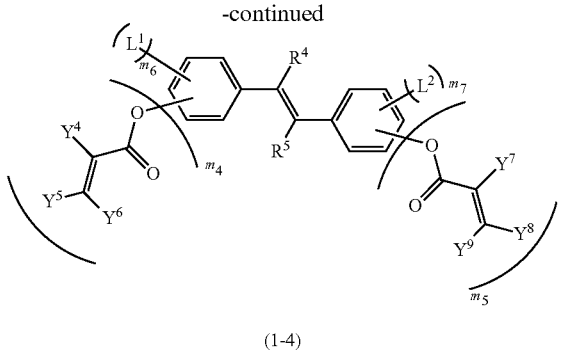
(1-4)

Next, the methods for synthesizing any other liquid crystal compound contained in the liquid crystal composition will be explained. The compounds can be prepared according to known methods. Examples of synthetic methods will be shown. Compound (2-1-1) is prepared according to the method described in JP 2000-053602 A. Compound (3-1-1) and compound (3-5-1) are prepared according to the method described in JP S59-176221 A. The antioxidant is commercially available. A compound represented by formula (5) where v is 1 is available from Sigma-Aldrich Corporation. Compound (5) where v is 7 and so forth are prepared according to the method described in U.S. Pat. No. 3,660,505 B.

Any compounds whose synthetic methods are not described above can be prepared according to the methods described in books such as Organic Syntheses (John Wiley & Sons, Inc.), Organic Reactions (John Wiley & Sons, Inc.), Comprehensive Organic Synthesis (Pergamon Press) and New Experimental Chemistry Course (Shin Jikken Kagaku Koza in Japanese) (Maruzen Co., Ltd.). The composition is prepared according to a known method from the thus obtained compound. For example, the component compounds are mixed and dissolved in each other by heating.

Last, the application of the composition will be explained. Most of the compositions have a minimum temperature of about −10° C. or lower, a maximum temperature of about 70° C. or higher, and an optical anisotropy in the range of about 0.07 to about 0.20. The device including the composition has a large voltage holding ratio. The composition is suitable for use in the AM device. The composition is particularly suitable for use in a transmissive AM device. The composition having an optical anisotropy in the range of about 0.08 to about 0.25 may be prepared by controlling the ratio of the component compounds or by mixing with any other liquid crystal compound. The composition can be used as the composition having the nematic phase and as the optically active composition by adding the optically active compound.

The composition can be used for the AM device. The composition can also be used for a PM device. The composition can also be used for an AM device and a PM device having a mode such as PC, TN, STN, ECB, OCB, IPS, VA or PSA. Use for the AM device having the PSA mode is particularly preferred. The devices may be of a reflective type, a transmissive type or a transflective type. Use for the transmissive device is preferred. The composition can also be used for an amorphous silicon-TFT device or a polycrystal silicon-TFT device. The composition can also be used for a nematic curvilinear aligned phase (NCAP) device prepared by microencapsulating the composition, and for a polymer dispersed (PD) device in which a three-dimensional network-polymer is formed in the composition.

The liquid crystal display device of the invention is characterized by comprising two substrates having the electrode layer on at least one of the substrates, and arranging between the two substrates the liquid crystal composition of the invention or the liquid crystal composition containing the compound formed by polymerizing the compound of the invention. For example, the liquid crystal display device comprises two glass substrates referred to as an array substrate and a color filter substrate, and a thin film transistor (TFT), pixels, a coloring layer and so forth are formed on each of the glass substrates. An aluminosilicate glass or aluminoborosilicate glass is used for each of the glass substrate, for example. For the electrode layer, Indium-Tin Oxide and Indium-Zinc Oxide are generally used.

EXAMPLES

Hereinafter, the invention will be explained in detail by way of Examples, but the invention is not limited by the Examples.

A compound obtained by synthesis was identified by proton nuclear magnetic resonance spectroscopy ($^1$H-NMR), high performance liquid chromatography (HPLC), ultraviolet/visible spectrophotometry (UV/Vis) or the like. A melting point of the compound was determined by differential scanning calorimetry (DSC). First, each analytical method will be explained.

$^1$H-NMR Analysis:

As a measuring apparatus, DRX-500 (made by Bruker BioSpin Corporation) was used. A sample prepared in Examples and so forth was dissolved in a deuterated solvent such as CDCl$_3$ in which the sample was soluble, and measurement was carried out under the conditions of room temperature, 500 MHz, 24 times of accumulation and so forth. In the explanation of nuclear magnetic resonance spectra obtained, s, d, t, q and m stand for a singlet, a doublet, a triplet, a quartet, and a multiplet, respectively. Moreover, tetramethylsilane (TMS) was used as an internal standard for a zero point of chemical shifts (6).

HPLC Analysis:

As a measuring apparatus, Prominence (LC-20AD; SPD-20A) made by Shimadzu Corporation was used. As a column, YMC-Pack ODS-A (length 150 mm, bore 4.6 mm, particle diameter 5 μm) made by YMC Co., Ltd. was used. As an eluate, acetonitrile/water (80/20 in a volume ratio) was used, and a flow rate was adjusted at 1 milliliter per minute. As a detector, a UV detector, an RI detector and a CORONA detector or the like was suitably used. When the UV detector was used, a detection wavelength was set at 254 nanometers.

A sample was dissolved in acetonitrile to prepare a solution of 0.1% by weight, and 1 microliter of the solution obtained was introduced into a sample injector.

As a recorder, C-R7Aplus made by Shimadzu Corporation was used. The chromatogram obtained shows a retention time of a peak and a value of each peak area corresponding to each component compound.

A ratio of peak areas in the chromatogram obtained from HPLC corresponds to a ratio of component compounds. In general, the weight percent of each component compound in an analytical sample is not completely identical with the percentage of each peak area in the analytical sample. When the columns described above are used in the invention, however, the weight percent of each component compound in the analytical sample corresponds substantially to the percentage of each peak area in the analytical sample because a correction coefficient is essentially 1 (one). The reason is that no significant difference exists among the correction coefficients of the component compounds. In order to more accurately determine a composition ratio of the liquid crystal compounds in the liquid crystal composition by the chromatogram, an internal standard method by the chromatogram is applied. Each component (test-component) of the liquid crystal compounds and a liquid crystal compound as a standard (standard reference material) as weighed accurately in a fixed amount are simultaneously analyzed by HPLC, and relative intensity is calculated in advance relative to a ratio of a peak area of the test-component to a peak area of the standard reference material. When corrected using the relative intensity of the peak area of each component to the peak area of the standard reference material, the composition ratio of the liquid crystal compounds in the liquid crystal composition can be more accurately determined from the chromatogram.

UV/Vis Analysis:

As a measuring apparatus, PharmaSpec UV-1700 made by Shimadzu Corporation was used. A detection wavelength was adjusted in a range from 190 nanometers to 700 nanometers. A sample was dissolved in acetonitrile and prepared to be a solution of 0.01 millimole per liter, and measurement was carried out by putting the solution in a quartz cell (optical path length 1 cm).

DSC Measurement:

A sample was heated and then cooled at a rate of 3° C. per minute using a differential scanning calorimeter, DSC-7 System or Diamond DSC System, made by PerkinElmer, Inc. A starting point (on set) of an endothermic peak or an exothermic peak caused by a phase change of the sample was determined by extrapolation, and thus a melting point was determined.

Example 1

Compound (1-1-1-1) was prepared according to the route described below.

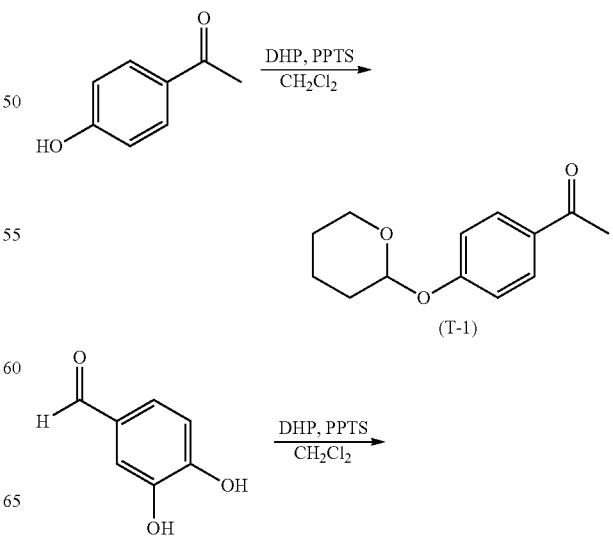

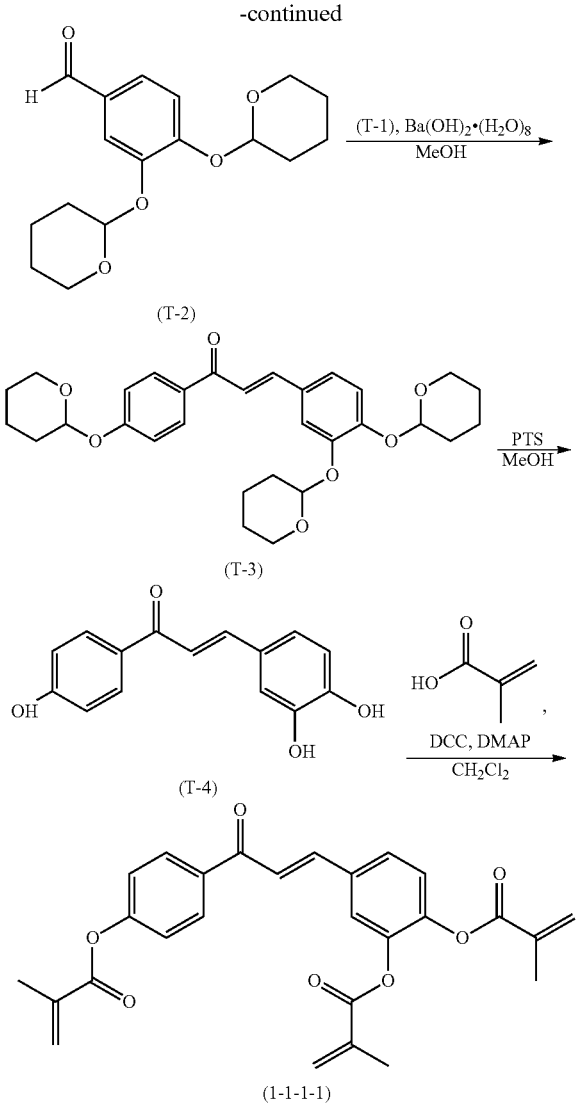

Third Step: Synthesis of Compound (T-3)

Under a nitrogen atmosphere, (T-1) (10.0 g), (T-2) (13.9 g), barium hydroxide octahydrate (14.3 g) and methanol (200 mL) were heated and stirred at 40° C. for 6 hours. A solvent of the reaction mixture was distilled off under reduced pressure, water was added to the residue, and the resulting mixture was neutralized with 1 M hydrochloric acid. An organic layer was extracted with ethyl acetate and, washed with water, and then dried over anhydrous magnesium sulfate. An organic solvent was distilled off under reduced pressure to quantitatively give compound (T-3) as an oily material.

Fourth Step: Synthesis of Compound (T-4)

Under a nitrogen atmosphere, (T-3) (24.0 g), p-toluenesulfonic acid monohydrate (PTS) (0.22 g) and methanol (200 mL) were stirred at room temperature for 16 hours. A solvent of the reaction mixture was distilled off under reduced pressure, water was added to the residue, and the resulting mixture was neutralized with a saturated sodium hydrogencarbonate aqueous solution. An organic layer was extracted with ethyl acetate, then washed with water, and then dried over anhydrous magnesium sulfate. An organic solvent was distilled off under reduced pressure, and then a residue was purified by silica gel column chromatography (eluent toluene:ethyl acetate=5:5 (volume ratio)) to give compound (T-4) as a yellow crystal (5.2 g).

Fifth Step: Synthesis of Compound (1-1-1-1)

Under a nitrogen atmosphere, a dichloromethane solution (30 mL) of 1,3-dicyclohexylcarbodiimide (DCC) (8.12 g) was added dropwise to a mixture of (T-4) (2.85 g), methacrylic acid (3.39 g), 4-dimethylaminopyridine (DMAP) (0.40 g) and dichloromethane (120 mL) under ice-cooling, and the resulting mixture was stirred for 15 hours. A precipitate in a reaction mixture was filtered off, and then an organic layer was washed with water, and dried over anhydrous magnesium sulfate. An organic solvent was distilled off under reduced pressure, a residue was purified by silica gel column chromatography (eluent toluene:ethyl acetate=9:1 (volume ratio)), and subjected to recrystallization in a mixed solvent of toluene and ethanol to give compound (1-1-1-1) as a pale-yellow crystal (1.84 g).

Melting point: 116° C.

$^1$H-NMR (CDCl$_3$; δ ppm): 8.08 (d, 2H), 7.79 (d, 1H), 7.57 (d, 1H), 7.55 (dd, 1H), 7.48 (d, 1H), 7.34 (d, 1H), 7.28 (d, 2H), 6.39 (s, 1H), 6.33 (s, 1H), 6.31 (s, 1H), 5.81 (t, 1H), 5.77 (t, 1H), 5.76 (t, 1H), 2.09 (s, 3H), 2.03 (s, 3H), 2.02 (s, 3H).

Example 2

Compound (1-1-2-1) was prepared according to the route described below.

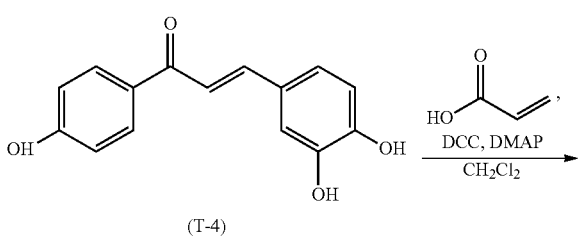

First Step: Synthesis of Compound (T-1)

Under a nitrogen atmosphere, a dichloromethane (20 mL) solution of 3,4-dihydro-2H-piran (DHP) (18.5 g) was added dropwise to a mixture of p-acetophenol (10.0 g), pyridinium p-toluene sulfonate (PPTS) (0.44 g) and dichloromethane (300 mL) under ice-cooling. After completion of dropwise addition, the resulting mixture was stirred at room temperature for 16 hours. The reaction mixture was washed with water and then dried over anhydrous magnesium sulfate, and the solvent was distilled off under reduced pressure to quantitatively give compound (T-1) as a colorless crystal.

Second Step: Synthesis of Compound (T-2)

Under a nitrogen atmosphere, a dichloromethane solution (20 mL) of DHP (36.5 g) was added dropwise to a mixture of 3,4-dihydroxybenzaldehyde (10.0 g), PPTS (0.87 g) and dichloromethane (300 mL) under ice-cooling. After completion of dropwise addition, the resulting mixture was stirred at room temperature for 16 hours. The reaction mixture was washed with water and then dried over anhydrous magnesium sulfate, and the solvent was distilled off under reduced pressure to quantitatively give compound (T-2) as an oily material.

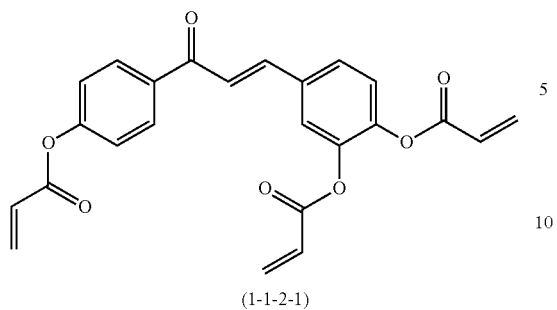

(1-1-2-1)

First Step: Synthesis of Compound (1-1-2-1)

Compound (1-1-2-1) was obtained as a pale yellow crystal (1.82 g) by performing synthesis in a manner similar to the operations in Fifth step in Example 1 except that methacrylic acid was changed to acrylic acid (4.05 g).

Melting point: 160° C.

$^1$H-NMR (CDCl$_3$; δ ppm): 8.08 (d, 2H), 7.78 (d, 1H), 7.56-7.55 (m, 2H), 7.47 (d, 1H), 7.34 (d, 1H), 7.30 (d, 2H), 6.67-6.58 (m, 3H), 6.38-6.25 (m, 3H), 6.09-6.03 (m, 3H).

Example 3

In accordance with the method in Example 1 and Example 2, compound (1-1-1-1) to compound (1-1-1-12), compound (1-1-2-1) to compound (1-1-2-12), compound (1-1-3-1), compound (1-1-4-1) and compound (1-1-4-2) are manufactured. Compound (1-1-1-1) shown in Example 1 and compound (1-1-2-1) shown Example 2 are also presented again.

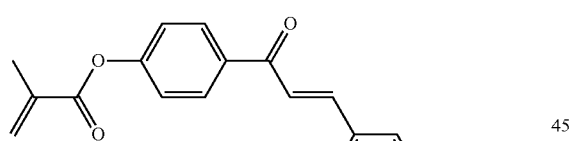

(1-1-1-1)

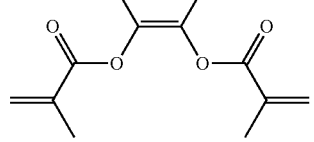

(1-1-1-2)

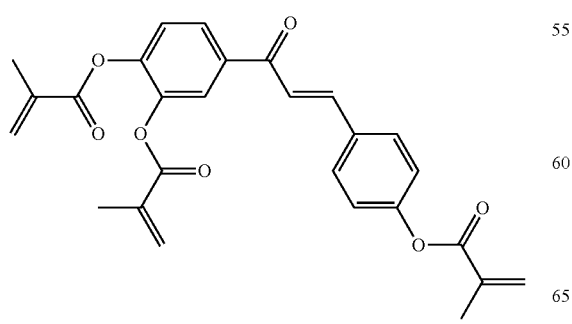

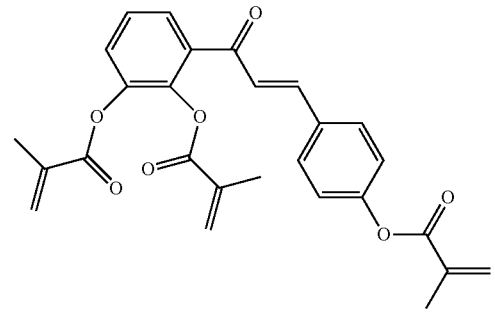

(1-1-1-3)

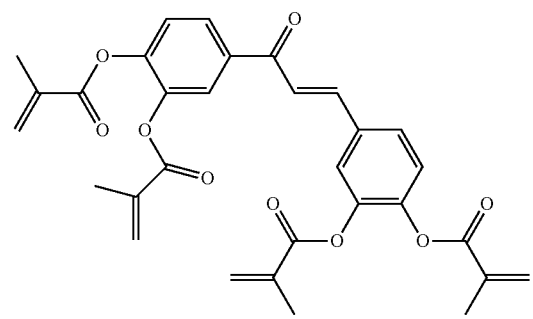

(1-1-1-4)

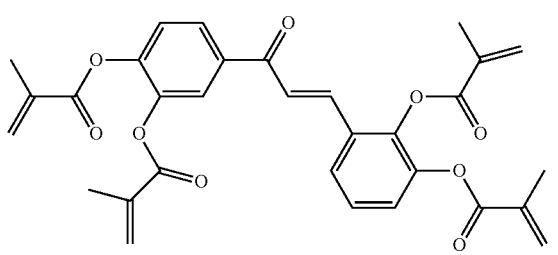

(1-1-1-5)

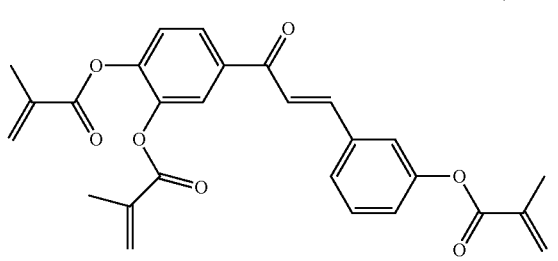

(1-1-1-6)

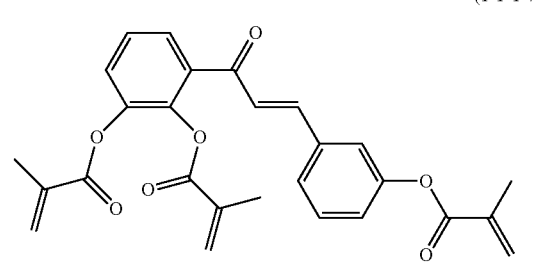

(1-1-1-7)

(1-1-1-8)
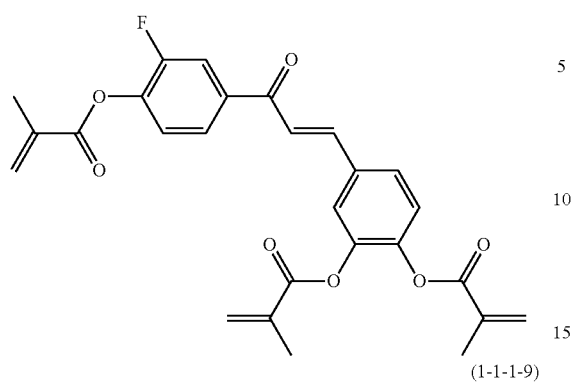
(1-1-2-1)
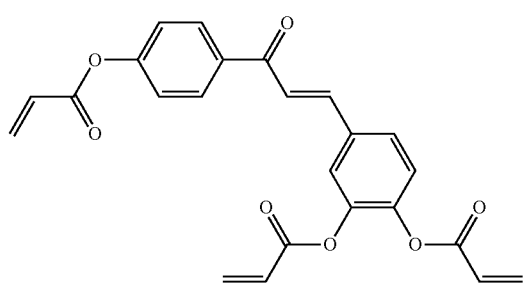
(1-1-1-9)
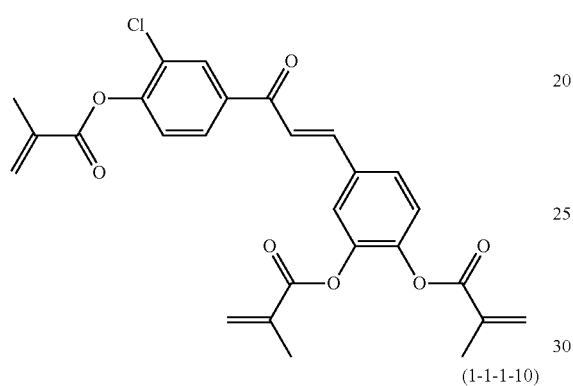
(1-1-2-2)
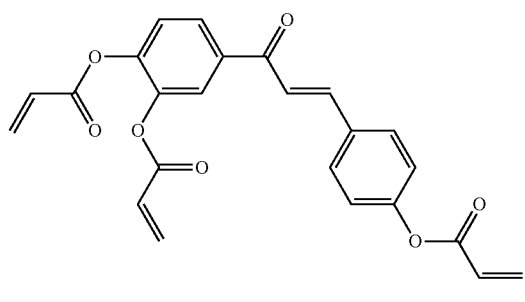
(1-1-1-10)
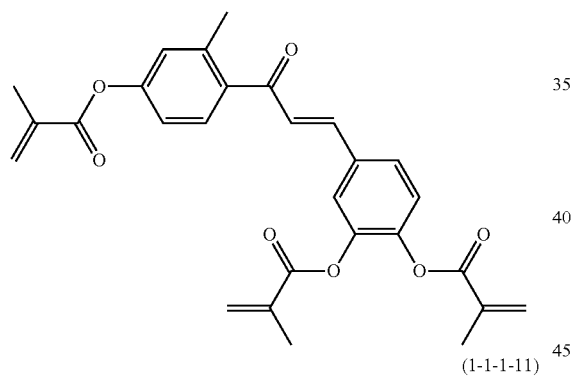
(1-1-2-3)
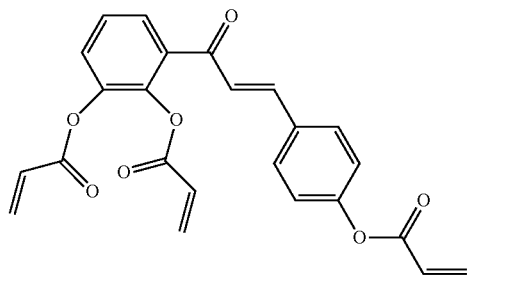
(1-1-1-11)
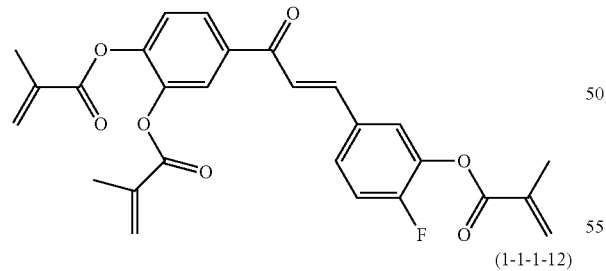
(1-1-2-4)
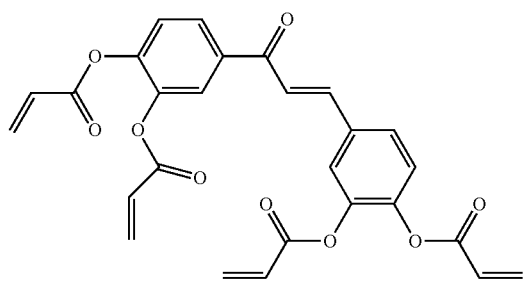
(1-1-1-12)
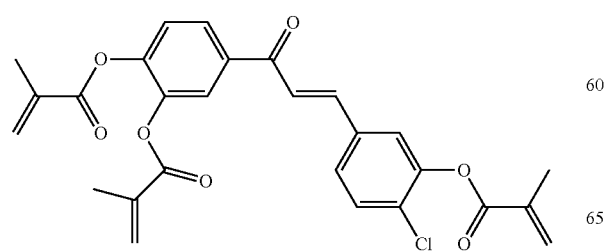
(1-1-2-5)
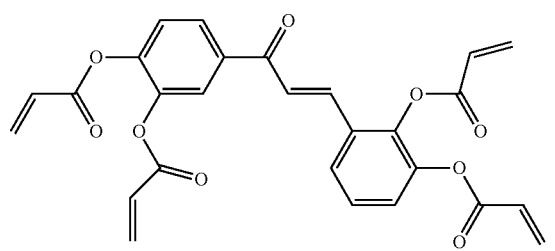

(1-1-2-6)
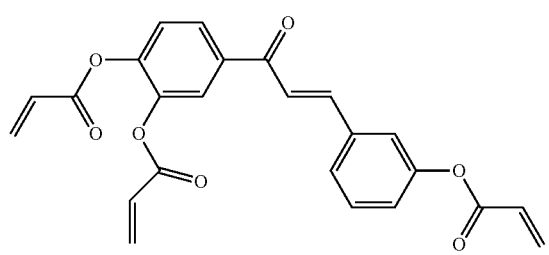
(1-1-2-7)
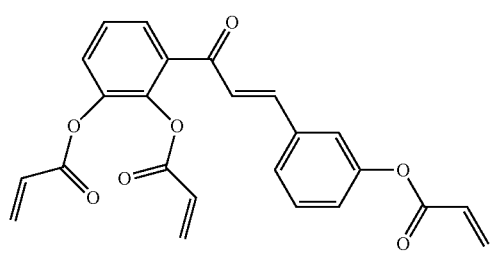
(1-1-2-8)
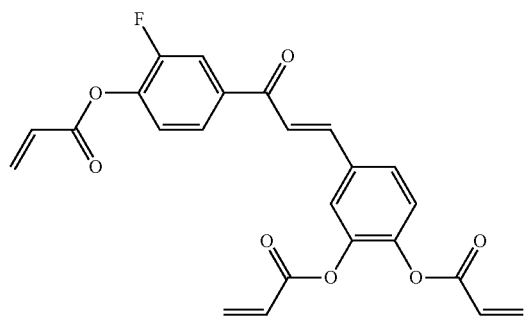
(1-1-2-9)
(1-1-2-10)
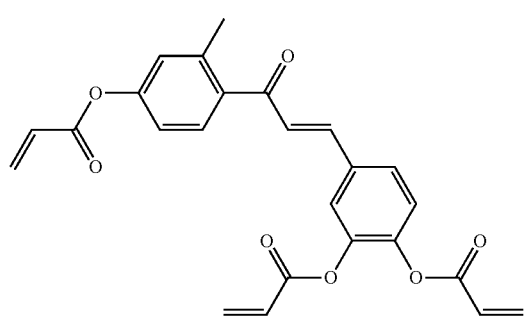
(1-1-2-11)
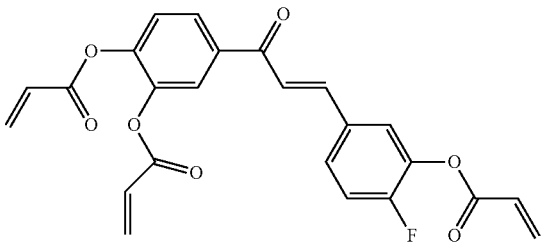
(1-1-2-12)
(1-1-3-1)
(1-1-4-1)
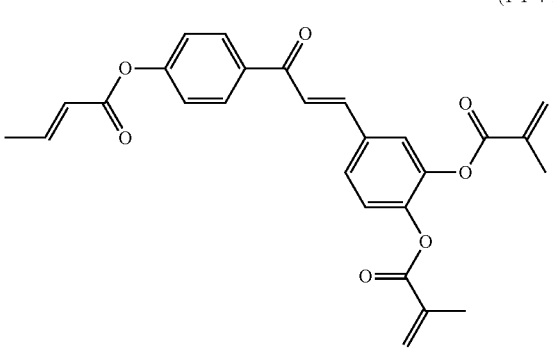

(1-1-4-2)

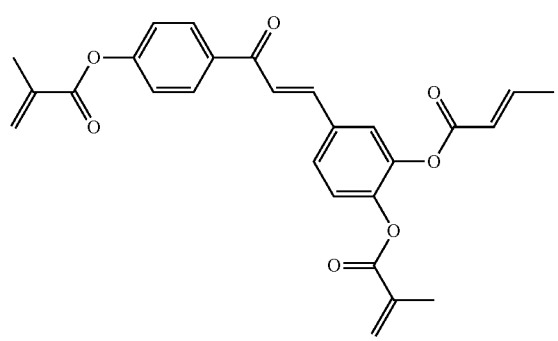

Example 4

Compound (1-2-1-1) was prepared according to the route described below.

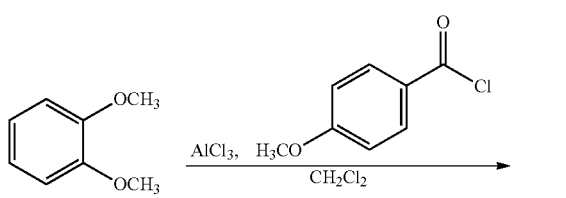

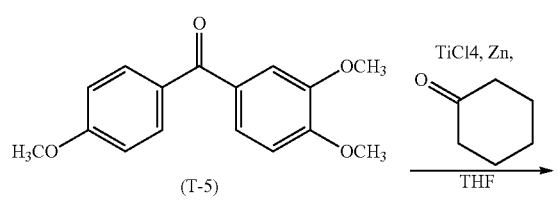

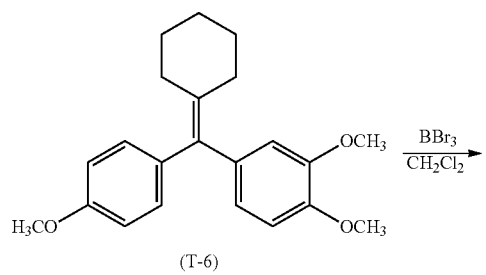

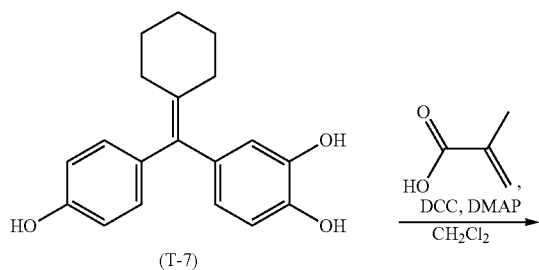

(1-2-1-1)

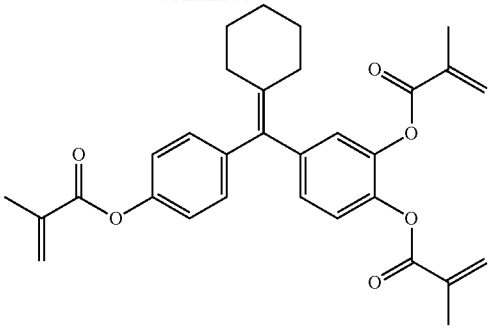

First Step: Synthesis of Compound (T-5)

Under a nitrogen atmosphere, aluminum chloride (9.65 g) was added to a mixture of 1,2-dimethoxybenzene (10.0 g) and dichloromethane (150 mL) under ice-cooling and the resulting mixture was stirred. Next, dichloromethane (100 mL) of 4-methoxybenzoylchloride (12.4 g) was added thereto, and then an ice bath was removed and the resulting mixture was stirred at room temperature for 16 hours. The reaction mixture was poured into ice water, an organic layer was extracted with dichloromethane, washed with water, and then dried over anhydrous magnesium sulfate. An organic solvent was distilled off under reduced pressure, and then a residue was purified by silica gel column chromatography (eluent toluene:ethyl acetate=9:1 (volume ratio)) to give compound (T-15) (18.9 g) as a colorless crystal.

Second Step: Synthesis of Compound (T-6)

Under a nitrogen atmosphere, titanium tetrachloride (25.8 g) was added dropwise at −10° C. to a mixture of zinc (18.0 g) and tetrahydrofuran (THF) (600 mL), and then the resulting mixture was refluxed under heating for 2.5 hours. The mixture was left to cool to room temperature, (T-5) (10.0 g) and a THF solution (100 mL) of cyclohexanone (3.60 g) was added thereto, and the resulting mixture was refluxed under heating for 4 hours. The reaction mixture was poured into a 10% potassium carbonate aqueous solution, an organic layer was extracted with ethyl acetate, washed with water, and then dried over anhydrous magnesium sulfate. An organic solvent was distilled off under reduced pressure, and then a residue was purified by silica gel column chromatography (eluent toluene:ethyl acetate=9:1 (volume ratio)) to quantitatively give compound (T-6) as a colorless crystal.

Third Step: Synthesis of Compound (T-7)

Under a nitrogen atmosphere, a 1 M dichloromethane solution (100 mL) of boron tribromide was added dropwise to a dichloromethane (100 mL) solution of (T-6) (10.1 g) at −60° C., and the resulting mixture was stirred at room temperature for 16 hours. The reaction mixture was poured into ice water, an organic layer was extracted with ethyl acetate, washed with water, and then dried over anhydrous magnesium sulfate.

An organic solvent was distilled off under reduced pressure, and then a residue was purified by silica gel column chromatography (eluent toluene:ethyl acetate=5:5 (volume ratio)) to give compound (T-7) as an orange solid (3.80 g).

Fourth Step: Synthesis of Compound (1-2-1-1)

Compound (1-2-1-1) was obtained as a colorless crystal (1.82 g) by performing synthesis in a manner similar to the operations in Fifth step in Example 1 except that (T-4) was changed to (T-7) (2.80 g).
Melting point: 119° C.
$^1$H-NMR (CDCl$_3$; δ ppm): 7.16 (d, 1H), 7.13 (d, 2H), 7.04 (d, 2H), 7.02-7.00 (m, 2H), 6.33 (s, 1H), 6.27-6.26 (m, 2H), 5.75-5.74 (m, 1H), 5.71-5.70 (m, 2H), 2.31-2.29 (m, 2H), 2.25-2.23 (m, 2H), 2.06 (s, 3H), 2.00-1.99 (m, 6H), 1.65-1.54 (m, 6H).
Example 5
In accordance with the method in Example 4 and Example 2, compound (1-2-1-1) to compound (1-2-1-8), compound (1-2-2-1) to compound (1-2-2-8), compound (1-3-1-1) to compound (1-3-1-6) and compound (1-3-2-1) to compound (1-3-2-6) are manufactured. Compound (1-2-1-1) shown in Example 4 is also presented again.
(1-2-1-1)
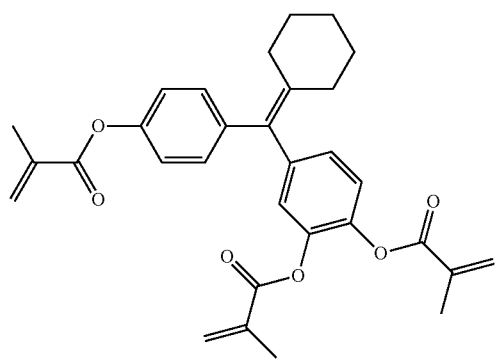
(1-2-1-2)
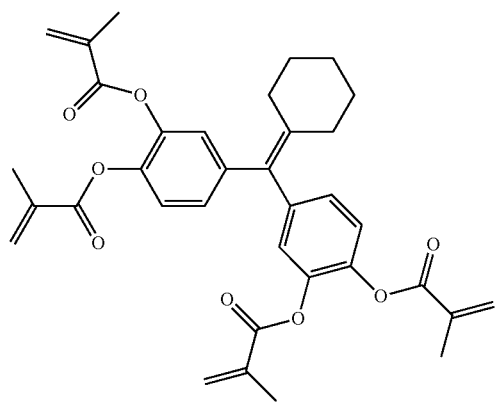
(1-2-1-3)
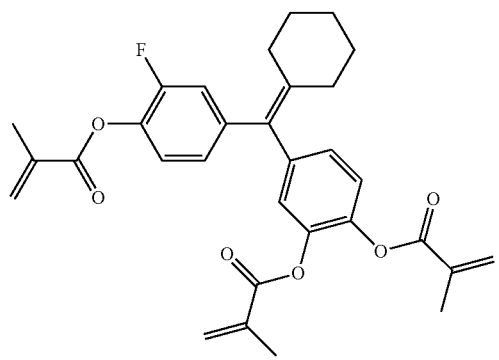
(1-2-1-4)
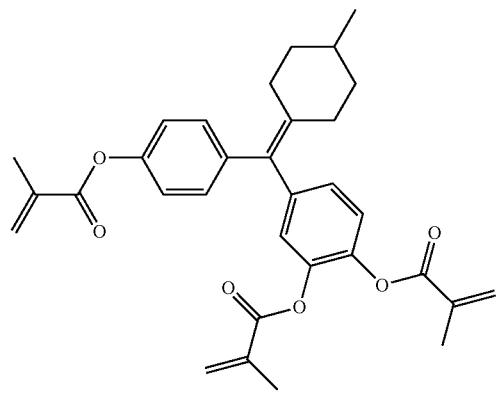
(1-2-1-5)
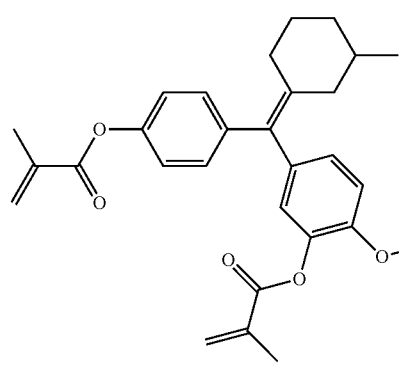
(1-2-1-6)
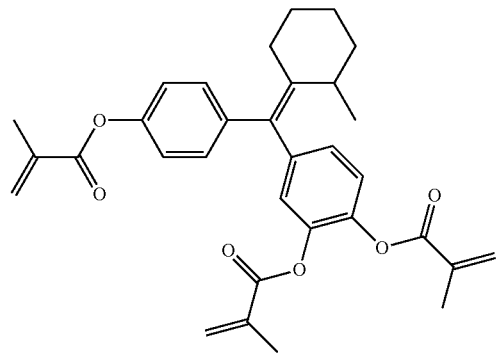
(1-2-1-7)
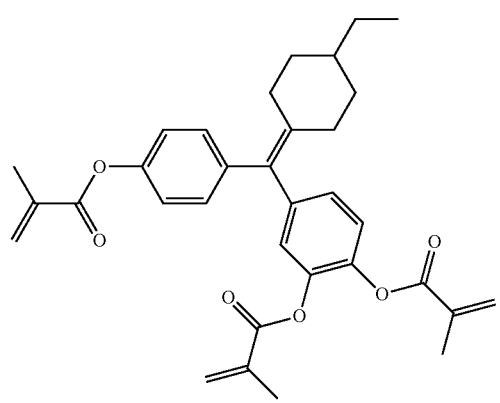

(1-2-1-8)
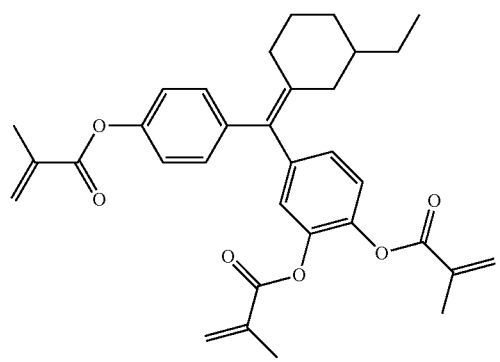
(1-2-2-1)
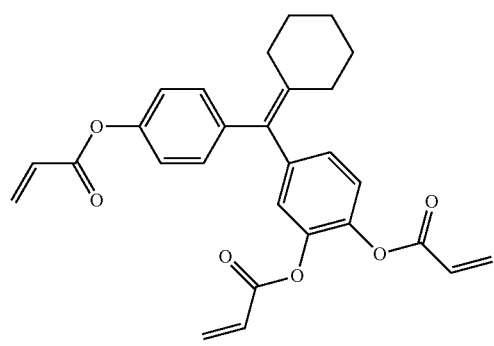
(1-2-2-2)
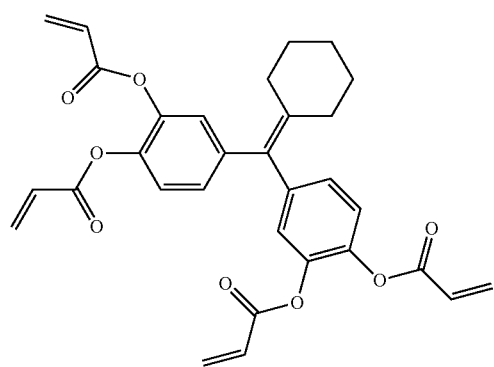
(1-2-2-3)
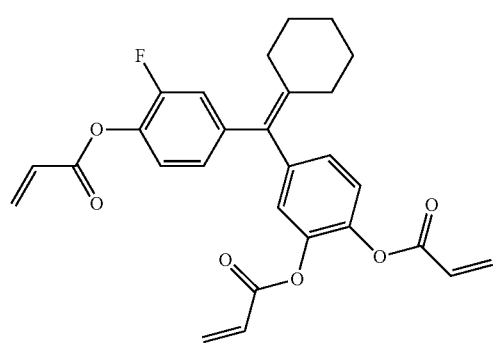
(1-2-2-4)
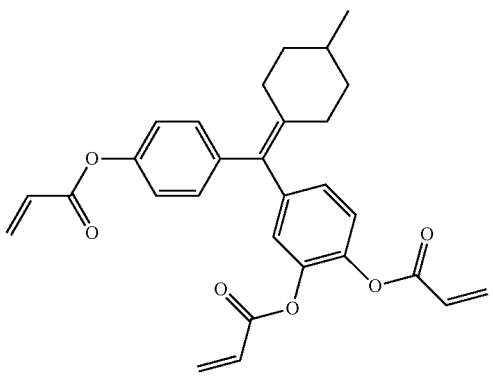
(1-2-2-5)
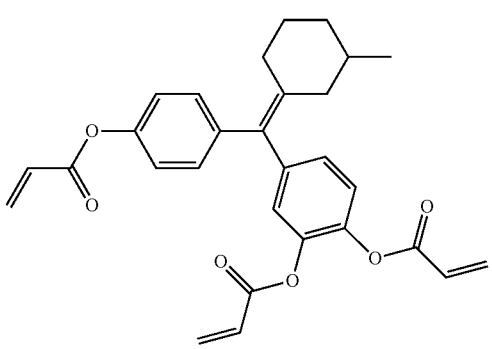
(1-2-2-6)
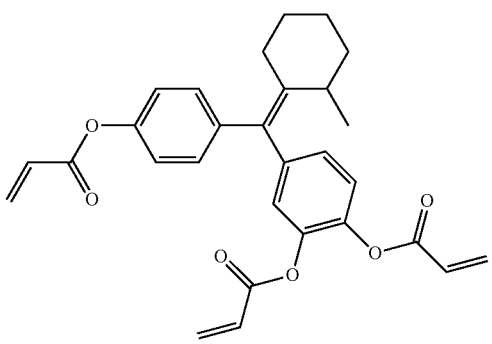
(1-2-2-7)
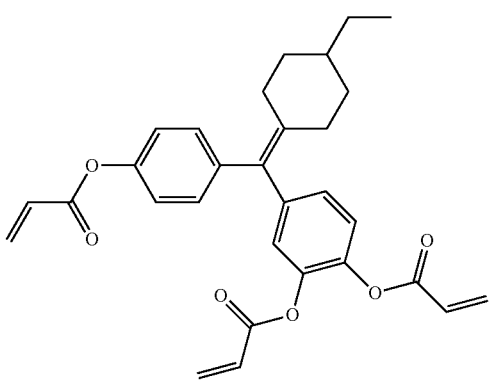

-continued
(1-2-2-8)
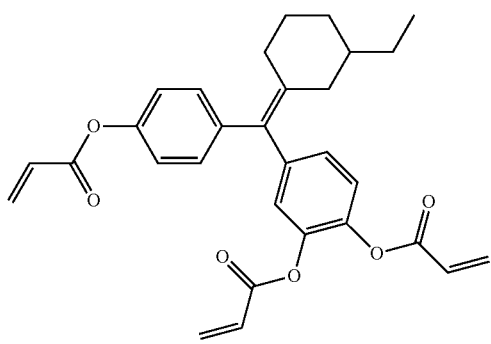
(1-3-1-4)
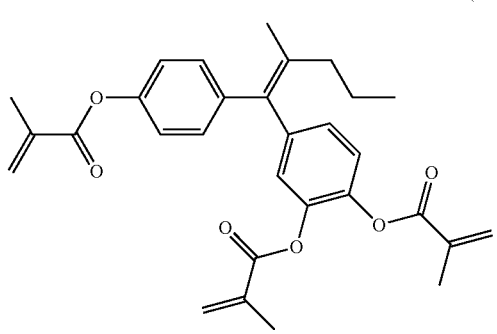
(1-3-1-1)
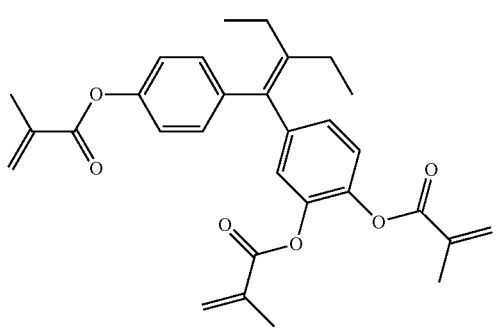
(1-3-1-5)
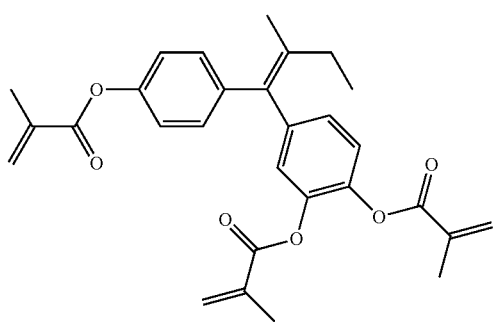
(1-3-1-2)
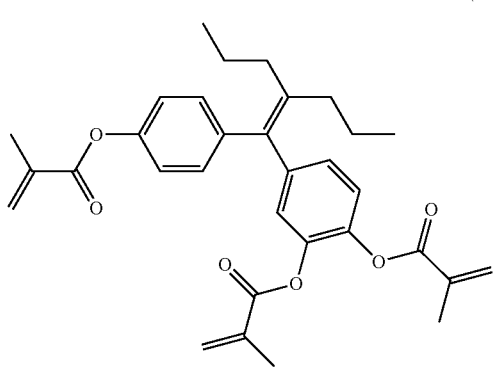
(1-3-1-6)
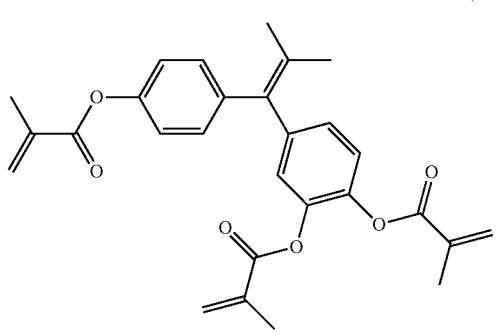
(1-3-1-3)
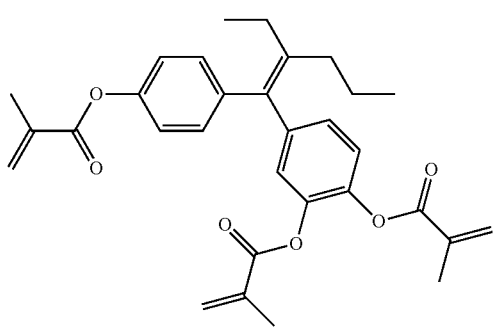
(1-3-2-1)
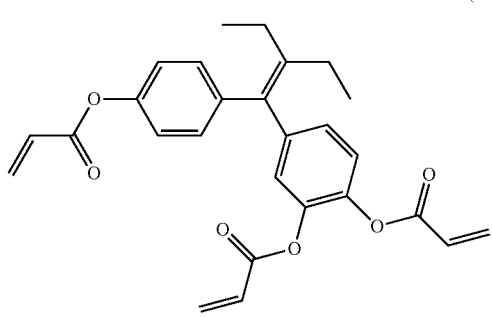

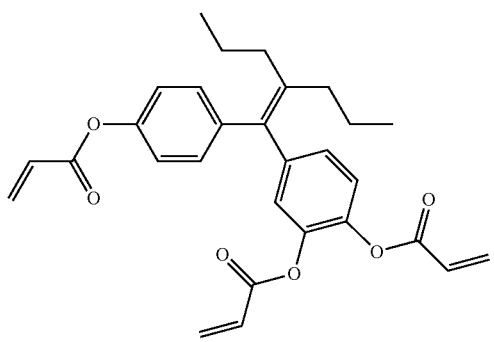
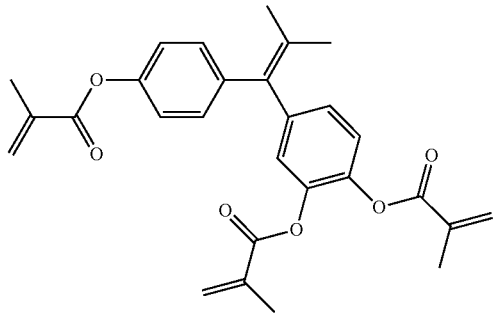

Example 6

Compound (1-4-2-1) was prepared according to the route described below.

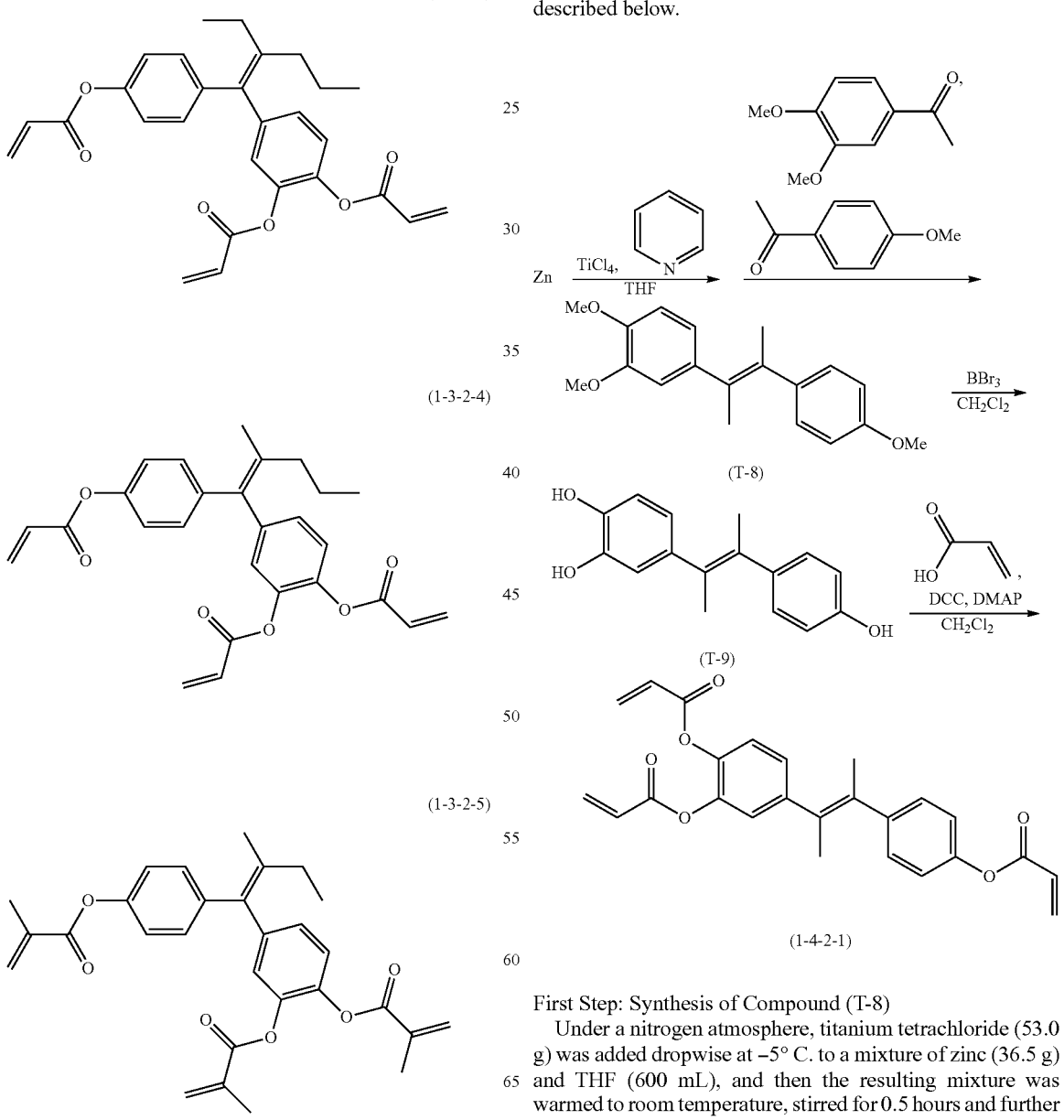

First Step: Synthesis of Compound (T-8)

Under a nitrogen atmosphere, titanium tetrachloride (53.0 g) was added dropwise at −5° C. to a mixture of zinc (36.5 g) and THF (600 mL), and then the resulting mixture was warmed to room temperature, stirred for 0.5 hours and further refluxed under heating for 2.5 hours. The reaction mixture was cooled to −5° C., pyridine (11.1 g) was added thereto, and the resulting mixture was stirred for 10 minutes. Next, a THF solution (300 mL) of 4'-methoxyacetophenone (10.1 g) and 3',4'-dimethoxyacetophenone (10.1 g) was added thereto, and the resulting mixture was refluxed under heating for 10 hours. The reaction mixture was poured into a 10% potassium carbonate solution, an organic layer was extracted with ethyl acetate, washed with water, and then dried over anhydrous magnesium sulfate. An organic solvent was distilled off under reduced pressure, and then a residue was purified by silica gel column chromatography (eluent toluene:ethyl acetate=9:1 (volume ratio)) to give compound (T-8) as a colorless oily material (7.98 g).

Second Step: Synthesis of Compound (T-9)

Compound (T-9) was obtained as a brown crystal (3.15 g) by performing synthesis in a manner similar to the operations in Third step in Example 4 except that (T-6) was changed to (T-8) (6.00 g).

Third Step: Synthesis of Compound (1-4-2-1)

Compound (1-4-2-1) was obtained as a colorless oily material (1.14 g) by performing synthesis in a manner similar to the operations in Fifth step in Example 1 except that (T-7) was changed to (T-9) (3.30 g).

$^1$H-NMR (CDCl$_3$; δ ppm): 7.27-7.24 (m, 3H), 7.19-7.17 (m, 2H), 7.14 (d, 2H), 6.64-6.57 (m, 3H), 6.37-6.24 (m, 3H), 6.04-6.00 (m, 3H), 1.93 (d, 3H), 1.89 (d, 3H).

Example 7

In accordance with the method in Example 6 and Fifth step in Example 1, compound (1-4-1-1) to compound (1-4-1-9) and compound (1-4-2-1) to compound (1-4-2-9) are manufactured. Compound (1-4-2-1) shown in Example 6 is also presented again.

(1-4-1-1)

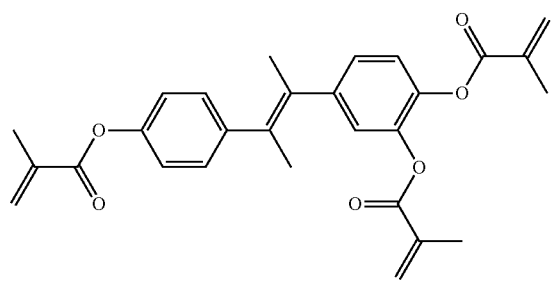

(1-4-1-2)

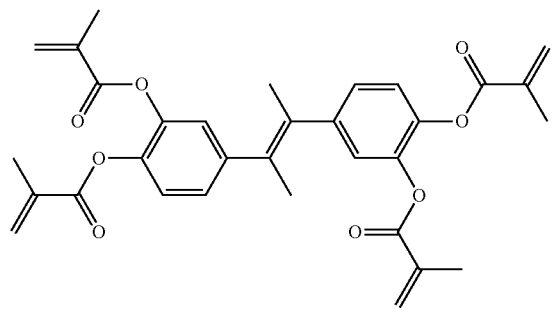

(1-4-1-3)

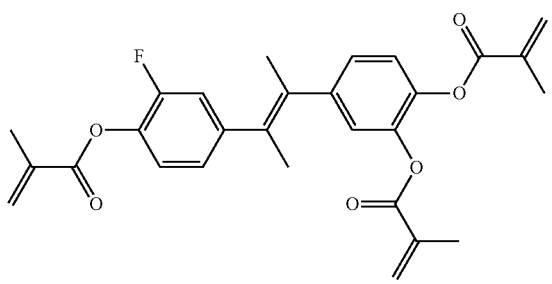

(1-4-1-4)

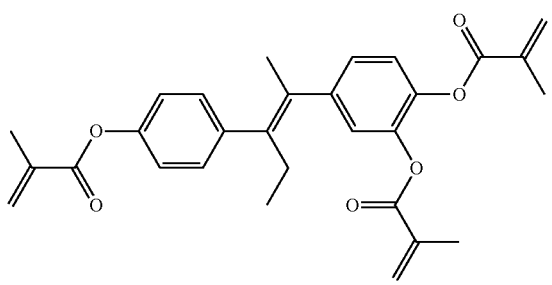

(1-4-1-5)

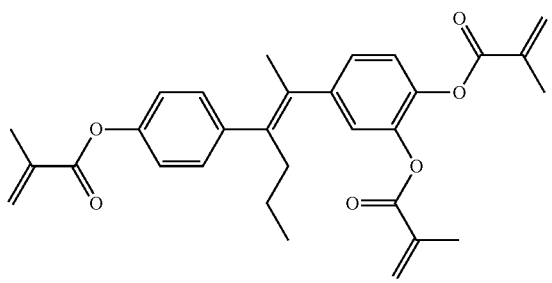

(1-4-1-6)

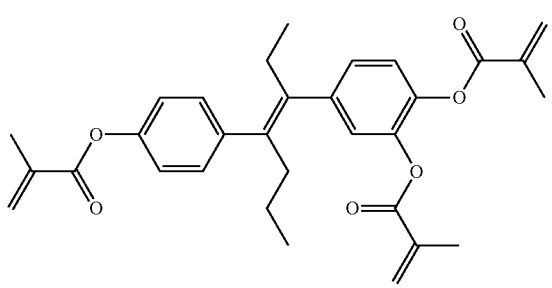

(1-4-1-7)

(1-4-1-8)
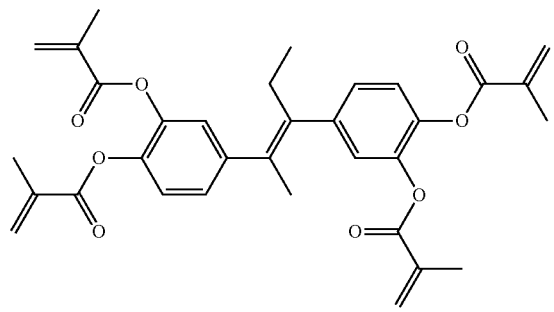
(1-4-1-9)
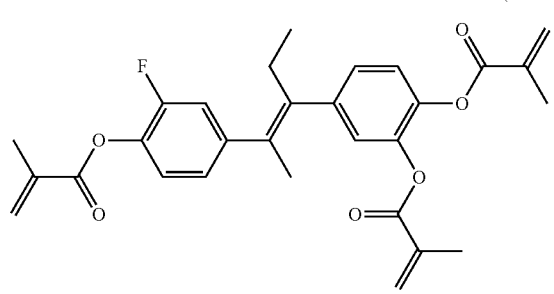
(1-4-2-1)
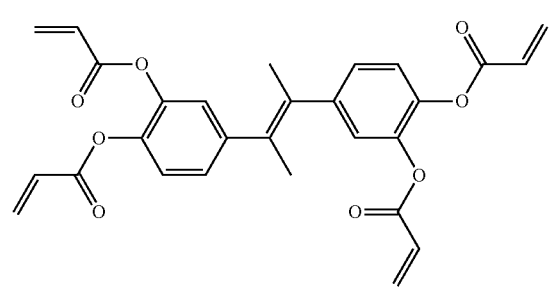
(1-4-2-2)
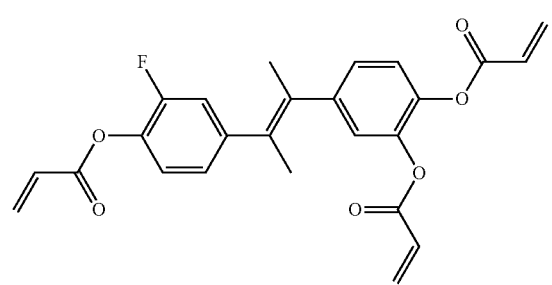
(1-4-2-3)
(1-4-2-4)
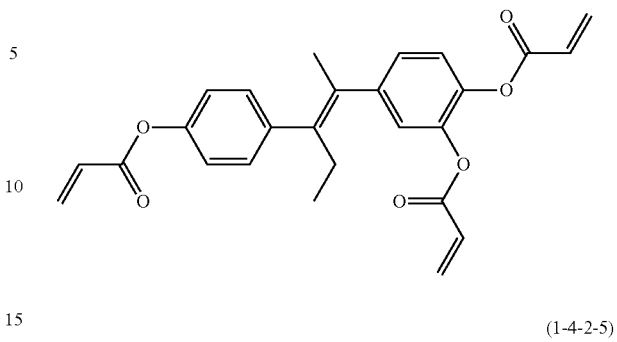
(1-4-2-5)
(1-4-2-6)
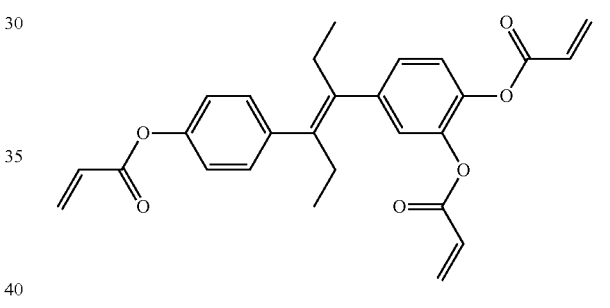
(1-4-2-7)
(1-4-2-8)
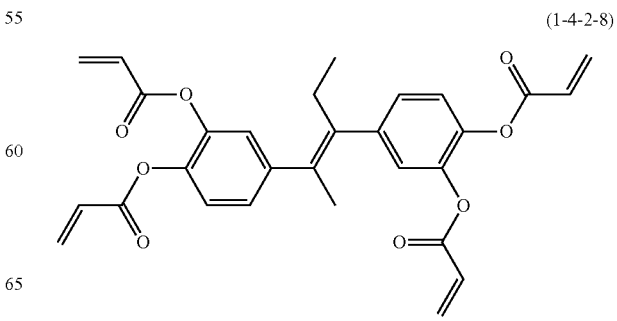

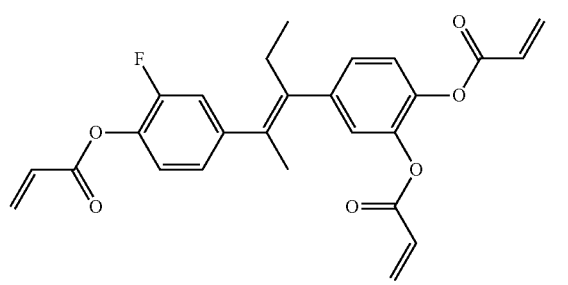

(1-4-2-9)

Comparative Example 1

In accordance with the method described in JP H5-320083 A and Fifth step in Example 1, compound (A-1) was prepared.

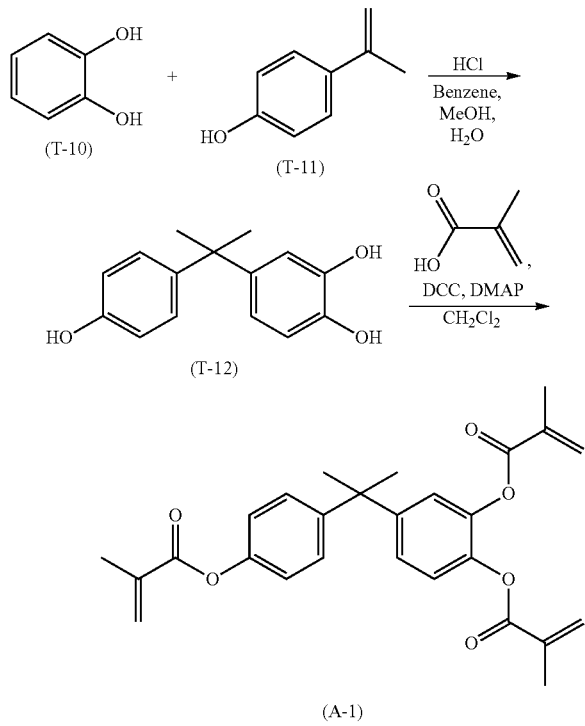

(A-1)

In order to evaluate characteristics of a composition and a compound to be contained in the composition, the composition and the compound were made a measurement object. When the measurement object was a composition, the measurement object was measured as a sample as was, and values obtained were described. When the measurement object was a compound, a sample for measurement was prepared by mixing the compound (15% by weight) with a base liquid crystal (85% by weight). Values of characteristics of the compound were calculated using values obtained by measurement, according to an extrapolation method: (extrapolated value)={(measured value of a sample for measurement)−0.85×(measured value of a base liquid crystal)}/0.15. When a smectic phase (or crystals) precipitated at the ratio thereof at 25° C., a ratio of the compound to the base liquid crystal was changed step by step in the order of (10% by weight:90% by weight), (5% by weight:95% by weight) and (1% by weight: 99% by weight). Values of maximum temperature, optical anisotropy, viscosity and dielectric anisotropy with regard to the compound were determined according to the extrapolation method.

Components of the base liquid crystal and the ratio thereof were as described below.

$C_3H_7$—⟨⟩—COO—⟨⟩—$OC_2H_5$ 17.2 wt %

$C_3H_7$—⟨⟩—COO—⟨⟩—$OC_4H_9$ 27.6 wt %

$C_4H_9$—⟨⟩—COO—⟨⟩—$OC_2H_5$ 20.7 wt %

$C_5H_{11}$—⟨⟩—COO—⟨⟩—$OCH_3$ 20.7 wt %

$C_5H_{11}$—⟨⟩—COO—⟨⟩—$OC_2H_5$ 13.8 wt %

Characteristics were measured according to the methods described below. Most of the measurement methods are applied as described in the Standard of the Japan Electronics and Information Technology Industries Association (hereinafter, abbreviated as JEITA) JEITA (JEITA ED-2521B) discussed and established by JEITA, or modified thereon.

Maximum Temperature of a Nematic Phase (NI; ° C.):

A sample was placed on a hot plate in a melting point apparatus equipped with a polarizing microscope and was heated at a rate of 1° C. per minute. Temperature when a part of the sample began to change from a nematic phase to an isotropic liquid was measured. A maximum temperature range of the nematic phase may be occasionally abbreviated as "maximum temperature."

Minimum Temperature of a Nematic Phase ($T_c$; ° C.):

Samples each having a nematic phase were put in glass vials and kept in freezers at temperatures of 0° C., −10° C., −20° C., −30° C. and −40° C. for 10 days, and then liquid crystal phases were observed. For example, when a sample maintained the nematic phase at −20° C. and changed to crystals or a smectic phase at −30° C., $T_c$ was expressed as Tc<−20° C. A minimum temperature of the nematic phase may be occasionally abbreviated as "minimum temperature."

Viscosity (Bulk Viscosity; η; Measured at 20° C.; mPa·s):

A cone-plate (E type) rotational viscometer was used for measurement.

Optical Anisotropy (Refractive Index Anisotropy; Δn; Measured at 25° C.):

Measurement was carried out by an Abbe refractometer with a polarizing plate mounted on an ocular, using light at a wavelength of 589 nanometers. A surface of a main prism was rubbed in one direction, and then a sample was added dropwise onto the main prism. A refractive index (η∥) was measured when the direction of polarized light was parallel to the direction of rubbing. A refractive index (n⊥) was measured when the direction of polarized light was perpendicular to the direction of rubbing. A value of optical anisotropy was calculated from an equation: $\Delta n = n\| - n\perp$.

Dielectric Anisotropy (Δ∈; Measured at 25° C.):

A value of dielectric anisotropy was calculated from an equation: $\Delta\in = \in\| - \in\perp$. A dielectric constant (∈|| and ∈⊥) was measured as described below.

(1) Measurement of dielectric constant (∈||): An ethanol (20 mL) solution of octadecyl triethoxysilane (0.16 mL) was applied to a well-washed glass substrate. After rotating the glass substrate with a spinner, the glass substrate was heated at 150° C. for 1 hour. A sample was put in a VA device in which a distance (cell gap) between two glass substrates was 4 micrometers, and the device was sealed with an ultraviolet-curable adhesive. Sine waves (0.5 V, 1 kHz) were applied to the device, and after 2 seconds, a dielectric constant (∈||) in the major axis direction of liquid crystal molecules was measured.

(2) Measurement of dielectric constant (∈⊥): A polyimide solution was applied to a well-washed glass substrate. After calcining the glass substrate, rubbing treatment was applied to the alignment film obtained. A sample was put in a TN device in which a distance (cell gap) between two glass substrates was 9 micrometers and a twist angle was 80 degrees. Sine waves (0.5 V, 1 kHz) were applied to the device, and after 2 seconds, a dielectric constant (∈⊥) in the minor axis direction of the liquid crystal molecules was measured.

Threshold Voltage (Vth; Measured at 25° C.; V):

An LCD-5100 luminance meter made by Otsuka Electronics Co., Ltd. was used for measurement.

A light source was a halogen lamp. A sample was put in a normally black mode VA device in which a distance (cell gap) between two glass substrates was 4 micrometers and a rubbing direction was anti-parallel, and the device was sealed with an ultraviolet-curable adhesive. A voltage (60 Hz, rectangular waves) to be applied to the device was stepwise increased from 0 V to 20 V at an increment of 0.02 V. On the occasion, the device was irradiated with light from a direction perpendicular to the device, and the amount of light transmitted through the device was measured. A voltage-transmittance curve was prepared, in which the maximum amount of light corresponds to 100% transmittance and the minimum amount of light corresponds to 0% transmittance. A threshold voltage is a voltage at 10% transmittance.

Voltage Holding Ratio (VHR-1; Measured at 25° C.; %):

A TN device used for measurement had a polyimide alignment film, and a distance (cell gap) between two glass substrates was 5 micrometers. A sample was put in the device, and then the device was sealed with an ultraviolet-curable adhesive. A pulse voltage (60 microseconds at 5 V) was applied to the TN device and the device was charged. A decaying voltage was measured for 16.7 milliseconds with a high-speed voltmeter, and area A between a voltage curve and a horizontal axis in a unit cycle was determined. Area B is an area without decay. A voltage holding ratio is a percentage of area A to area B.

Voltage Holding Ratio (VHR-2; Measured at 80° C.; %):

A TN device used for measurement had a polyimide alignment film, and a distance (cell gap) between two glass substrates was 5 micrometers. A sample was put in the device, and then the device was sealed with an ultraviolet-curable adhesive. A pulse voltage (60 microseconds at 5 V) was applied to the TN device and the device was charged. A decaying voltage was measured for 16.7 milliseconds with a high-speed voltmeter, and area A between a voltage curve and a horizontal axis in a unit cycle was determined. Area B is an area without decay. A voltage holding ratio is a percentage of area A to area B.

Voltage Holding Ratio (VHR-3; Measured at 25° C.; %):

Stability to ultraviolet light was evaluated by measuring a voltage holding ratio after a device was irradiated with ultraviolet light. A TN device used for measurement had a polyimide alignment film, and a cell gap was 5 micrometers. A sample was injected into the device, and then the device was irradiated with ultraviolet light for 20 minutes. A light source was an ultra high-pressure mercury lamp USH-500D (made by Ushio, Inc.), and a distance between the device and the light source was 20 centimeters. In measuring VHR-3, a decaying voltage was measured for 16.7 milliseconds. A composition having a large VHR-3 has a large stability to ultraviolet light. A value of VHR-3 is preferably 90% or more, further preferably, 95% or more.

Voltage Holding Ratio (VHR-4; Measured at 25° C.; %):

A TN device into which a sample was injected was heated in a constant-temperature bath at 80° C. for 500 hours, and then stability to heat was evaluated by measuring a voltage holding ratio. In measuring VHR-4, a decaying voltage was measured for 16.7 milliseconds. A composition having a large VHR-4 has a large stability to heat.

Response Time (τ; Measured at 25° C.; ms):

An LCD-5100 luminance meter made by Otsuka Electronics Co., Ltd. was used for measurement. A light source was a halogen lamp. A low-pass filter was set at 5 kHz. A sample was put in a normally black mode PVA device in which a distance (cell gap) between two glass substrates was 3.2 micrometers and a rubbing direction was anti-parallel, and the device was sealed with an ultraviolet-curable adhesive. The device was irradiated with 25 mW/cm² ultraviolet light (EXECURE4000-D type lamp made by Hoya CANDEO OPTRONICS, Inc.) for 400 seconds while applying a voltage of 15 V to the device. Rectangular waves (60 Hz, 10 V, 0.5 second) were applied to the device. On the occasion, the device was irradiated with light from a direction perpendicular to the device, and the amount of light passing through the device was measured. The maximum amount of light corresponds to 100% transmittance, and the minimum amount of light corresponds to 0% transmittance. A response time is a period of time needed for a change from 0% transmittance to 90% transmittance (rise time; millisecond).

Specific Resistance (ρ; Measured at 25° C.; Ωcm):

Into a vessel equipped with electrodes, 1.0 milliliter of a sample was injected. A DC voltage (10 V) was applied to the vessel, and a DC current after 10 seconds was measured. A specific resistance was calculated from the following equation: (specific resistance)={(voltage)×(electric capacity of a vessel)}/{(direct current)×(dielectric constant of vacuum)}.

Gas Chromatographic Analysis:

GC-14B Gas Chromatograph made by Shimadzu Corporation was used for measurement. A carrier gas was helium (2 mL per minute). A sample injector and a detector (FID) were set to 280° C. and 300° C., respectively. A capillary column DB-1 (length 30 m, bore 0.32 mm, film thickness 0.25 μm; dimethylpolysiloxane as a stationary phase, non-polar) made by Agilent Technologies, Inc. was used for separation of component compounds. After the column was kept at 200° C. for 2 minutes, the column was heated to 280° C. at a rate of 5° C. per minute. A sample was prepared in an acetone solution (0.1% by weight), and then 1 microliter of the solution was injected into the sample injector. A recorder was C-R5A Chromatopac made by Shimadzu Corporation or the equivalent thereof. The resulting chromatogram showed a retention time of a peak and a peak area corresponding to each of the component compounds.

As a solvent for diluting the sample, chloroform, hexane and so forth may also be used. The following capillary columns may also be used for separating the component compounds: HP-1 (length 30 m, bore 0.32 mm, film thickness 0.25 μm) made by Agilent Technologies, Inc., Rtx-1 (length 30 m, bore 0.32 mm, film thickness 0.25 μm) made by Restek Corporation and BP-1 (length 30 m, bore 0.32 mm, film thickness 0.25 μm) made by SGE International Pty. Ltd. A capillary column CBP1-M50-025 (length 50 m, bore 0.25 mm, film thickness 0.25 μm) made by Shimadzu Corporation may also be used for the purpose of avoiding an overlap of peaks of the compounds.

A ratio of liquid crystal compounds included in the composition may be calculated according to the method as described below. The liquid crystal compounds can be detected by a gas chromatograph. A ratio of the peak areas in the gas chromatogram corresponds to a ratio (in the number of moles) of the liquid crystal compounds. When the capillary columns described above were used, a correction coefficient of each of the liquid crystal compounds may be regarded as 1 (one). Accordingly, a ratio (% by weight) of the liquid crystal compounds was calculated from the ratio of the peak areas.

The compounds in Comparative Examples and Examples were described using symbols according to definitions in Table 3 below. In Table 3, a configuration of 1,4-cyclohexylene is trans. A parenthesized number next to a symbolized compound in Examples corresponds to the number of the compound. A symbol (-) means any other liquid crystal compound. A ratio (percentage) of the liquid crystal compounds is expressed in terms of weight percent (% by weight) based on the weight of the liquid crystal composition excluding the first composition. The liquid crystal composition further includes an impurity in addition thereto. Last, values of characteristics of the composition were summarized.

| Method for Description of Compounds using Symbols R—$(A_1)$—$Z_1$—...—$Z_n$—$(A_n)$—R' | |
|---|---|
| 1) Left-terminal Group R— | Symbol |
| $C_nH_{2n+1}$— | n- |
| $C_nH_{2n+1}O$— | nO— |
| $C_mH_{2m+1}OC_nH_{2n}$— | mOn— |
| $CH_2$=CH— | V— |
| $C_nH_{2n+1}$—CH=CH— | nV— |
| $CH_2$=CH—$C_nH_{2n}$— | Vn— |
| $C_mH_{2m+1}$—CH=CH—$C_nH_{2n}$— | mVn— |
| $CF_2$=CH— | VFF— |
| $CF_2$=CH—$C_nH_{2n}$— | VFFn— |
| $CH_2$=CHCOO— | AC— |
| $CH_2$=C($CH_3$)COO— | MAC— |
| 2) Right-terminal Group— | Symbol |
| —$C_nH_{2n+1}$ | -n |
| —$OC_nH_{2n+1}$ | —On |
| —CH=$CH_2$ | —V |
| —CH=CH—$C_nH_{2n+1}$ | —Vn |
| —$C_nH_{2n}$—CH=$CH_2$ | —nV |
| —CH=$CF_2$ | —VFF |
| —$COOCH_3$ | —EMe |
| —$OCOCH$=$CH_2$ | —AC |
| —$OCOC(CH_3)$=$CH_2$ | —MAC |
| 3) Bonding Group —$Z_n$— | Symbol |
| —$C_2H_4$— | 2 |
| —COO— | E |
| —CH=CH— | V |
| —C≡C— | T |
| —$CF_2O$— | X |
| —$CH_2O$— | 1O |
| —$SiH_2$— | Si |
| 4) Ring Structure —$A_n$— | Symbol |
| cyclohexane | H |
| tetrahydropyran (O top) | Dh |
| tetrahydropyran (O variant) | dh |
| benzene | B |
| fluorobenzene | B(F) |
| 2-fluorobenzene | B(2F) |
| 2,5-difluorobenzene | B(2F,5F) |
| 2,3-difluorobenzene | B(2F,3F) |
| 2,3-difluoro-6-methylbenzene | B(2F,3F,6Me) |
| 2-fluoro-3-chlorobenzene | B(2F,3CL) |

Method for Description of Compounds using Symbols
R—(A₁)—Z₁—...—Zₙ—(Aₙ)—R'

| | |
|---|---|
| 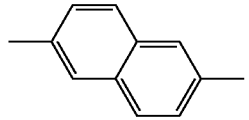 | Np |
| 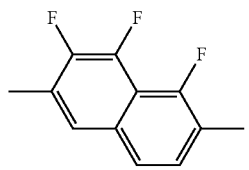 | Np(3F,4F,5F) |
| 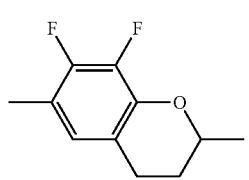 | Cro(7F,8F) |

5) Examples of Description

Example 1 3-HB(2F,3F)—O2

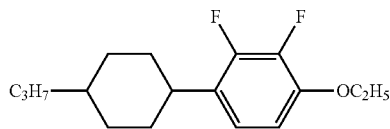

Example 2 3-HDhB(2F,3F)—O2

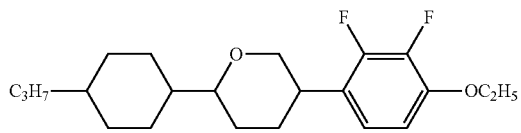

Comparative Example 2

The composition includes a liquid crystal composition without containing a first component of the invention. Components and characteristics of the composition are as described below.

| | | |
|---|---|---|
| 3-BB (2F, 3F)—O2 | (2-4-1) | 10% |
| 5-BB (2F, 3F)—O2 | (2-4-1) | 10% |
| 2-HH1OB (2F, 3F)—O2 | (2-8-1) | 5% |
| 3-HH1OB (2F, 3F)—O2 | (2-8-1) | 10% |
| 3-DhHB (2F, 3F)—O2 | (2-10-1) | 5% |
| 3-HDhB (2F, 3F)—O2 | (2-11-1) | 6% |
| 5-DhH1OB (2F, 3F)—O2 | (2-12-1) | 3% |
| 3-dhBB (2F, 3F)—O2 | (2-14-1) | 5% |
| 3-HEB (2F, 3F) B (2F, 3F)—O4 | (2-15-1) | 4% |
| 2-HH-3 | (3-1-1) | 15% |
| 3-HH-4 | (3-1-1) | 5% |
| 1-BB-3 | (3-3-1) | 5% |
| 3-HHB-1 | (3-5-1) | 3% |
| 3-HHB-3 | (3-5-1) | 3% |
| V-HHB-1 | (3-5-1) | 3% |
| 5-B (F) BB-2 | (3-7-1) | 4% |
| 5-B (F) BB-2 | (3-7-1) | 4% |

NI=83.8° C.; Tc<−20° C.; Δn=0.121; Δ∈=−4.0; Vth=2.07 V; τ=8.0 ms; VHR-1=99.3%; VHR-2=98.2%.

Comparative Example 3

| | | |
|---|---|---|
| 3-BB (2F, 3F)—O2 | (2-4-1) | 10% |
| 5-BB (2F, 3F)—O2 | (2-4-1) | 10% |
| 2-HH1OB (2F, 3F)—O2 | (2-8-1) | 5% |
| 3-HH1OB (2F, 3F)—O2 | (2-8-1) | 10% |
| 3-DhHB (2F, 3F)—O2 | (2-10-1) | 5% |
| 3-HDhB (2F, 3F)—O2 | (2-11-1) | 6% |
| 5-DhH1OB (2F, 3F)—O2 | (2-12-1) | 3% |
| 3-dhBB (2F, 3F)—O2 | (2-14-1) | 5% |
| 3-HEB (2F, 3F) B (2F, 3F)—O4 | (2-15-1) | 4% |
| 2-HH-3 | (3-1-1) | 15% |
| 3-HH-4 | (3-1-1) | 5% |
| 1-BB-3 | (3-3-1) | 5% |
| 3-HHB-1 | (3-5-1) | 3% |
| 3-HHB-3 | (3-5-1) | 3% |
| V-HHB-1 | (3-5-1) | 3% |
| 5-B (F) BB-2 | (3-7-1) | 4% |
| 5-B (F) BB-2 | (3-7-1) | 4% |

Into 100 parts by weight of the composition, 0.3 part by weight of compound (A-1) prepared in Comparative Example 1 was added.

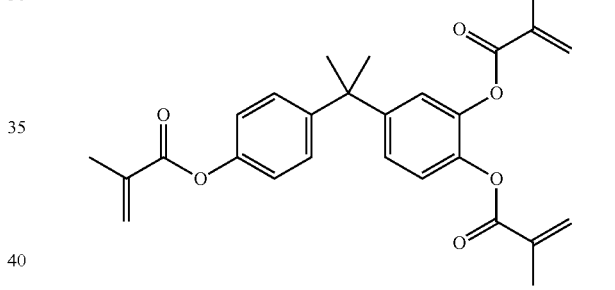

(A-1)

NI=83.6° C.; Tc<−20° C.; Δn=0.121; Δ∈=−4.0; Vth=2.05 V; τ=7.3 ms; VHR-1=99.2%; VHR-2=98.1%.

Example 8

| | | |
|---|---|---|
| 3-BB (2F, 3F)—O2 | (2-4-1) | 10% |
| 5-BB (2F, 3F)—O2 | (2-4-1) | 10% |
| 2-HH1OB (2F, 3F)—O2 | (2-8-1) | 5% |
| 3-HH1OB (2F, 3F)—O2 | (2-8-1) | 10% |
| 3-DhHB (2F, 3F)—O2 | (2-10-1) | 5% |
| 3-HDhB (2F, 3F)—O2 | (2-11-1) | 6% |
| 5-DhH1OB (2F, 3F)—O2 | (2-12-1) | 3% |
| 3-dhBB (2F, 3F)—O2 | (2-14-1) | 5% |
| 3-HEB (2F, 3F) B (2F, 3F)—O4 | (2-15-1) | 4% |
| 2-HH-3 | (3-1-1) | 15% |
| 3-HH-4 | (3-1-1) | 5% |
| 1-BB-3 | (3-3-1) | 5% |
| 3-HHB-1 | (3-5-1) | 3% |
| 3-HHB-3 | (3-5-1) | 3% |
| V-HHB-1 | (3-5-1) | 3% |
| 5-B (F) BB-2 | (3-7-1) | 4% |
| 5-B (F) BB-2 | (3-7-1) | 4% |

Into 100 parts by weight of the composition, 0.3 part by weight of compound (1-1-1-1) described below was added.

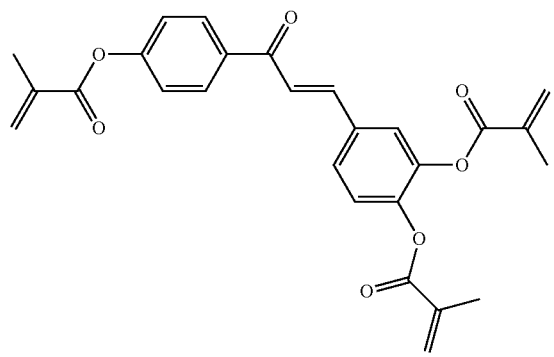

(1-1-1-1)

NI=83.5° C.; Tc<−20° C.; Δn=0.121; Δ∈=−4.0; Vth=2.04 V; τ=5.7 ms; VHR-1=99.3%; VHR-2=98.2%.

Example 9

| | | |
|---|---|---|
| 3-H2B (2F, 3F)—O2 | (2-2-1) | 19% |
| 5-H2B (2F, 3F)—O2 | (2-2-1) | 15% |
| 5-HH2B (2F, 3F)—O2 | (2-7-1) | 5% |
| 3-HBB (2F, 3F)—O2 | (2-13-1) | 10% |
| 5-HBB (2F, 3F)—O2 | (2-13-1) | 4% |
| 3-HHB (2F, 3CL)—O2 | (2-16-1) | 3% |
| 3-HBB (2F, 3CL)—O2 | (2-17-1) | 3% |
| 2-HH-3 | (3-1-1) | 25% |
| 3-HHEH-3 | (3-4-1) | 3% |
| 3-HHB—O1 | (3-5) | 4% |
| 3-HBB-2 | (3-6-1) | 3% |
| 3-HB (F) HH-5 | (3-10-1) | 3% |
| 5-HBBH-3 | (3-11-1) | 3% |

Into 100 parts by weight of the composition, 0.3 part by weight of compound (1-2-1-1) described below was added.

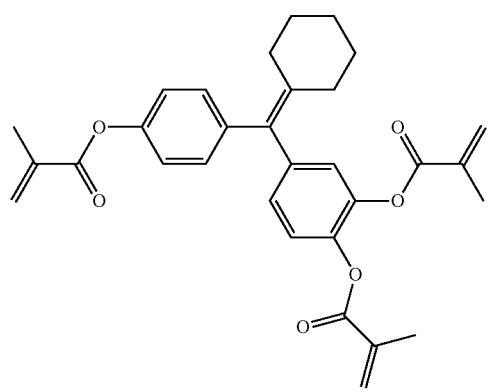

(1-2-1-1)

NI=81.3° C.; Tc<−20° C.; Δn=0.090; Δ∈=−2.8; Vth=2.38 V; τ=5.4 ms; VHR-1=99.2%; VHR-2=97.6%.

Example 10

| | | |
|---|---|---|
| 3-H2B (2F, 3F)—O2 | (2-2-1) | 20% |
| 5-H2B (2F, 3F)—O2 | (2-2-1) | 15% |
| 2-BB (2F, 3F) B-3 | (2-9-1) | 7% |
| 3-DhHB (2F, 3F)—O2 | (2-10-1) | 3% |
| 3-HBB (2F, 3F)—O2 | (2-13-1) | 9% |
| 4-HBB (2F, 3F)—O2 | (2-13-1) | 5% |
| 3-H1OCro (7F, 8F)-5 | (2-18-1) | 3% |
| 3-HH1OCro (7F, 8F)-5 | (2-19-1) | 3% |
| V-HH-3 | (3-1-1) | 18% |
| 1V-HH-3 | (3-1-1) | 5% |
| 3-HHB—O1 | (3-5) | 3% |
| 3-HHEBH-3 | (3-9-1) | 3% |
| 3-HB (F) BH-3 | (3-12-1) | 3% |
| 5-HBB (F) B-2 | (3-13-1) | 3% |

Into 100 parts by weight of the composition, 0.3 part by weight of compound (1-2-2-1) described below was added.

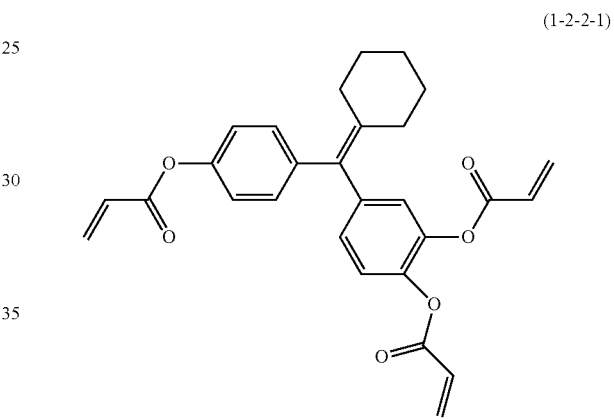

(1-2-2-1)

NI=77.5° C.; Tc<−20° C.; Δn=0.106; Δ∈=−3.5; Vth=2.14 V; τ=4.8 ms; VHR-1=99.3%; VHR-2=97.9%.

Example 11

| | | |
|---|---|---|
| 3-H2B (2F, 3F)—O2 | (2-2-1) | 20% |
| 1V2-H2B (2F, 3F)—O2 | (2-2-1) | 12% |
| 3-HHB (2F, 3F)—O2 | (2-6-1) | 8% |
| 3-HHB (2F, 3F)-1 | (2-6-1) | 5% |
| 3-HDhB (2F, 3F)—O2 | (2-11-1) | 5% |
| 3-HBB (2F, 3F)—O2 | (2-13-1) | 10% |
| 4-HBB (2F, 3F)—O2 | (2-13-1) | 6% |
| 5-HBB (2F, 3F)—O2 | (2-13-1) | 3% |
| 2-HH-3 | (3-1-1) | 10% |
| 3-HH-4 | (3-1-1) | 10% |
| 1V-HH-3 | (3-1-1) | 8% |
| 3-HHB-1 | (3-5-1) | 3% |

Into 100 parts by weight of the composition, 0.4 part by weight of compound (1-4-2-1) described below was added.

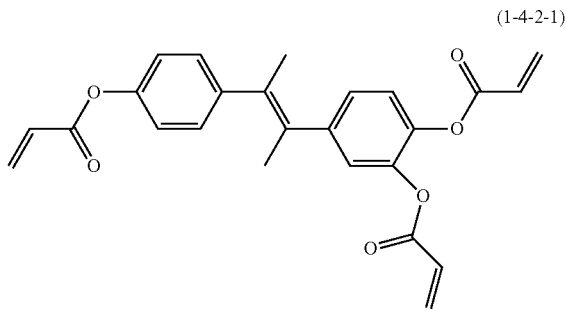 [SMILES: C=CC(=O)Oc1ccc(/C(C)=C(\C)c2ccc(OC(=O)C=C)c(OC(=O)C=C)c2)cc1]

(1-4-2-1)

NI=79.0° C.; Tc<−20° C.; Δn=0.095; Δ∈=−3.8; Vth=2.08 V; τ=5.1 ms; VHR-1=99.1%; VHR-2=98.2%.

Example 12

| 3-BB (2F, 3F)—O2 | (2-4-1) | 9% |
| 5-BB (2F, 3F)—O2 | (2-4-1) | 6% |
| 2-HH1OB (2F, 3F)—O2 | (2-8-1) | 13% |
| 3-HH1OB (2F, 3F)—O2 | (2-8-1) | 21% |
| V-HH-3 | (3-1-1) | 28% |
| 3-HB—O2 | (3-2) | 5% |
| 1-BB-3 | (3-3-1) | 7% |
| 3-HHB-1 | (3-5-1) | 3% |
| 3-HHB—O1 | (3-5) | 4% |
| 5-B (F) BB-2 | (3-7-1) | 4% |

Into 100 parts by weight of the composition, 0.4 part by weight of compound (1-1-1-1) described below was added.

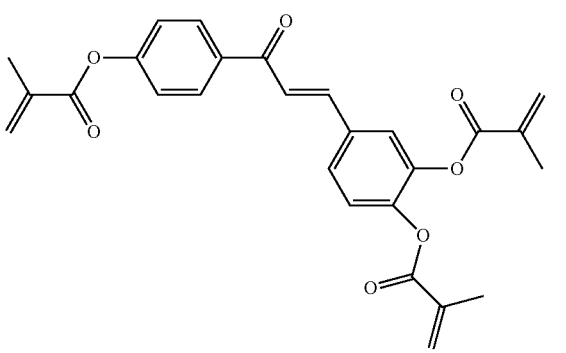

(1-1-1-1)

NI=74.1° C.; Tc<−20° C.; Δn=0.100; Δ∈=−3.1; Vth=2.22 V; τ=3.8 ms; VHR-1=99.1%; VHR-2=97.9%.

Example 13

| 3-HB (2F, 3F)—O2 | (2-1-1) | 10% |
| V-HB (2F, 3F)—O2 | (2-1-1) | 10% |
| V-HB (2F, 3F)—O4 | (2-1-1) | 8% |
| 1V2-HB (2F, 3F)—O2 | (2-1-1) | 4% |
| 3-HBB (2F, 3F)—O2 | (2-13-1) | 10% |
| 4-HBB (2F, 3F)—O2 | (2-13-1) | 6% |
| 5-HBB (2F, 3F)—O2 | (2-13-1) | 10% |
| 3-HH1OCro (7F, 8F)-5 | (2-19-1) | 5% |
| 3-HH1OB (2F, 3F, 6Me)—O2 | (2) | 3% |
| 2-HH-3 | (3-1-1) | 15% |
| VFF-HH-3 | (3-1) | 6% |
| 3-HHB-1 | (3-5-1) | 3% |
| 3-HHB—O1 | (3-5) | 3% |
| 5-HBB (F) B-2 | (3-13-1) | 4% |
| 1O1-HBBH-5 | (—) | 3% |

Into 100 parts by weight of the composition, 0.2 part by weight of compound (1-4-1-1) described below was added.

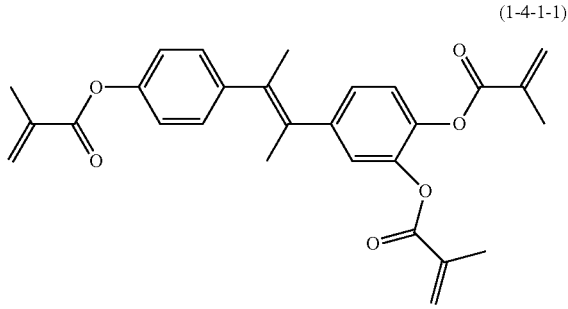 [SMILES: C=C(C)C(=O)Oc1ccc(/C(C)=C(\C)c2ccc(OC(=O)C(=C)C)c(OC(=O)C(=C)C)c2)cc1]

(1-4-1-1)

NI=85.4° C.; Tc<−20° C.; Δn=0.106; Δ∈=−3.8; Vth=1.94 V; τ=6.1 ms; VHR-1=99.1%; VHR-2=97.8%.

Example 14

| 3-BB (2F, 3F)—O2 | (2-4-1) | 10% |
| 5-BB (2F, 3F)—O2 | (2-4-1) | 7% |
| 3-B (2F, 3F) B (2F, 3F)—O2 | (2-5-1) | 3% |
| 2-HH1OB (2F, 3F)—O2 | (2-8-1) | 13% |
| 3-HH1OB (2F, 3F)—O2 | (2-8-1) | 12% |
| 2-HH-3 | (3-1-1) | 20% |
| 3-HH-4 | (3-1-1) | 9% |
| 3-HH—O1 | (3-1) | 3% |
| 3-HB—O2 | (3-2) | 3% |
| V2-BB-1 | (3-3-1) | 5% |
| 3-HHB-1 | (3-5-1) | 3% |
| 3-HHB—O1 | (3-5) | 3% |
| 1-BB (F) B-2V | (3-8-1) | 5% |
| 3-HHEBH-4 | (3-9-1) | 4% |

Into 100 parts by weight of the composition, 0.15 part by weight of the following compound (1-1-1-1)

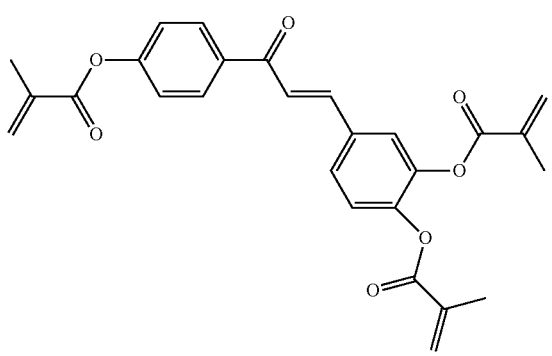

(1-1-1-1)

and 0.15 part by weight of the following compound (1-1-2-1) was added.

(1-1-2-1)

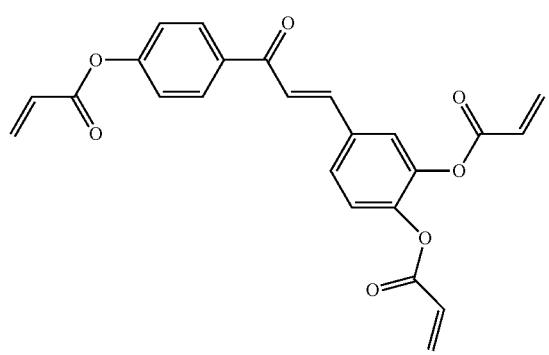

NI=76.0° C.; Tc<−20° C.; Δn=0.100; Δ∈=−2.9; Vth=2.24 V; τ=4.0 ms; VHR-1=99.1%; VHR-2=98.1%.

Example 15

| | | |
|---|---|---|
| 3-H1OB (2F, 3F)—O2 | (2-3-1) | 6% |
| 3-BB (2F, 3F)—O2 | (2-4-1) | 6% |
| 5-BB (2F, 3F)—O2 | (2-4-1) | 5% |
| 2O-B (2F, 3F) B (2F, 3F)—O6 | (2-5) | 3% |
| V-HHB (2F, 3F)—O2 | (2-6-1) | 8% |
| 2-HH1OB (2F, 3F)—O2 | (2-8-1) | 7% |
| 3-HH1OB (2F, 3F)—O2 | (2-8-1) | 10% |
| 2-HH-3 | (3-1-1) | 22% |
| 3-HH-4 | (3-1-1) | 8% |
| 3-HH—O1 | (3-1) | 5% |
| V2-BB-1 | (3-3-1) | 5% |
| 3-HHB-1 | (3-5-1) | 3% |
| 3-HHB—O1 | (3-5) | 4% |
| 2-BB (F) B-3 | (3-8-1) | 4% |
| 3-HHEBH-4 | (3-9-1) | 4% |

Into 100 parts by weight of the composition, 0.3 part by weight of compound (1-1-2-1) described below was added.

(1-1-2-1)

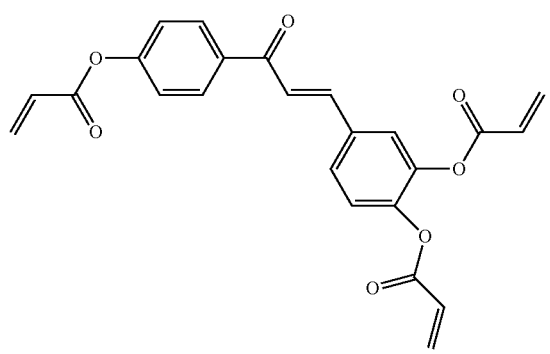

NI=77.2° C.; Tc<−20° C.; Δn=0.092; Δ∈=−3.0; Vth=2.28 V; τ=3.9 ms; VHR-1=99.2%; VHR-2=97.9%.

Example 16

| | | |
|---|---|---|
| 3-BB (2F, 3F)—O2 | (2-4-1) | 9% |
| 5-BB (2F, 3F)—O2 | (2-4-1) | 6% |
| 2-HH1OB (2F, 3F)—O2 | (2-8-1) | 13% |
| 3-HH1OB (2F, 3F)—O2 | (2-8-1) | 21% |
| V-HH-3 | (3-1-1) | 26% |
| 3-HB—O2 | (3-2) | 7% |
| 1-BB-3 | (3-3-1) | 7% |
| 3-HHB-1 | (3-5-1) | 3% |
| 3-HHB—O1 | (3-5) | 4% |
| 5-B (F) BB-2 | (3-7-1) | 4% |

Into 100 parts by weight of the composition, 0.3 part by weight of compound (1-1-2-8) described below was added.

(1-1-2-8)

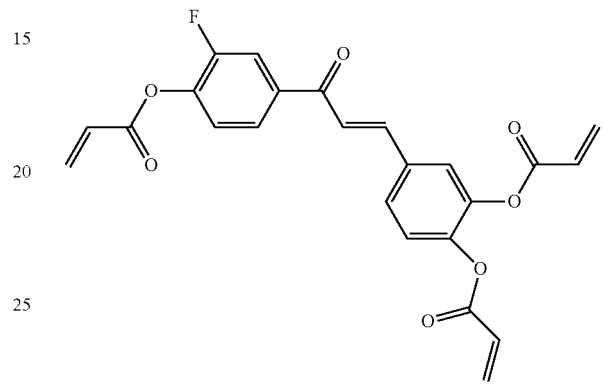

NI=74.1° C.; Tc<−20° C.; Δn=0.102; Δ∈=−3.1; Vth=2.21 V; τ=3.9 ms; VHR-1=99.0%; VHR-2=97.8%.

Example 17

| | | |
|---|---|---|
| 3-BB (2F, 3F)—O2 | (2-4-1) | 9% |
| 5-BB (2F, 3F)—O2 | (2-4-1) | 6% |
| 2-HH1OB (2F, 3F)—O2 | (2-8-1) | 13% |
| 3-HH1OB (2F, 3F)—O2 | (2-8-1) | 21% |
| V-HH-3 | (3-1-1) | 26% |
| 3-HB—O2 | (3-2) | 7% |
| 1-BB-3 | (3-3-1) | 7% |
| 3-HHB-1 | (3-5-1) | 3% |
| 3-HHB—O1 | (3-5) | 4% |
| 5-B (F) BB-2 | (3-7-1) | 4% |

Into 100 parts by weight of the composition, 0.3 part by weight of compound (1-1-4-1) described below was added.

(1-1-4-1)

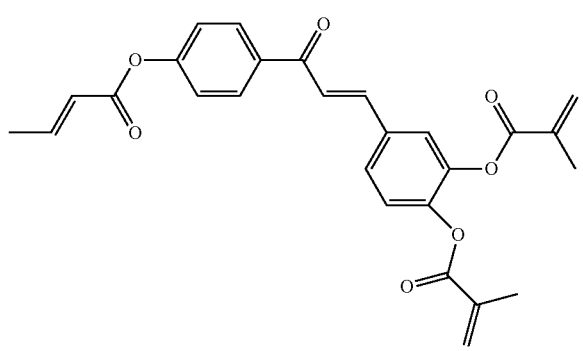

NI=74.0° C.; Tc<−20° C.; Δn=0.102; Δ∈=−3.1; Vth=2.20 V; τ=4.1 ms; VHR-1=99.1%; VHR-2=97.8%.

Example 18

| | | |
|---|---|---|
| 3-BB (2F, 3F)—O2 | (2-4-1) | 9% |
| 5-BB (2F, 3F)—O2 | (2-4-1) | 6% |
| 2-HH1OB (2F, 3F)—O2 | (2-8-1) | 13% |
| 3-HH1OB (2F, 3F)—O2 | (2-8-1) | 21% |
| V-HH-3 | (3-1-1) | 28% |
| 3-HB—O2 | (3-2) | 5% |
| 1-BB-3 | (3-3-1) | 7% |
| 3-HHB-1 | (3-5-1) | 3% |
| 3-HHB—O1 | (3-5) | 4% |
| 5-B (F) BB-2 | (3-7-1) | 4% |

Into 100 parts by weight of the composition, 0.4 part by weight of compound (1-1-4-2) described below was added.

(1-1-4-2)

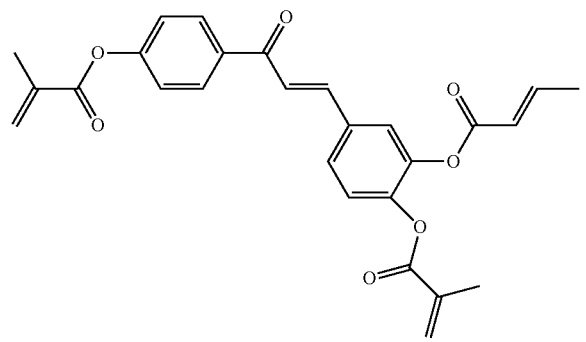

NI=73.9° C.; Tc<−20° C.; Δn=0.100; Δ∈=−3.1; Vth=2.24 V; τ=4.0 ms; VHR-1=99.0%; VHR-2=98.0%.

The compositions according to Examples 8 to 18 have a shorter response time in comparison with the composition according to Comparative Example 2. Moreover, the compositions according to Examples 8 to 18 have a shorter response time in comparison with the composition according to Comparative Example 3. Therefore, a polymerizable compound having a connection group for connecting conjugated systems of conjugate rings, as represented by formula (1-1-1-1), formula (1-1-2-8), formula (1-1-4-1), formula (1-1-4-2), formula (1-2-1-1), formula (1-2-2-1), formula (1-4-1-1) and formula (1-4-2-1) of the invention and a liquid crystal composition using the polymerizable compound are effective in reducing the response time.

INDUSTRIAL APPLICABILITY

The invention concerns a liquid crystal composition satisfying at least one of characteristics such as a high maximum temperature of a nematic phase, a low minimum temperature of the nematic phase, a small viscosity, a suitable optical anisotropy, a large negative dielectric anisotropy, a large specific resistance, a high stability to ultraviolet light and a high stability to heat, or a liquid crystal composition having a suitable balance regarding at least two of the characteristics. A liquid crystal display device including such a composition is applied to constitute an AM device having a short response time, a suitable pretilt, a large voltage holding ratio, a large contrast ratio, a long service life and so forth, and thus can be used for a liquid crystal projector, a liquid crystal television and so forth.

What is claimed is:
1. A compound represented by formula (1):

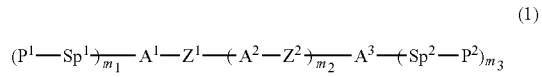

(1)

wherein, $A^1$ and $A^3$ are independently an aromatic ring group in which at least one of hydrogen may be replaced by L, or a heterocyclic aromatic ring group in which at least one of hydrogen may be replaced by L; $A^2$ is independently an aromatic ring group in which at least one of hydrogen may be replaced by L, a heterocyclic aromatic ring group in which at least one of hydrogen may be replaced by L, or a single bond; $Z^1$ is —CO—$CR^1$=$CR^2$—, —$CR^1$=$CR^2$—CO—, —$CR^1$=$CR^2$—, —C(=$CR^1R^2$)— or —C(=$R^3$)—; $Z^2$ is independently —CO—$CR^1$=$CR^2$—, —$CR^1$=$CR^2$—CO—, —$CR^1$=$CR^2$—, —C(=$CR^1R^2$)— or —C(=$R^3$)—; $R^1$ and $R^2$ are independently hydrogen, halogen, alkyl having 1 to 10 carbons or alkyl having 1 to 10 carbons in which at least one of hydrogen is replaced by fluorine; and $R^3$ is a group selected from the group of groups represented by formula (R-1);

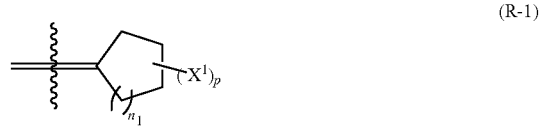

(R-1)

wherein, $X^1$ is independently halogen, alkyl having 1 to 6 carbons or alkyl having 1 to 6 carbons in which at least one of hydrogen is replaced by fluorine; L is independently halogen, —$CF_3$, —C≡N or alkyl having 1 to 6 carbons; $P^1$ and $P^2$ are independently a group selected from the group of groups represented by formula (P-1) to formula (P-11); $Y^1$ and $Y^2$ are independently hydrogen, —$CH_3$, —$C_2H_5$ or halogen; and $Y^3$ is hydrogen, —$CH_3$, —$C_2H_5$, halogen, —$CF_3$ or —C≡N;

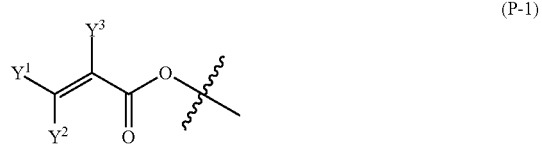

(P-1)

(P-2)

(P-3)

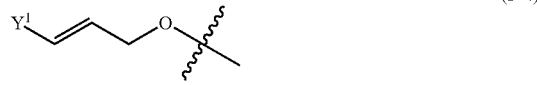

(P-4)

-continued

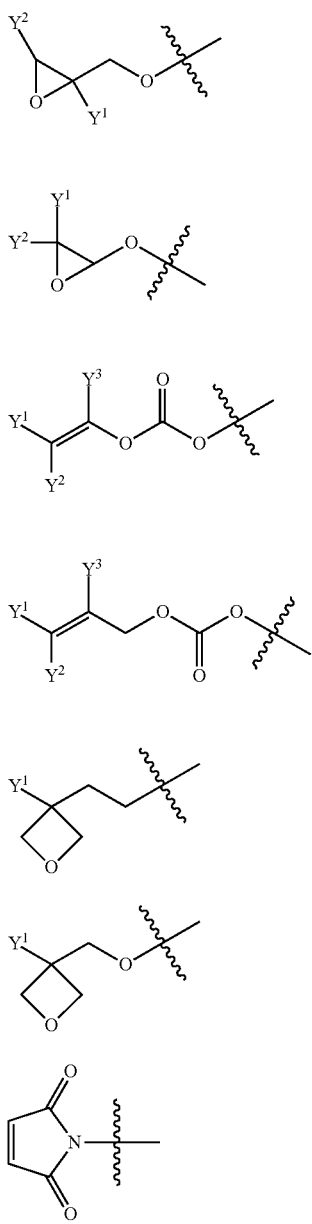

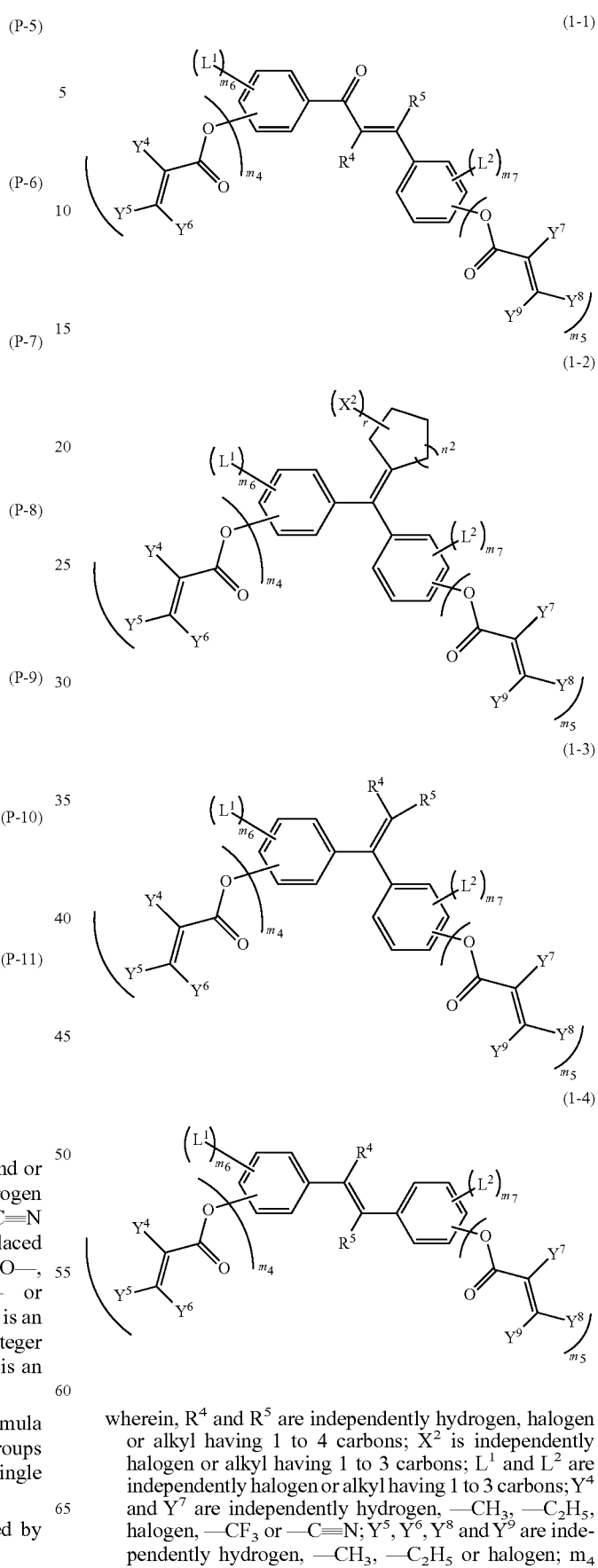

wherein, $Sp^1$ and $Sp^2$ are independently a single bond or alkylene having 1 to 6 carbons, at least one of hydrogen of the alkylene may be replaced by halogen or —C≡N at least one of non-adjacent —$CH_2$— may be replaced by —O—, —S—, —NH—, —CO—, —CO—O—, —O—CO—, —O—CO—O—, —CH=CH— or —C≡C—; $m_1$ and $m_3$ are integers from 0 to 5, $m_2$ is an integer from 0 to 4, and a sum of $m_1$ and $m_3$ is an integer from 1 to 10; $n_1$ is an integer from 1 to 8; and p is an integer from 0 to 4.

2. The compound according to claim 1, wherein, in formula (1), $P^1$ and $P^2$ are a group selected from the group of groups represented by formula (P-1); and $Sp^1$ and $Sp^2$ are a single bond.

3. The compound according to claim 1, represented by formula (1-1) to formula (1-4):

wherein, $R^4$ and $R^5$ are independently hydrogen, halogen or alkyl having 1 to 4 carbons; $X^2$ is independently halogen or alkyl having 1 to 3 carbons; $L^1$ and $L^2$ are independently halogen or alkyl having 1 to 3 carbons; $Y^4$ and $Y^7$ are independently hydrogen, —$CH_3$, —$C_2H_5$, halogen, —$CF_3$ or —C≡N; $Y^5$, $Y^6$, $Y^8$ and $Y^9$ are independently hydrogen, —$CH_3$, —$C_2H_5$ or halogen; $m_4$ and $m_5$ are integers from 0 to 5, and a sum of $m_4$ and $m_5$ is 3 to 10; $m_6$ and $m_7$ are integers from 0 to 5; $n_2$ is an integer from 1 to 4; and r is an integer from 0 to 3.

4. The compound according to claim 3, wherein, in formula (1-1) to formula (1-4), $Y^4$ and $Y^7$ are independently hydrogen or —$CH_3$; $Y^5$, $Y^6$, $Y^8$ and $Y^9$ are hydrogen; $m_4$ and $in_5$ are integers from 0 to 3, and a sum of $m_4$ and $m_5$ is 3 or 4.

5. A homopolymer or a copolymer obtained by homopolymerization or copolymerization of the compound according to claim 1.

6. A liquid crystal composition, containing at least one compound selected from the group of compounds according to claim 1 as a first component.

7. The liquid crystal composition according to claim 6, wherein a ratio of the first component is in the range of 0.05 part by weight to 10 parts by weight based on 100 parts by weight of the liquid crystal composition excluding the first component.

8. The liquid crystal composition according to claim 6, further containing at least one compound selected from the group of compounds represented by formula (2) as a second component:

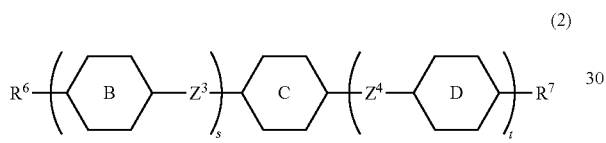

(2)

wherein, $R^6$ and $R^7$ are independently alkyl having 1 to 12 carbons, alkoxy having 1 to 12 carbons, alkenyl having 2 to 12 carbons, or alkenyl having 2 to 12 carbons in which at least one of hydrogen is replaced by fluorine; ring B and ring D are independently 1,4-cyclohexylene, 1,4-phenylene, 1,4-phenylene in which at least one of hydrogen is replaced by fluorine or chlorine, or tetrahydropyran-2,5-diyl; ring C is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl; $Z^3$ and $Z^4$ are independently a single bond, ethylene, methyleneoxy or carbonyloxy; s is 1, 2 or 3; and t is 0 or 1 and a sum of s and t is three or less.

9. The liquid crystal composition according to claim 8, wherein the second component is at least one compound selected from the group of compounds represented by formula (2-1) to formula (2-19):

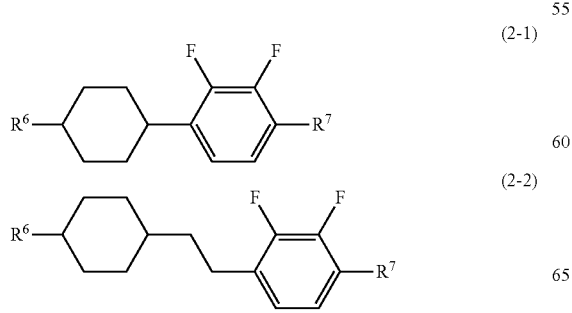

(2-1)

(2-2)

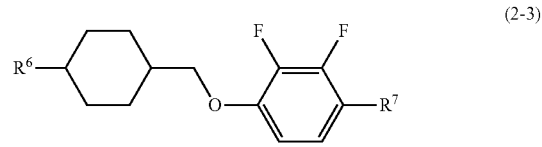

(2-3)

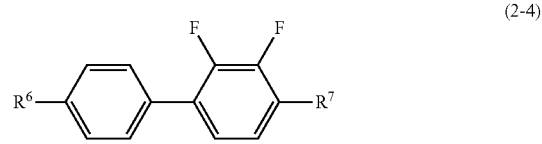

(2-4)

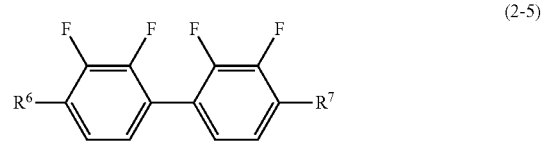

(2-5)

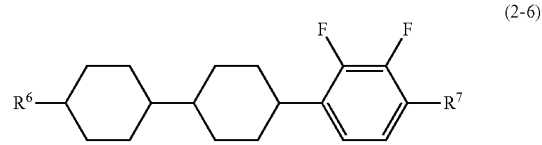

(2-6)

(2-7)

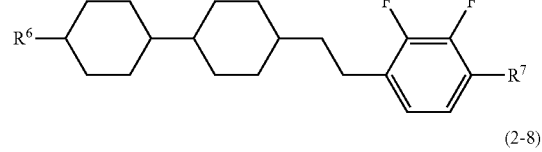

(2-8)

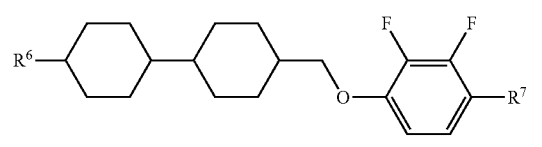

(2-9)

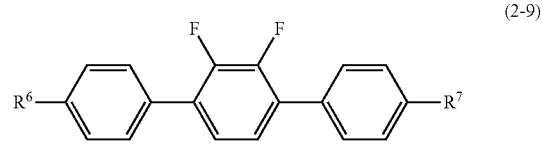

(2-10)

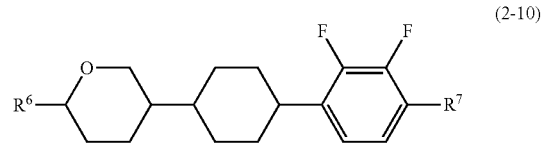

(2-11)

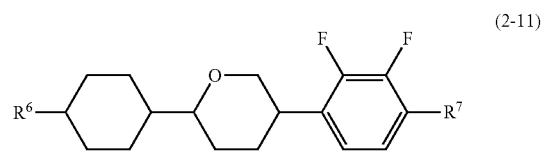

(2-12)

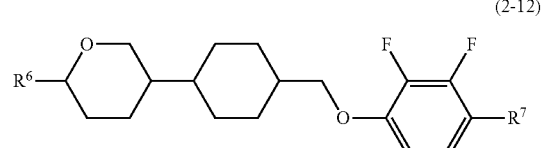

(2-13)

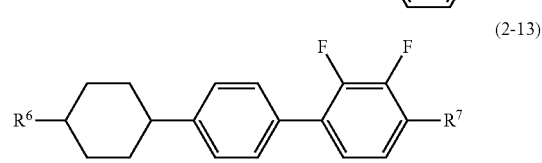

-continued (2-14)
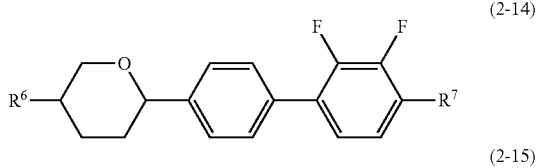

(2-15)
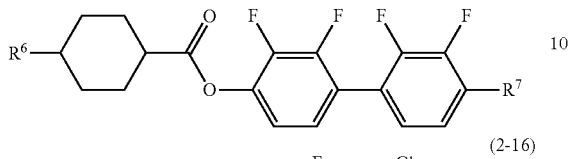

(2-16)
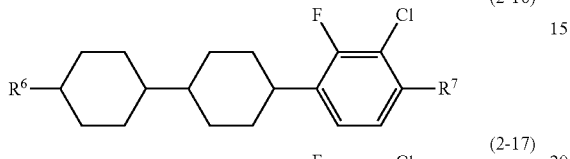

(2-17)
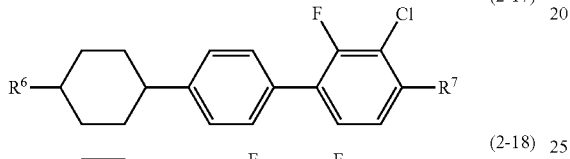

(2-18)
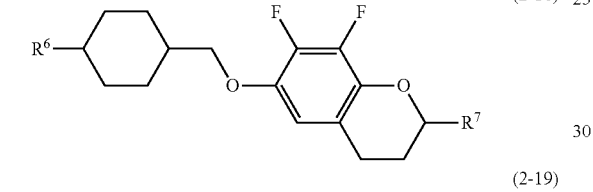

(2-19)
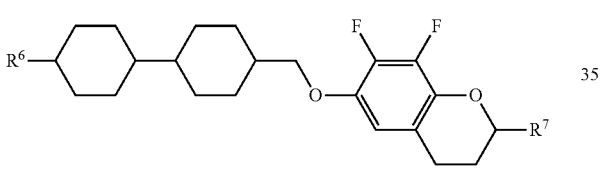

wherein, $R^6$ and $R^7$ are independently alkyl having 1 to 12 carbons, alkoxy having 1 to 12 carbons, alkenyl having 2 to 12 carbons, or alkenyl having 2 to 12 carbons in which at least one of hydrogen is replaced by fluorine.

10. The liquid crystal composition according to claim 8, wherein a ratio of the second component is in the range of 10% by weight to 90% by weight based on the weight of the liquid crystal composition excluding the first component.

11. The liquid crystal composition according to claim 6, further containing at least one compound selected from the group of compounds represented by formula (3) as a third component:

(3)
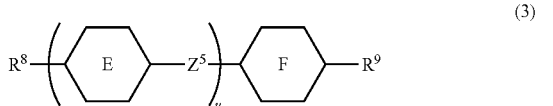

wherein, $R^8$ and $R^9$ are independently alkyl having 1 to 12 carbons, alkoxy having 1 to 12 carbons, alkenyl having 2 to 12 carbons, or alkenyl having 2 to 12 carbons in which at least one of hydrogen is replaced by fluorine; ring E and ring F are independently 1,4-cyclohexylene, 1,4-phenylene, 2-fluoro-1,4-phenylene, 3-fluoro-1,4-phenylene or 2,5-difluoro-1,4-phenylene; $Z^5$ is independently a single bond, ethylene, methyleneoxy or carbonyloxy; and u is 1, 2 or 3.

12. The liquid crystal composition according to claim 11, wherein the third component is at least one compound selected from the group of compounds represented by formula (3-1) to formula (3-13):

(3-1)
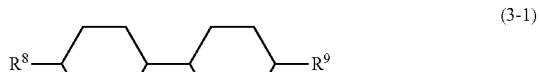

(3-2)
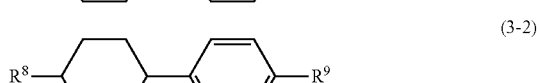

(3-3)
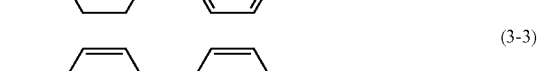

(3-4)
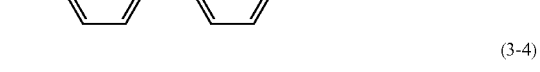

(3-5)
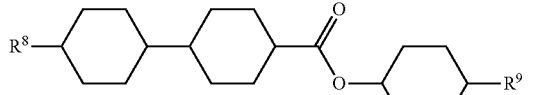

(3-6)
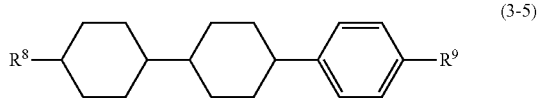

(3-7)
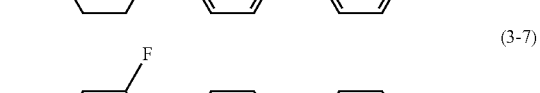

(3-8)
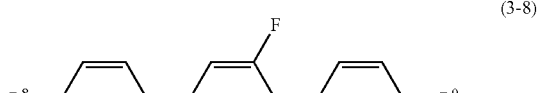

(3-9)
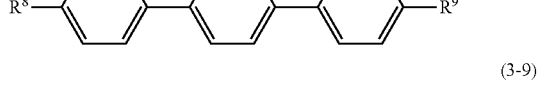

(3-10)
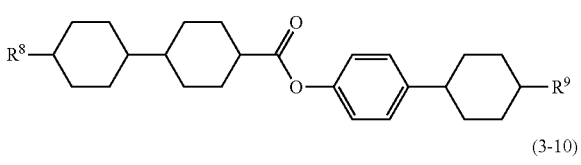

(3-11)
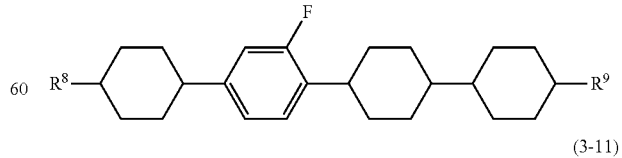

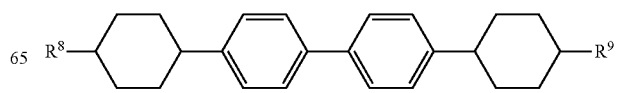

-continued

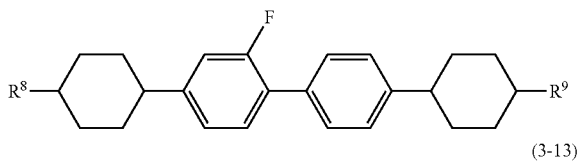

(3-12)

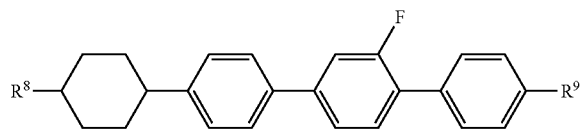

(3-13)

wherein, $R^8$ and $R^9$ are independently alkyl having 1 to 12 carbons, alkoxy having 1 to 12 carbons, alkenyl having 2 to 12 carbons, or alkenyl having 2 to 12 carbons in which at least one of hydrogen is replaced by fluorine.

13. The liquid crystal composition according to claim 11, wherein a ratio of the third component is in the range of 10% by weight to 90% by weight based on the weight of the liquid crystal composition excluding the first component.

14. The liquid crystal composition according to claim 6, further containing a polymerization initiator.

15. The liquid crystal composition according to claim 6, further containing a polymerization inhibitor.

16. The liquid crystal composition according to claim 6, wherein a maximum temperature of a nematic phase is 70° C. or higher, an optical anisotropy (25° C.) at a wavelength of 589 nanometers is 0.08 or more, and a dielectric anisotropy (25° C.) at a frequency of 1 kHz is −2 or less.

17. A liquid crystal display device, comprising two substrates having an electrode layer on at least one of the substrates, and the liquid crystal composition according to claim 6 is arranged between the two substrates.

18. The liquid crystal display device according to claim 17, wherein an operating mode in the liquid crystal display device is a TN mode, a VA mode, an IPS mode or a PSA mode, and a driving mode in the liquid crystal display device is an active matrix mode.

* * * * *